US010850472B2

(12) United States Patent
Horibe et al.

(10) Patent No.: US 10,850,472 B2
(45) Date of Patent: Dec. 1, 2020

(54) SOUNDPROOFING MATERIAL

(71) Applicant: NISSAN MOTOR CO., LTD., Yokohama (JP)

(72) Inventors: Norifumi Horibe, Kanagawa (JP); Susumu Miura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/633,286

(22) PCT Filed: Jul. 27, 2018

(86) PCT No.: PCT/JP2018/028326
§ 371 (c)(1),
(2) Date: Jan. 23, 2020

(87) PCT Pub. No.: WO2019/022245
PCT Pub. Date: Jan. 31, 2019

(65) Prior Publication Data
US 2020/0147921 A1  May 14, 2020

(30) Foreign Application Priority Data

Jul. 28, 2017 (JP) ................................. 2017-146066
Jul. 20, 2018 (JP) ................................. 2018-136411

(51) Int. Cl.
*B32B 3/12* (2006.01)
*B32B 5/02* (2006.01)
(Continued)

(52) U.S. Cl.
CPC .................. *B32B 3/12* (2013.01); *B32B 5/02* (2013.01); *B32B 15/06* (2013.01); *B32B 15/082* (2013.01);
(Continued)

(58) Field of Classification Search
CPC .. B32B 3/12; B32B 5/02; B32B 15/06; B32B 15/082; B32B 15/20; B32B 25/08;
(Continued)

(56) References Cited

U.S. PATENT DOCUMENTS

2015/0266260 A1* 9/2015 Fujioka .................... B32B 5/02
428/118

FOREIGN PATENT DOCUMENTS

JP      63-42863 A      2/1988
JP      2007-137045 A   6/2007
(Continued)

OTHER PUBLICATIONS

Jae-Eun Kim, Helmholtz Resonator, Journal of KSNVE, 25(6), Korean Society for Noise and Vibration Engineering (KSNVE), Dec. 2015, pp. 24-28.
(Continued)

*Primary Examiner* — Jeremy A Luks
(74) *Attorney, Agent, or Firm* — Foley & Lardner LLP

(57) ABSTRACT

To provide a means capable of exhibiting high soundproofing performance over a wide range of a frequency range of 2000 Hz or less.
A soundproofing material includes a sheet having elasticity and a support portion partitioning the sheet into partition portions while holding the sheet, in which a surface rigidity (k) and a surface density (m) of the sheet in the partition portion are configured to satisfy a relationship of the following Expression 1.

$$\frac{1}{2\pi}\sqrt{\frac{k}{m}} > 900 \text{ [Hz]} \qquad \text{[Expression 1]}$$

21 Claims, 20 Drawing Sheets

(51) Int. Cl.
  *B32B 15/06* (2006.01)
  *B32B 15/082* (2006.01)
  *B32B 15/20* (2006.01)
  *B32B 25/08* (2006.01)
  *B32B 25/14* (2006.01)
  *B32B 27/08* (2006.01)
  *B32B 27/30* (2006.01)
  *B32B 27/32* (2006.01)
  *G10K 11/168* (2006.01)
  *B60R 13/08* (2006.01)

(52) U.S. Cl.
  CPC .............. *B32B 15/20* (2013.01); *B32B 25/08* (2013.01); *B32B 25/14* (2013.01); *B32B 27/08* (2013.01); *B32B 27/304* (2013.01); *B32B 27/32* (2013.01); *G10K 11/168* (2013.01); *B32B 2260/021* (2013.01); *B32B 2260/048* (2013.01); *B32B 2262/0253* (2013.01); *B32B 2307/10* (2013.01); *B60R 13/08* (2013.01)

(58) Field of Classification Search
  CPC ....... B32B 25/14; B32B 27/08; B32B 27/304; B32B 27/32; B32B 2260/021; B32B 2260/048; B32B 2262/0253; B32B 2307/10; G10K 11/168; G10K 11/172; B60R 13/08
  See application file for complete search history.

(56) References Cited

FOREIGN PATENT DOCUMENTS

JP 2010-85818 A 4/2010
JP 2011-026815 A 2/2011

OTHER PUBLICATIONS

Ni Sui et al., A Lightweight Yet Sound-Proof Honeycomb Acoustic Metamaterial, Applied Physics Letters, vol. 106, No. 17, 171905-1, Apr. 27, 2015, 4 pages.
A. Peiffer et al., Comment on "A Lightweight Yet Sound-Proof Honeycomb Acoustic Metamaterial", [Appl. Phys. Lett.106,171905 (2015)], , Applied Physics Letters, vol. 107, 216101 Nov. 23, 2015, 3 pages.

* cited by examiner $$TL = 20\log_{10}(m \cdot f) - 43$$

SOUNDPROOFING MATERIAL

TECHNICAL FIELD

The present invention relates to a soundproofing material.

BACKGROUND ART

There are many sound sources in automobiles. As it is necessary to improve quietness by blocking noise from inside and outside the vehicle, various soundproofing measures are being implemented in automobiles. In particular, soundproofing measures should be taken in the vicinity of generation sources for portions that generate loud sounds (inherent sound sources), such as an engine, a transmission, and a drive system. For this reason, dedicated soundproofing covers with excellent sound absorption and insulation performance are used for these sound sources. Here, as the reinforcement of out-of-vehicle noise regulations by continuous law revisions or the quietness of in-vehicle noise are directly connected to the value (high-quality feeling) of the vehicle, the demand for low noise components in automobiles is very high. In particular, the out-of-vehicle noise regulations introduced in the European Union (EU) in 2013 are eventually stricter as −3 dB (necessary to reduce sound pressure energy to ½) as compared to the conventional regulation value. For this purpose, noise reduction measures for an engine body as a main noise generation source in the engine room and an inherent sound source such as a transmission are indispensable. Various soundproofing components such as an engine top cover on an upper surface side of the engine have been used so far, but improvement in performance is further required. In addition, it is preferable that the soundproofing measures can meet the request for weight reduction from the viewpoint of low fuel consumption.

Various configurations of soundproofing structures aiming at soundproofing are known, but among those, a material called "acoustic metamaterial" is present. The "acoustic metamaterial" is an artificial medium designed to exhibit acoustic properties that substances present in nature do not normally show.

Conventionally, the acoustic metamaterial exhibiting a desired soundproofing effect has been intensively developed, and various proposals have been made.

Here, there has been known that when a sound wave of a frequency on a single wall made of a homogeneous material is vertically incident, a value of transmission loss (TL) by the single wall is calculated as TL≈20 log$_{10}$(m·f)−43 [dB] based on a frequency (f) and a surface density (m) of the single wall (mass law). That is, generally, the lighter the soundproofing material and the lower the frequency of the sound wave, the smaller the transmission loss (TL) and the lower the soundproofing performance. For example, in the case of a sound wave of 500 Hz, to achieve STL of 20 dB, a size of 12 cm for a concrete wall and a size exceeding 35 cm for a urethane foam sound insulation material are required.

In view of such a situation, for example, Ni Sui et al., Applied Physics Letters 106, 171905 (2015) proposes an acoustic metamaterial composed of a lattice-like structure in which a latex rubber film is hermetically supported by an aramid fiber sheet honeycomb that has a plurality of continuously formed cylindrical cells. Here, in the lattice-like structure disclosed in Ni Sui et al., Applied Physics Letters 106, 171905 (2015), the latex rubber film is partitioned into a partition portion having a regular hexagon (one side length is 3.65 mm) by a plurality of cylindrical cells. Ni Sui et al., Applied Physics Letters 106, 171905 (2015) discloses that by using such an acoustic metamaterial, it is possible to provide a material that is superior in soundproofing performance against low-frequency sound waves even if the material is lightweight and an STL exceeding 25 dB can be achieved for sound waves of a frequency of less than 500 Hz by experiments.

SUMMARY OF INVENTION

Technical Problem

However, it became clear by the examination of the present inventors that when the acoustic metamaterial as described in Ni Sui et al., Applied Physics Letters 106, 171905 (2015) is used as a soundproofing material, sufficient soundproofing performance over a wide frequency range of 2000 Hz or less cannot be exhibited.

Therefore, an object of the present invention is to provide a means capable of exhibiting high soundproofing performance over a wide range of a frequency range of 2000 Hz or less.

Solution to Problem

The present inventors have conducted intensive studies in view of the above problems. As a result, it was found that in an acoustic metamaterial that includes a sheet having elasticity and a support portion partitioning the sheet into a partition portion while supporting the sheet as disclosed in Ni Sui et al., Applied Physics Letters 106, 171905 (2015), high soundproofing performance can be exhibited over a wide frequency range of 2000 Hz or less (in particular, 400 to 1000 Hz) by controlling the surface rigidity of the sheet and the surface density of the sheet constituting the partition portion to satisfy a predetermined relationship, and the present invention has been completed.

That is, one aspect of the present invention provides a soundproofing material that includes a sheet having elasticity and a support portion partitioning the sheet into a partition portion while supporting the sheet. The soundproofing material has features in that a surface rigidity (k) and a surface density (m) of the sheet in the partition portion satisfy a relationship of the following Expression 1.

[Math. 1]

$$\frac{1}{2\pi}\sqrt{\frac{k}{m}} > 900 \text{ [Hz]} \qquad \text{[Expression 1]}$$

BRIEF DESCRIPTION OF DRAWINGS

FIG. 10 is a graph showing results of Comparative Examples 1-1 to 1-3 and Example 1.

FIG. 11 is a graph showing results of Comparative Examples 2-1 to 2-7.

FIG. 12 is a graph showing results of Comparative Examples 3-1 and 3-2 and Example 3.

FIG. 13 is a graph showing results of Examples 4-1 and 4-2.

FIG. 14 is a graph showing results of Examples 5-1 to 5-6.

FIG. 15 is a graph showing results of Examples 6-1 to 6-5.

FIG. 16 is a graph showing results of Comparative Examples 7-1 and 7-2 and Examples 7-1 to 7-3.

FIG. 17 is a graph showing results of Examples 8-1 to 8-3.

FIG. 18 is a graph showing results of Examples 9-1 to 9-4.

FIG. 19 is a graph showing results of Examples 10-1 to 10-4.

FIG. 20 is a graph showing results of Examples 11-1 to 11-3.

FIG. 21 is a graph showing results of Examples 12-1 and 12-2.

FIG. 22 is a graph showing results of Examples 13-1 to 13-3.

FIG. 23 is a graph showing results of Examples 14-1 to 14-3.

FIG. 24 is a graph showing results of Examples 15-1 and 15-2.

FIG. 25 is a graph showing results of Examples 16-1 to 16-4.

FIG. 26 is a graph showing results of Examples 17-1 to 17-4.

FIG. 27 is a graph showing results of Examples 18-1 to 18-3 and Comparative Example 18.

FIG. 28 is a graph showing results of Examples 19-1 to 19-4.

FIG. 29 is a graph showing results of Examples 20-1 to 20-3.

FIG. 30 is a graph showing results of Examples 21-1 and 21-2.

FIG. 31 is a graph showing results of Examples 22-1 to 22-3.

FIG. 32 is a graph showing results of Examples 23-1 and 23-2 and Comparative Example 23.

FIG. 33 is a graph showing results of Examples 24-1 to 24-3.

FIG. 34 is a graph showing results of Examples 25-1 to 25-5 and Comparative Example 25.

FIG. 35 is a graph showing results of Examples 26-1 to 26-4.

FIG. 36 is a graph showing results of Examples 27-1 to 27-3 and Comparative Example 27.

FIG. 37 is a graph showing results of Example 28 and Comparative Examples 28-1 to 28-3.

FIG. 38 is a graph showing results of Examples 29-1 to 29-3.

FIG. 39 is a graph showing results of Examples 30-1 and 30-2 and Comparative Example 30.

DESCRIPTION OF EMBODIMENTS

Figure 1:
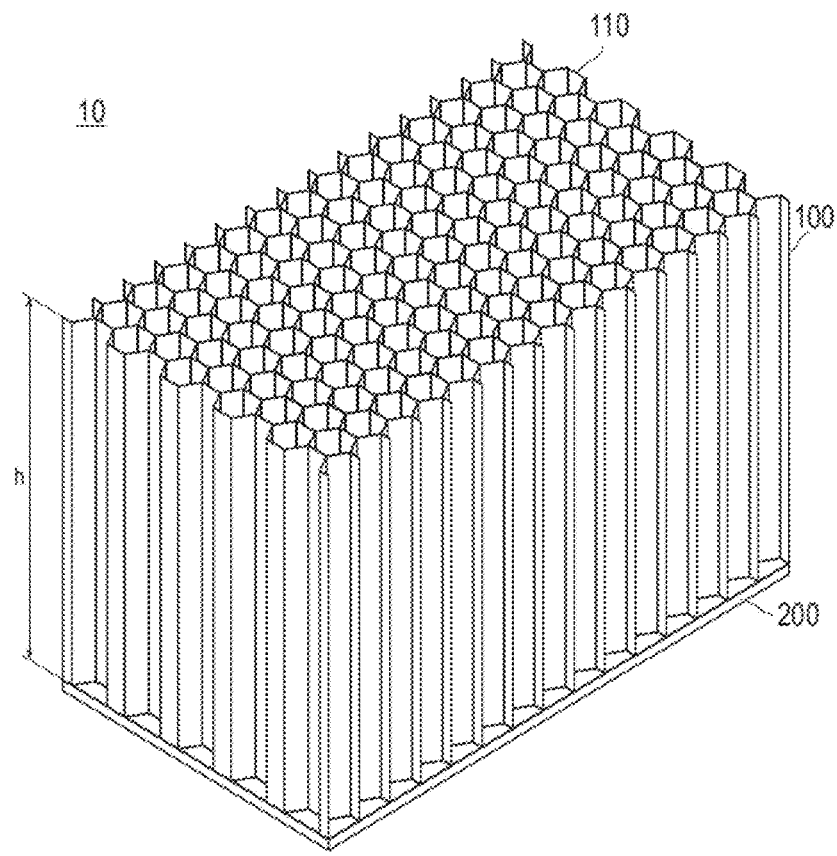
FIG. 1 is a perspective view showing an appearance of a soundproofing material according to an embodiment of the present invention.

An aspect of the present invention relates to a soundproofing material that includes a sheet having elasticity and a support portion partitioning the sheet into partition portions while supporting the sheet, in which a surface rigidity (k) of the sheet and a surface density (m) of the sheet in the partition portion satisfy a relationship of the following Expression 1.

[Math. 2]

$$\frac{1}{2\pi}\sqrt{\frac{k}{m}} > 900 \; [\text{Hz}]$$ [Expression 1]

A calculation method of the surface rigidity (k) and the surface density (m) in the above Expression 1 will be described later.

Hereinafter, embodiments of the present invention will be described with reference to the drawings, but, the technical scope of the present invention should be defined based on the description of the scope of claims and is not limited to the following embodiments. Dimensional ratios in the drawings are exaggerated for the convenience of description, and may differ from the actual ratios. In this specification, "X to Y" indicating a range represents "X or more and Y or less". In addition, unless otherwise specified, an operation and measurements such as physical properties are performed under conditions of room temperature (20 to 25° C.)/relative humidity 40 to 50%.

Figure 2:
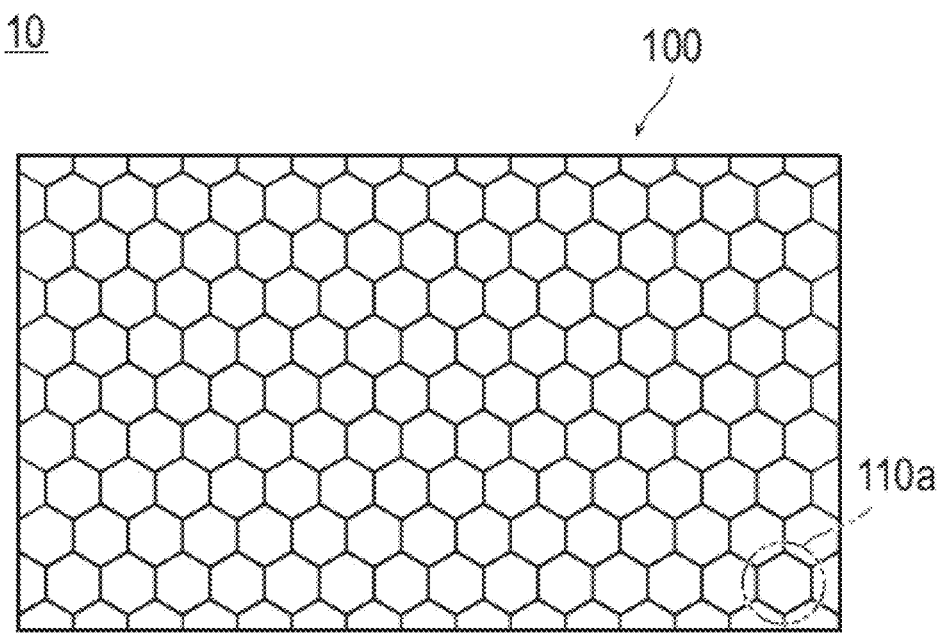
FIG. 2 is a top view of the soundproofing material according to an embodiment of the present invention.
Figure 3:
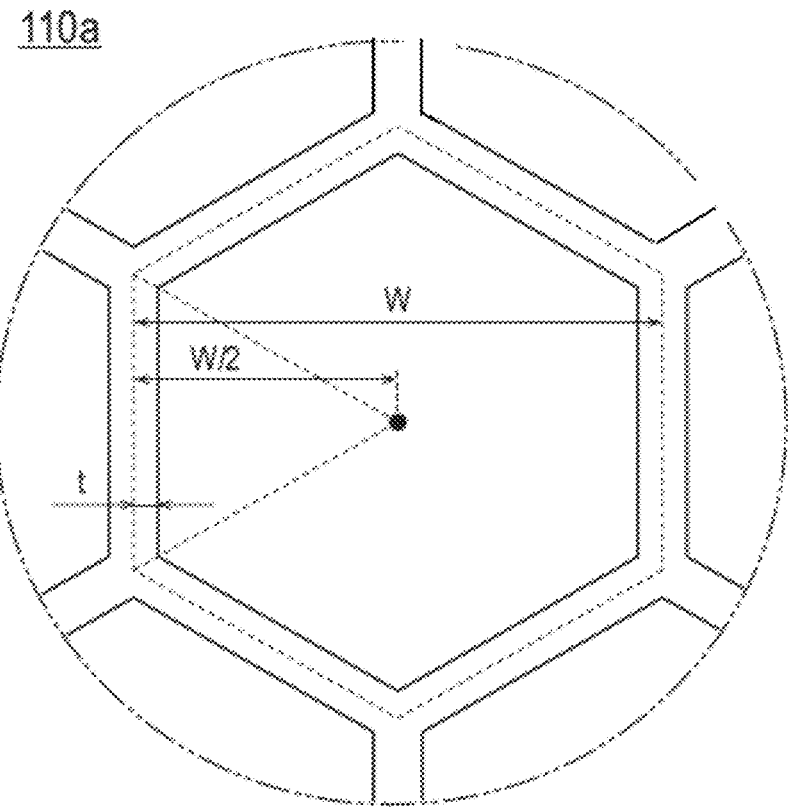
FIG. 3 is an enlarged cross-sectional view for describing a cross-sectional shape and a size of a cylindrical cell constituting the soundproofing material according to an embodiment of the present invention.

FIG. 1 is a perspective view showing an appearance of a soundproofing material according to an embodiment of the present invention. FIG. 2 is a top view of the soundproofing material according to an embodiment of the present invention. FIG. 3 is an enlarged cross-sectional view for describing a cross-sectional shape and a size of the support portion constituting the soundproofing material according to an embodiment of the present invention.

As shown in FIG. 1, a soundproofing material 10 according to an embodiment of the present invention includes a lattice-like structure 100 (support portion) that is constituted by cylindrical cells arranged continuously (regularly) and a latex rubber sheet 200 that is made of latex rubber having elasticity. The latex rubber sheet 200 is hermetically bonded to the lattice-like structure 100 so as to close one side of openings on both sides of the lattice-like structure 100, and functions as a sheet-like substrate. Note that a thickness of the latex rubber sheet 200 in the present embodiment is 0.25 mm (250 µm). On the other hand, in the present embodiment, the lattice-like structure 100 is made of a polyvinyl chloride resin. The lattice-like structure 100 has a large number of continuously (regularly) formed cylindrical cells 110. Note that as shown in FIGS. 1 and 2, in the soundproofing material 10 according to the present embodiment, a cross-sectional shape of the cylindrical cell 110 on a cross section (paper surface of FIG. 2) perpendicular to an extending direction of the lattice-like structure 100 is a regular hexagon. That is, the lattice-like structure 100 has a so-called honeycomb structure. As a result, the lattice-like structure 100 according to the present embodiment partitions the latex rubber sheet 200 into a plurality of (a large number of in FIGS. 1 and 2) partition portions while supporting the latex rubber sheet 200 as the sheet-like substrate. The plurality of partition portions form a regular arrangement structure in which the plurality of partition portions having the same outline shape are regularly arranged.

Further, a cell size (distance between opposing parallel sides in a regular hexagon of a cross-sectional shape; distance w shown in FIG. 3) of one cylindrical cell ($110a$ in FIG. 3) constituting the honeycomb structure is 4 mm. With such a configuration, it is possible to realize excellent sound insulation performance with a very simple structure. In addition, as shown in FIG. 3, the lattice-like structure 100 can be regarded as being configured by connecting between a large number of cylindrical cells 110 having walls therearound. In the present embodiment, a thickness (distance t shown in FIG. 3) of the wall of the cylindrical cell is 0.07 mm (70 µm). Note that a height (distance h shown in FIG. 1) of the lattice-like structure (cylindrical cell) in the extending direction is 25 mm, and the lattice-like structure is constituted by a single structure whose height is uniform.

As described above, the soundproofing material having the configuration shown in FIGS. 1 and 2 can realize excellent soundproofing performance with a very simple configuration. In particular, the soundproofing material can express characteristics that high soundproofing performance can be exhibited over a wide frequency range of 2000 Hz or less even if the soundproofing material is lightweight and easy to configure, which cannot be achieved by the conventional technology.

The present inventors have intensively studied a mechanism by which the soundproofing material as in the above-described embodiment exhibits such excellent soundproofing performance. As a result, it was found that a mechanism different from the soundproofing material conventionally applied to vehicles and the like was involved, and the present invention was completed. The mechanism finally found has overturned the conventional common sense regarding the soundproofing material applied to vehicles and the like. Hereinafter, the mechanism that the soundproofing material according to the present embodiment exhibits excellent soundproofing performance and the configuration of the present invention completed based on the mechanism clarified by the present inventors will be described in order.

Figure 4:
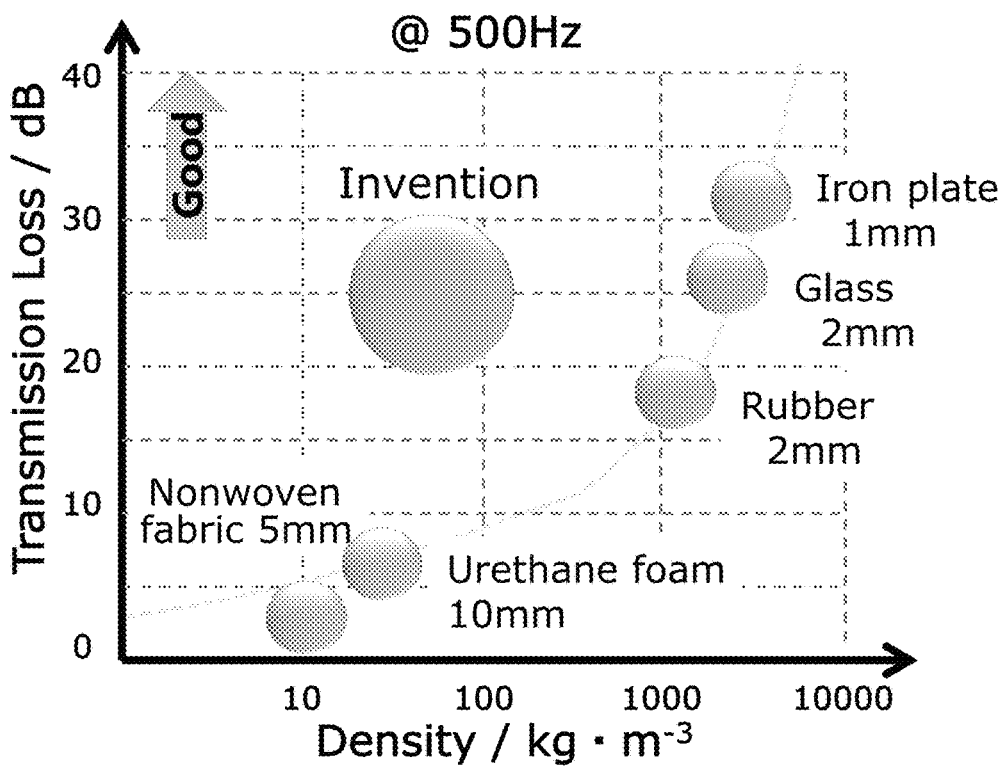
FIG. 4 is a graph for describing soundproofing performance (transmission loss @ 500 Hz) of the soundproofing material according to the present invention in comparison with a performance trend in a conventionally known soundproofing material.

First, the soundproofing performance (@ 500 Hz) of the soundproofing material according to the present invention is shown in FIG. 4 in the form that contrasts with the performance trend of the conventionally known soundproofing material. As shown in FIG. 4, the conventionally known soundproofing material has the performance trend that the soundproofing performance (transmission loss) is improved as the density of the constituent material is increased. The performance trend in the conventionally known soundproofing material is known as "mass law". A theoretical value (TL) of the transmission loss in the soundproofing material according to the mass law is calculated according to the following Expression 2 using a frequency (f) of a sound wave to be targeted and a surface density (m; mass per unit area) of the soundproofing material.

[Math. 3]

$$TL \text{ [dB]} \approx 20 \log_{10}(m \cdot f) - 43 \quad \text{[Expression 2]}$$

Figure 5:
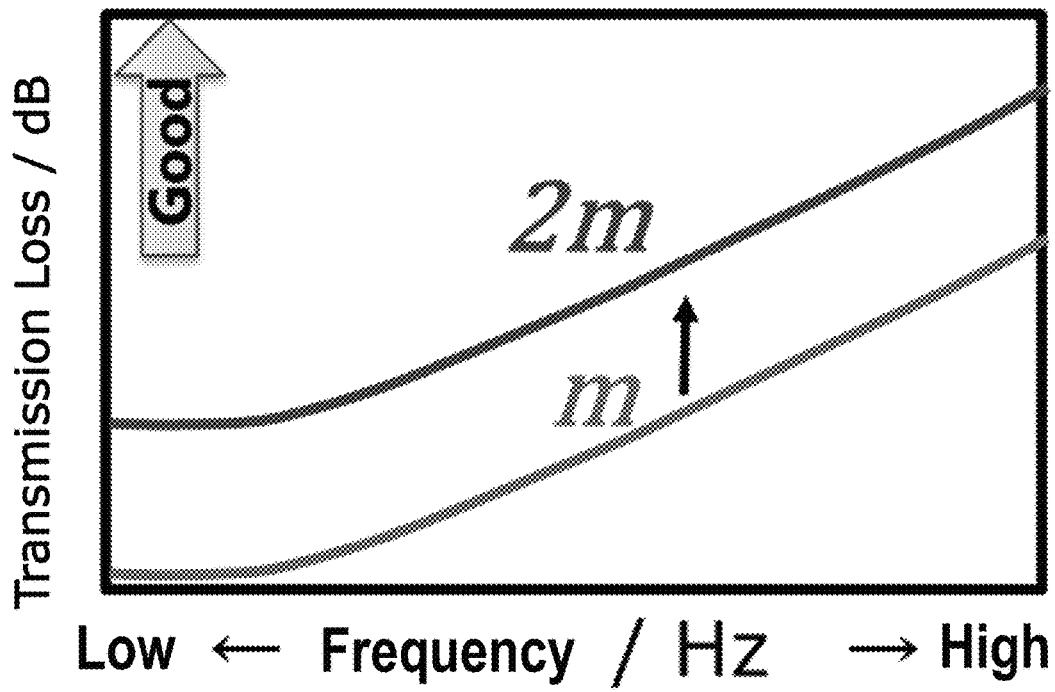
FIG. 5 is a graph for describing a change in soundproofing performance (transmission loss) according to a mass law when the surface density of the soundproofing material is increased.

For this reason, if the surface density of the soundproofing material is increased, the soundproofing performance (transmission loss (TL)) can be improved, but on the other hand, the surface density of the soundproofing material needs to be increased in order to improve the soundproofing performance, which is a common sense in the prior art based on the mass law (FIG. 5). In other words, it was believed that the soundproofing material that exhibits high soundproofing performance over a wide range of frequencies of 2000 Hz or less cannot be made of a lightweight material. On the other hand, the soundproofing material according to the present invention exhibits excellent soundproofing performance by greatly deviating from the performance trend (that is, exhibits relatively high soundproofing performance even at low density (lightweight)) (FIG. 6).

Figure 6:
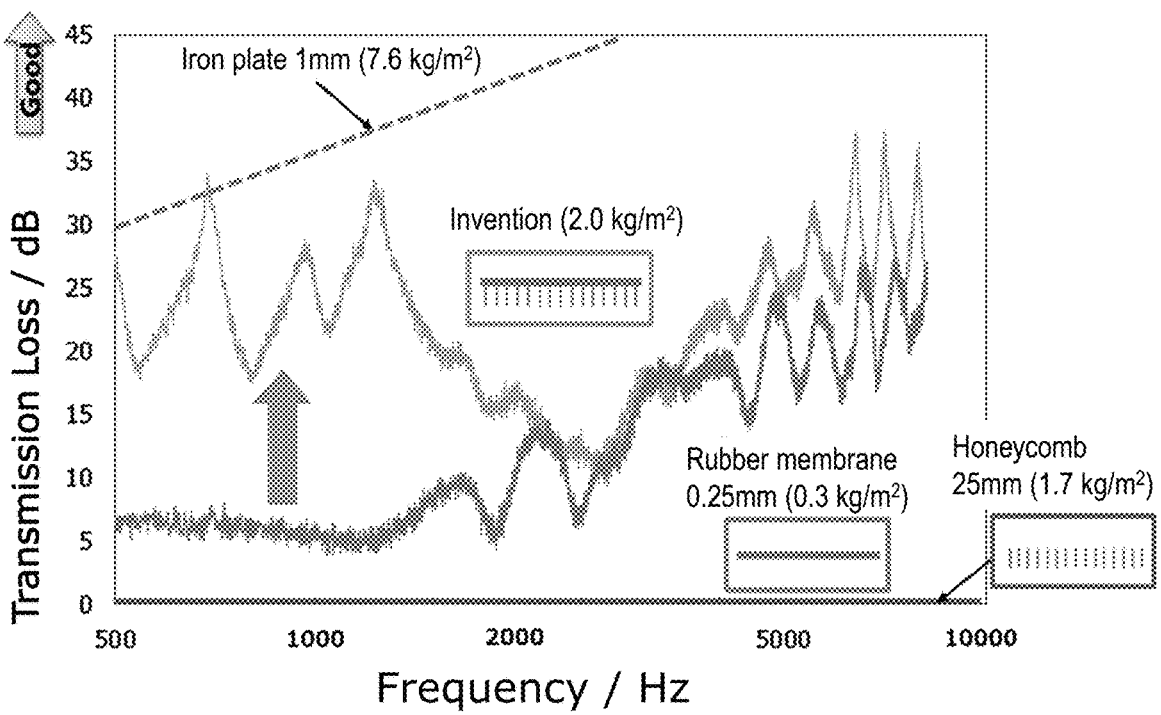
FIG. 6 is a graph for describing the soundproofing performance (transmission loss) of the soundproofing material according to the present invention with respect to a soundproofing material composed of only a lattice-like structure (support portion) having a honeycomb structure, a soundproofing material composed of only a single wall, and a soundproofing material composed of an iron plate.

More specifically, as shown in FIG. 6, the soundproofing performance is not exhibited at all by only a lattice-like structure (support portion) having a honeycomb structure. In addition, in the case of the soundproofing material composed of the single wall, the soundproofing performance according to the mass law only with a sheet (rubber film) having elasticity remains to be exhibited (transmission loss increases in the high frequency range but transmission loss decreases in the low frequency range). Therefore, in order to exhibit the soundproofing performance in the low frequency range (particularly in a region of 2000 Hz or less), it is necessary to use a material whose surface density is very large (that is, heavy) like, for example, an iron plate. On the other hand, the soundproofing material according to the present invention having the above-described configuration exhibits the soundproofing performance according to the mass law in the high frequency range, in which the value of transmission loss decreases as the frequency decreases. On the other hand, even if the soundproofing material according to the present invention is lightweight, it is possible to exhibit excellent soundproofing performance even at a low frequency range (in particular, a region of 2000 Hz or less) with a certain frequency (resonance frequency) as a boundary.

Such a significant improvement in the soundproofing performance in the low frequency range cannot be described by the mass law. Therefore, the present inventors have intensively studied various patterns as a model for explaining the phenomenon that cannot be described by the prior art. In the process, the present inventors have surprisingly discovered that the soundproofing performance in the low frequency range is exhibited according to "rigidity law" which is a sound insulation principle different from the mass law. Hereinafter, this will be described.

A theoretical value (TL) of the transmission loss in the soundproofing material according to this rigidity law is calculated according to the following Expression 3 using a frequency (f) of a sound wave to be targeted, a surface density (m; mass per unit area) of the soundproofing material, and a surface rigidity (K) of the soundproofing material.

Note that the surface rigidity (K) is a spring constant when one of the partition portions of a sheet partitioned by a support portion (lattice-like structure) approximates a mass spring model that has a mass of mass m and vibrates with respect to the incidence of the sound wave, and as the K value increases, the partition portion is more difficult to deform with respect to the incidence of the sound wave.

[Math. 4]

$$TL[\text{dB}] \approx 20\log_{10}\left(4\pi^2 \cdot m \cdot f - \frac{K}{f}\right) - 43 \quad \text{[Expression 3]}$$

Figure 7:
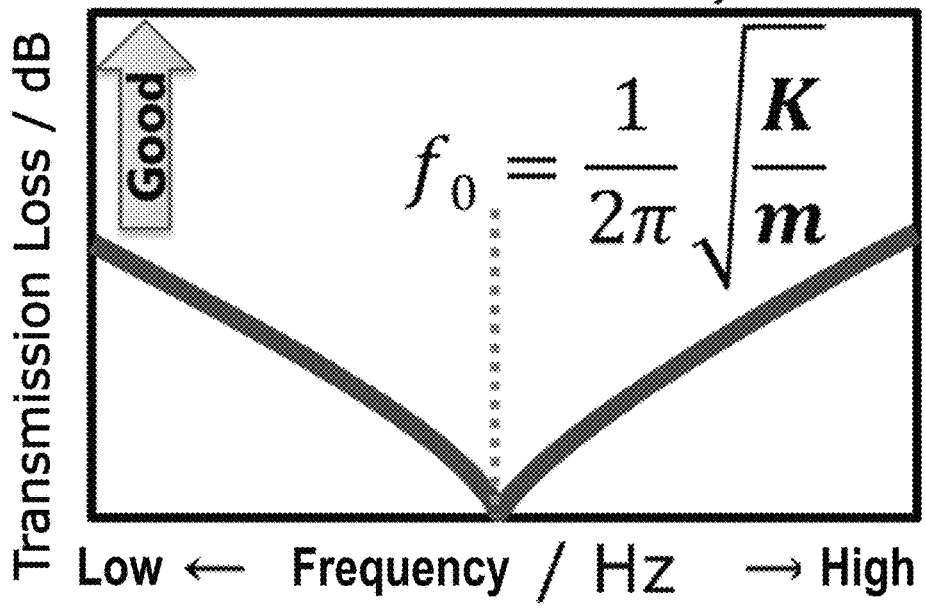
FIG. 7 is a diagram for describing the soundproofing performance according to a rigidity law.

Then, when this Expression is solved for the frequency (f) under the condition that TL takes a minimum value, a value of a resonance frequency $f_0$ is expressed by the following Expression 4 (FIG. 7).

[Math. 5]

$$f_0 = \frac{1}{2\pi}\sqrt{\frac{K}{m}} \quad \text{[Expression 4]}$$

Figure 8:
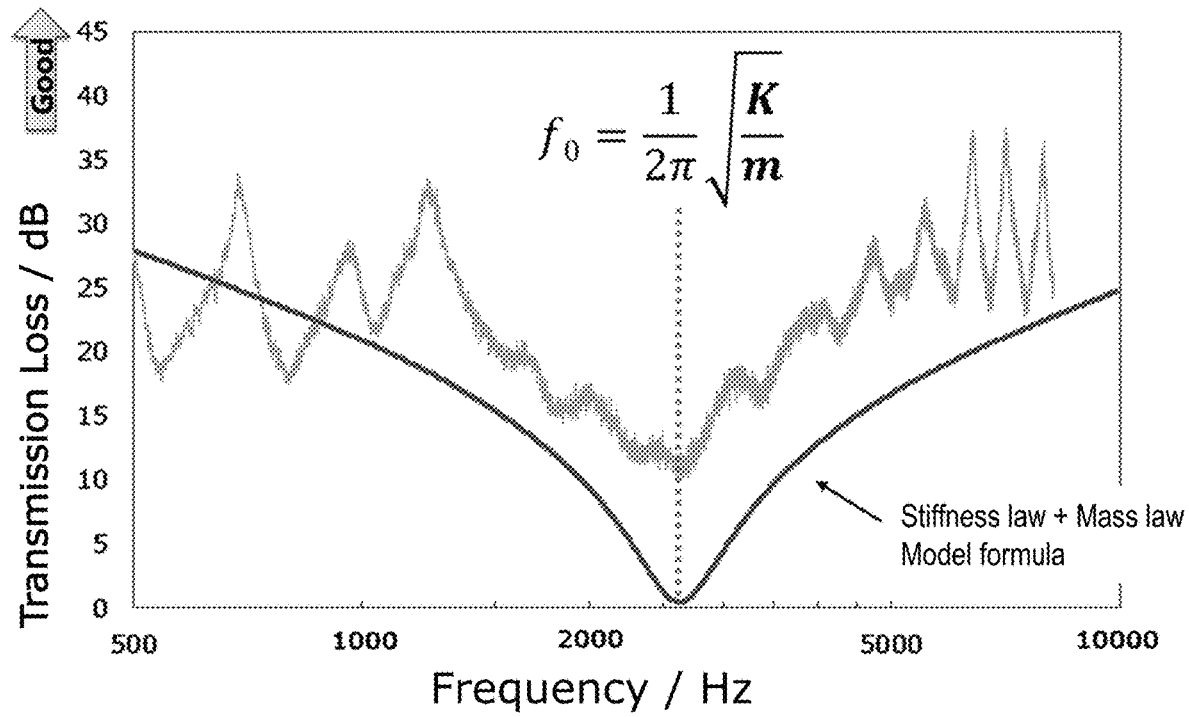
FIG. 8 is a graph showing a model formula in comparison with an actual measurement value of the transmission loss when it is assumed that both the mass law (FIG. 5) and the rigidity law (FIG. 7) are involved in the soundproofing performance of the soundproofing material according to the present invention.

Based on this, the present inventors tried to create a model formula when it is assumed that both the mass law (FIG. 5) and the rigidity law (FIG. 7) are involved in the expression of the soundproofing performance. It has been confirmed that the model formula matches the result of the actually measured transmission loss (TL), and it has been verified that both the mass law and the rigidity law are involved in the exhibition mechanism of the soundproofing performance by the soundproofing material according to the present embodiment (FIG. 8).

It is considered that in the exhibition mechanism of the soundproofing performance by the soundproofing material according to the present embodiment, the reason why not only the mass law but also the rigidity law is involved has not been fully clarified, but the partition portions of the sheet having elasticity are each partitioned by the support portion (lattice-like structure having a cylindrical cell) to improve the rigidity of the sheet (that is, it is difficult to vibrate). Therefore, the present inventors have presumed that the mechanism can be well explained by the approximation by the above-described mass spring model.

Based on the above mechanism, the present inventors have further studied the elements necessary for designing the soundproofing characteristics of the soundproofing material. In the process, the inventors approximate each partition portion of the sheet having elasticity with a disk having a radius a having the same area, and calculate the surface rigidity (k; in present specification, the value of the surface rigidity in the case of following this approximation shall be expressed by a smaller letter k) of the partition portion when a load p is applied by the following Expression 5 using an average deflection ($w_{ave}$) when the disk vibrates in the peripheral fixed and uniform load mode. In the present specification, the k value is used in the above Expression 1.

[Math. 6]

$$k = \frac{p}{w_{ave}} = \frac{16}{(1-v^2)}\frac{E \cdot h^3}{a^4} \quad \text{[Expression 5]}$$

Note that in Expression 5, v represents a Poisson's ratio of the sheet in the partition portion, E represents a Young's modulus [Pa] of the sheet in the partition portion, and h represents a film thickness [m] of the sheet in the partition portion. In addition, the radius a when the partition portion approximates a disk represents an area equivalent circle radius [m] of the partition portion. As an example, when the partition portion is a hexagon whose length of one side is 1, an area $S_{hex}$ of the partition portion (hexagon) is calculated by the following Expression 6.

[Math. 7]

$$S_{hex} = \frac{3\sqrt{3}}{2} l^2 \quad \text{[Expression 6]}$$

By doing so, an equivalent circle radius $a_{eq}$ (a radius of a circle having an area equal to the area of the partition portion (hexagon)) of the partition portion (hexagon) is calculated by the following Expression 7.

[Math. 8]

$$a_{eq} = \sqrt{\frac{3\sqrt{3}}{2\pi}} \, l \approx 0.909 l \quad \text{[Expression 7]}$$

Then, when the value of the surface rigidity (k) calculated in this way is employed as the value of the surface rigidity (K) in Expression 4 described above, the value of the resonance frequency ($f_0$) can be expressed by the following Expression 8.

[Math. 9]

$$f_0 = \frac{1}{2\pi}\sqrt{\frac{k}{m}} = \frac{1}{2\pi}\sqrt{\frac{1}{m}\frac{16}{(1-v^2)}\frac{E \cdot h^3}{a^4}} \quad \text{[Expression 8]}$$

Note that the surface density (m) of the sheet in the partition portion can be expressed by the following Expression 9.
[Math. 10]

$$m = \rho \cdot h \quad \text{[Expression 9]}$$

In the above Expression 9, ρ represents a density [kg/m³] of the sheet in the partition portion, and h represents the film thickness [m] of the sheet in the partition portion.

Therefore, from the above Expressions 8 and 9, the value of the resonance frequency ($f_0$) can be expressed by the following Expression 10 using the value of the density (ρ; mass per unit volume; kg/m³) of the sheet in the partition portion and the value of the film thickness [m] of the sheet in the partition portion described above. This means that the value of the resonance frequency ($f_0$) indicated by the soundproofing material can be controlled by variously changing the size or shape of the partition portion, and the material and film thickness of the sheet in the partition portion.

[Math. 11]

$$f_0 = \frac{1}{2\pi}\sqrt{\frac{k}{m}} = \frac{1}{2\pi}\sqrt{\frac{1}{m}\frac{16}{(1-v^2)}\frac{E \cdot h^3}{a^4}} = \frac{1}{2\pi}\sqrt{\frac{16}{(1-v^2)\cdot\rho}\frac{E \cdot h^2}{a^4}} \quad \text{[Expression 10]}$$

As described above, the problem to be solved by the present invention is to provide a soundproofing material capable of exhibiting high soundproofing performance over a wide range of a frequency range of 2000 Hz or less. As shown in FIGS. 7 and 8, the soundproofing performance (value of the transmission loss) according to the rigidity law becomes better as the frequency decreases with the resonance frequency ($f_0$) as a boundary. Therefore, the present inventors thought that the soundproofing performance for sound in a frequency range of 2000 Hz or less can be improved by setting the resonance frequency ($f_0$) to a value equal to or higher than a certain value. Based on this idea, according to the above-mentioned Expression 10, in the soundproofing material including the sheet having elasticity and the support portion that supports the sheet and partitions the sheet into partition portions, a number of soundproofing materials having different resonance frequencies ($f_0$) were produced by variously changing the size or shape of the partition portion or the material and film thickness of the sheet in the partition portion, and the soundproofing performance was evaluated for each of the soundproofing materials (in particular, in the frequency range of 2000 Hz or less). As a result, the surface rigidity (k; calculated by the above Expression 5) of the sheet and the surface density (m; calculated by the above Expression 9) of the sheet in the partition portion satisfy the relationship of the following Expression 1, and thus in particular, it was confirmed that the excellent soundproofing performance can be exhibited even in a frequency range of 2000 Hz or less. The following Expression 1 means that the resonance frequency ($f_0$) calculated based on the above-described approximation is higher than 900 [Hz].

[Math. 12]

$$\frac{1}{2\pi}\sqrt{\frac{k}{m}} > 900 \, [\text{Hz}] \quad \text{[Expression 1]}$$

Here, the form of the value on the left-hand side in the above Expression 1 is not particularly limited, and can be appropriately set according to the frequency range in which the soundproofing performance is to be exhibited on the soundproofing material. In general, the resonance frequency shifts to a higher frequency side as the value on the left-hand side in the above Expression 1 is increased, and therefore it is preferable to appropriately set the value in consideration of the shifted resonance frequency. As an example, the value on the left-hand side in the above Expression 1 is preferably 2000 Hz or more, more preferably 3000 Hz or more, still more preferably 4000 Hz or more, and particularly preferably 5000 Hz or more. The value of the left-hand side in the above Expression 1 is, for example, 10,000 Hz or more, for example, 50,000 Hz or more, for example, 100,000 Hz or more. Note that in the soundproofing material that exhibits the soundproofing performance within the scope of the technical idea according to the present invention, the upper limit of the value on the left-hand side in the above Expression 1 is preferably 1,000,000 Hz or less, more preferably 800,000 Hz or less, and still more preferably 600,000 Hz or less.

By the way, in the technique disclosed in Non-Patent Document 1, as a result that the cell size is too large, the surface rigidity of the sheet having elasticity is reduced, and a value of $(k/m)^{1/2}/2\pi$ is not 900 Hz or more, and therefore it is considered that the excellent soundproofing performance cannot be exhibited particularly in a frequency range of 2,000 Hz or less.

In addition, conventionally, a resin structure including a core layer in which a plurality of cells are arranged in parallel and skin layers disposed on both surfaces of the core layer has been proposed for various applications, and attempts have been made to impart sound absorbency and sound insulation to the resin structure. However, the conventional technology intended to give such a resin structure the sound absorbency or the sound insulation property is based on the premise that the skin layer is provided with communication holes through which the inside and outside of the cells constituting the core layer communicate with each other. Even in the case where the communication holes are provided on the skin layer as described above, the surface rigidity of the sheet having elasticity cannot be sufficiently ensured. As a result, since the value of $(k/m)^{1/2}/2\pi$ does not exceed 900 Hz or more, it is not possible to exhibit the excellent soundproofing performance particularly in a frequency range of 2000 Hz or less (see, for example, Comparative Example 18 described later). On the other hand, in the resin structure having the same structure as described above, technologies that are not based on the premise that the communication holes as described above are provided on the skin layer have also been proposed in the past, but does not relate to the sound absorption, the sound insulation, the soundproofing or the like. Some of these technologies are intended to be applied to applications requiring rigidity such as containers, shelves, pallets, and panels for the purpose of improving mechanical strength such as bending rigidity and bending strength. Furthermore, in another proposal using the same resin structure, since the skin layer is required to contain an impact resistance improving material for reducing the elastic modulus of the skin layer, the skin layer is highly likely not to correspond to the "elastic sheet" in the present invention. In addition, in another proposal using the same resin structure, a metal member whose thickness is about 0.05 to several mm is disposed as a skin layer, and a material whose rigidity is high is also used for the skin layer. For this reason, in the prior art related to the resin structure in which the communication holes are not provided on the skin layer, as a result that the value of the surface rigidity in the present invention becomes too large, it is considered that the value of $(k/m)^{1/2}/2\pi$ is so large that it cannot be measured (on the high frequency side).

Hereinafter, the constituent elements of the soundproofing material 10 will be described in more detail.

(Elastic Sheet)

There are no particular limitations on the constituent materials of the sheet having elasticity (corresponding to the latex rubber sheet 200 shown in FIG. 1), and various materials can be used as long as the constituent materials are materials having elasticity. In the present specification, the fact that the sheet "has elasticity" means that the sheet is made of a material whose value of the Young's modulus is in a range of 0.001 to 70 [GPa]. Note that the value of the Young's modulus can be measured according to JIS K7161-1 (2014) for resins. In addition, the Young's modulus of the metal can be measured according to JIS Z2241 (2011). Then, the Young's modulus of the rubber can be measured according to JIS Z6251 (2010). As the constituent materials of the sheet having elasticity, in addition to the latex rubber used in the above-described embodiment, rubber materials such as chloroprene rubber (CR), styrene-butadiene rubber (SBR), ethylene-propylene-diene rubber (EPDM), and acrylonitrile-butadiene rubber (NBR) can be used as well. In addition, a resin material, a metal material, a paper material, or the like may be used as the sheet having elasticity. In addition, a material having a buffer function such as air cushion may also be used. All of these materials including the rubber materials have high elasticity to the extent that the effects of the soundproofing material according to the present embodiment can be exhibited. Examples of the resin materials include polyethylene (for example, low density polyethylene, high density polyethylene, and the like), polyolefin resins such as polypropylene, a polyvinyl chloride resin, an acrylic resin, a methacrylic resin, an acrylonitrile-butadiene-styrene resin, a vinyl acetate resin, an ethylene-acetic acid vinyl resin, a styrene-butadiene resin, and the like. In addition, as the thermosetting resin, a silicone resin, a urethane resin, a melamine resin, a thermosetting acrylic resin, a urea resin, a phenol resin, a resorcin resin, an alkyl resorcin resin, an epoxy resin, thermosetting polyester, or the like can be used. Note that a urethane resin prepolymer, a urea resin prepolymer (initial condensate), a phenol resin prepolymer (initial condensate), a diallyl phthalate prepolymer, an acrylic oligomer, a polyvalent isocyanate, a methacrylic ester monomer, prepolymers such as a diallyl phthalate monomer, and resin precursors such as oligomers and monomers that produce these resins may be used. Examples of the metal materials include copper, aluminum, and the like. The constituent material of the sheet having elasticity is not limited thereto, and other materials may of course be used. Note that as the constituent materials of the sheet having elasticity, a rubber material is preferable, and of these, latex rubber or EPDM rubber is more preferable. By using these rubber materials as the constituent materials of the sheet having elasticity, the soundproofing effects by a soundproofing material according to the present invention can be suitably expressed. In addition, these rubber materials may be particularly preferred because of significantly contributing to low fuel consumption, particularly considering the application to vehicle applications in that these rubber materials are lightweight. In addition, from the viewpoint of cost reduction, polyolefin resins such as polypropylene are also preferable as the constituent material of the sheet having elasticity.

The film thickness of the sheet having elasticity is preferably 10 to 1000 μm and more preferably 100 to 500 μm, from the viewpoint of the soundproofing effect of the soundproofing material.

(Support Portion (Lattice-Like Structure))

The support portion partitions the sheet into partition portions (hermetically partitioned) while supporting the above-described elastic sheet. If the support portion has the configuration which can express such a function, there are no particular limitations on the specific configuration of the support portion. Although FIGS. 1 and 2 are described as having a large number of partition portions, even a single partition portion is within the scope of the present invention.

The constituent materials of the support portion are not particularly limited, and the conventionally known thermoplastic resins or thermosetting resins can be used in addition to the polyvinyl chloride resin used in the above-described embodiment. Further, the metal material or other materials may be used as the constituent materials of the support portion. All of these materials have physical properties suitable for holding the sheet having elasticity and partitioning the sheet into the partition portions.

Examples of the thermoplastic resins include polyethylene (for example, low density polyethylene, high density polyethylene, and the like), polyolefin resins such as polypropylene, an acrylic resin, a methacrylic resin, an acrylonitrile-butadiene-styrene resin, a vinyl acetate resin, an ethylene-acetic acid vinyl resin, a styrene-butadiene resin, and the like, in addition to a polyvinyl chloride resin. In addition, as the thermosetting resin, a urethane resin, a melamine resin, a thermosetting acrylic resin, a urea resin, a phenol resin, a resorcin resin, an alkyl resorcin resin, an epoxy resin, thermosetting polyester, or the like can be used. Note that a urethane resin prepolymer, a urea resin prepolymer (initial condensate), a phenol resin prepolymer (initial condensate), a diallyl phthalate prepolymer, an acrylic oligomer, a polyvalent isocyanate, a methacrylic ester monomer, prepolymers such as a diallyl phthalate monomer, and resin precursors such as oligomers and monomers that produce these resins may be used. Among these, the thermoplastic resin is preferably used from the viewpoint of easy molding, and a vinyl chloride resin and a polyolefin resin are particularly preferable because they are lightweight, excellent in durability, and inexpensive.

As described above, the support portion is preferably a lattice-like structure having a large number of continuously formed cylindrical cells. In this case, the support portion partitions the sheet having elasticity into a plurality of partition portions. In addition, it is more preferable that at least a part of the plurality of partition portions constitutes a regular arrangement structure in which a plurality of partition portions having the same outline shape are regularly arranged. By adopting such a configuration, it is possible to specifically express the soundproofing performance for sound waves in a desired frequency range by the presence of a large number of partition portions which are easily manufactured and have the same shape. At this time, from the viewpoint of further exhibiting the soundproofing performance, the ratio of the occupied area of the regular arrangement structure to the area of the sheet having elasticity is preferably 80 to 100%, more preferably 90 to 100%, still more preferably 95 to 100%, even still more preferably 98 to 100%, particularly preferably 99 to 100%, and most preferably 100%. Note that at least one lattice-like structure (support portion) for one sheet may be divided into a plurality of members. With such a configuration, it is preferable that the soundproofing material according to the present embodiment has flexibility as a whole. However, even if the support portion is not divided into a plurality of members, it is a preferred embodiment that the soundproofing material has flexibility as a whole. As described above, since the soundproofing material has flexibility, it is possible to dispose the soundproofing materials in the form that follows sound sources of various shapes, which is preferable.

The outline shape of the partition portion in the above-described regular arrangement structure (cross-sectional shape of the cylindrical cell in the cross section perpendicular to the extending direction of the lattice-like structure) is not limited to a regular hexagon as shown in FIGS. 1 to 3, and other shapes may be used. If a large number of cylindrical cells are disposed by continuously forming regular polygons having the same cross-sectional shape, a regular quadrangle (square) and a regular triangle can be adopted as the cross-sectional shape in addition to a regular hexagon. By adopting these shapes, it is possible to provide a support that is easy to manufacture and exhibits excellent strength.

Note that if the cross-section of the lattice-like structure is a pattern in which a plurality of regular polygons are regularly disposed, the cross section of the lattice-like structure can be configured to have the pattern by any combinations of (four regular triangles and one regular hexagon), (three regular triangles and two regular quadrangle (squares))×2 ways, (one regular triangle, two regular quadrangles (squares), and one regular hexagon), (two regular triangles and two regular hexagons), (one regular triangle and two regular dodecagons), (one regular quadrangle (square), one regular hexagon, and one regular dodecagon), and (one regular quadrangle (square) and two regular octagons) by an Archimedes' plane filling method. Among these, from the viewpoint of maximizing crushing strength per unit mass, as shown in FIGS. 1 to 3, it is most preferable that the cross-sectional shape of the cylindrical cell is a regular hexagon (that is, the lattice-like structure has a honeycomb structure).

The specific value is not particularly limited as long as the size of the cylindrical cell constituting the lattice-like structure satisfies Expression 1 described above. In a preferred embodiment where the lattice-like structure has a honeycomb structure, as shown in FIGS. 1 and 2, it is preferable that the size of the cylindrical cell (distance between the opposing parallel sides in the regular hexagon of the cross-sectional shape) is 6.0 mm or less. By having such a size, the excellent soundproofing performance can be exhibited. In addition, the size of the cylindrical cell (distance between the opposing parallel sides in a regular hexagon of a cross-sectional shape) may be 5.9 mm or less, 5.8 mm or less, 5.7 mm or less, 5.6 mm or less, 5.5 mm or less, 5.4 mm or less, 5.3 mm or less, 5.2 mm or less, 5.1 mm or less, 5.0 mm or less, 4.9 mm or less, 4.8 mm or less, 4.7 mm or less, 4.6 mm or less, 4.5 mm or less, 4.4 mm or less, 4.3 mm or less, 4.2 mm or less, 4.1 mm or less, 4.0 mm or less, and the like, and the smaller these numerical ranges, the better. Note that the lower limit of the size of the cylindrical cell is not particularly limited, but if the size of the cylindrical cell is too small, the mass of the lattice-like structure (furthermore, the soundproofing material) increases, and is preferably 2.0 mm or more.

In addition, the thickness of the wall of the cylindrical cell (distance t shown in FIG. 3) is preferably 10 to 150 μm and more preferably 30 to 100 μm.

In the embodiment shown in FIGS. 1 to 3, the lattice-like structure (support portion) is disposed only on one side of the sheet having elasticity. However, even in the form in which the lattice-like structures (support portions) are disposed on both surfaces of at least one elastic sheet, it is possible to exhibit the excellent soundproofing performance in the same manner. In this case, the forms of the lattice-like structures (support portions) disposed on both surfaces of the sheet having elasticity, respectively, may be the same or different from each other. Among these, it is preferable that the forms of the lattice-like structures (support portions) disposed on both surfaces of the sheet having elasticity, respectively, may be the same or different from each other. In addition, at this time, it is more preferable to dispose each lattice-like structure so that the shapes of the cylindrical cells of the lattice-like structures (support portions) are exactly overlapped on both surfaces of the sheet having elasticity. With such a configuration, there is an advantage that particularly excellent soundproofing performance can be exhibited.

On the other hand, the form in which the sheets having elasticity are disposed on both sides of at least one lattice-like structure (support portion) can also be adopted. Even with such a configuration, the excellent soundproofing performance can be exhibited. In this case, the forms of the sheets having elasticity disposed on both surfaces of the lattice-like structure (support portion), respectively, may be the same or different from each other. Among these, it is preferable that the forms of the sheets having elasticity disposed on both surfaces of the lattice-like structure (support portion), respectively, may be different from each other.

As proved in the column of Examples described later, in the present embodiment, as the height of the lattice-like structure (support portion) in the extending direction increases, particularly excellent soundproofing performance tends to be exhibited over the range of the low frequency range of 2000 Hz or less. From such a viewpoint, the lattice-like structure (support portion) is preferably a single structure whose height is uniform. In addition, in this case, the height (distance h shown in FIG. 1) of the lattice-like structure in the extending direction is preferably 5 mm or more, more preferably 6 mm or more, still more preferably 13 mm or more, even still more preferably 19 mm or more, particularly preferably 22 mm or more, and most preferably 25 mm or more.

The soundproofing material according to the present embodiment is preferably lightweight as described above. From this viewpoint, the surface density of the soundproofing material according to the present embodiment as a whole is preferably less than 3.24 $kg/m^2$, more preferably 2.0 $kg/m^2$ or less, still more preferably 1.5 $kg/m^2$ or less, and particularly preferably 1.0 $kg/m^2$ or less.

The soundproofing material according to the present embodiment can be suitably used for shielding noise from various sound sources. Among these, the soundproofing material according to the present embodiment can be configured to be very lightweight. The soundproofing material according to the present embodiment can be lightweight as described above, and therefore is preferably used by being mounted on a vehicle. In particular, the present invention is most preferably applied to the soundproofing application for noise generated from a portion (natural sound source), such as an engine, a transmission, or a drive system, that generates a loud sound. As an example of the application portions, the present invention can be applied to, for an engine compartment, an engine head cover, an engine body cover, a hood insulator, an insulator in front of a dash, a partition wall of an air box, an air cleaner of an air intake, a dust side duct, an under cover, and the like. In addition, the present invention can be applied to, for a cabin, a dash insulator, a dash panel, a floor carpet, a spacer, a door trim of a door, a soundproofing material in the door trim, a soundproofing material in a compartment, an instrument panel, an instrument center box, an instrument upper box, an air conditioner casing, a roof trim, a soundproofing material in the roof trim, a sun visor, an air conditioning duct for a rear seat, a cooling duct for a battery cooling system in a vehicle with which a battery is equipped, a cooling fan, a trim of a center console, a soundproofing material in a console, a parcel trim, a parcel panel, a headrest of a seat, a seat back of a front seat, a seat back of a rear seat, and the like. In addition, the present invention can be applied to, for a trunk, a trim of a trunk floor, a trunk board, a trim of a trunk side, a soundproofing material in the trim, a draft cover, and the like. In addition, the present invention can be applied to the inside of a vehicle skeleton or between panels, and can be applied to, for example, a trim of a pillar and a fender. Furthermore, the present invention can be applied to each member of a vehicle body, for example, an under cover under a floor, a fender protector, a back door, a wheel cover, an aerodynamic cover for the suspension, and the like.

Note that there are no particular limitations on the disposition form of the soundproofing material when the soundproofing material according to the present embodiment are disposed for the sound source. When the soundproofing material according to the present embodiment is disposed for the sound source, it is preferable to dispose the soundproofing material so that the sound source is positioned in the extending direction of the cylindrical cell constituting the lattice-like structure (support portion). In addition, when the soundproofing material is disposed in this way, the soundproofing material may be disposed so that the sheet having elasticity is positioned on the sound source side or disposed so that the opening of the cylindrical cell is positioned on the sound source side, but from the viewpoint of excellent soundproofing performance, the former disposition form is more preferable.

EXAMPLE

Hereinafter, the present invention will be described in more detail with reference to Examples. However, the technical scope of the present invention is not limited to the following examples.

<<Evaluation of Soundproofing Performance of Soundproofing Material>>

Figure 9:
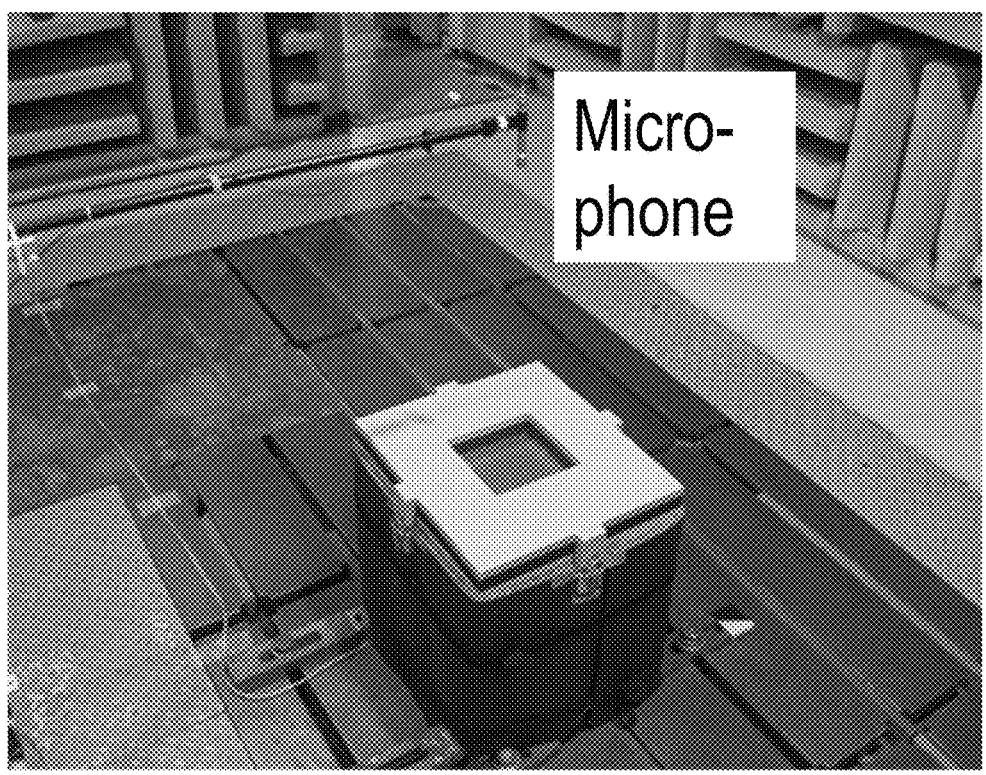
FIG. 9 is a photograph for describing a disposition of a measurement system (sound insulation box and microphone) used for evaluating the soundproofing performance in a column of an example described later.

Soundproofing performance for sound waves of each frequency was measured for a soundproofing material produced by the Examples and Comparative Examples to be described later. Specifically, a speaker (sound source) was disposed inside a sound insulation box made of iron metal pot as shown in FIG. 9, and a sample (soundproofing material) was disposed in an opening of the sound insulation box. Further, in order to prevent sound leakage from around the sample (soundproofing material) at the opening of the sound insulation box, a rubber sheet was disposed around the sample (soundproofing material). Then, by generating sound from the speaker (sound source) installed inside the sound insulation box and measuring an insertion loss [unit: dB] relative to the case where the sample (soundproofing material) is not disposed (control), the soundproofing performance was evaluated. It means that the larger the value of the insertion loss at a certain frequency, the better the soundproofing performance for the sound wave of the frequency. Note that unless otherwise specified in columns of the following Examples and Comparative Examples, the evaluation was made by disposing the soundproofing material so that the sheet having elasticity is positioned on a microphone side. Further, the sound source generation conditions were as follows:

Spectral level: White noise (100 to 8192 Hz)

$F_{max}$: 8192 Hz

Average value: Addition average of 300 times (measurement was performed 300 times while slightly shifting time in one-time measurement, and the addition average was set as the measured value)

Overlap: 75%.

<<Production of Soundproofing Material>>

(Effect of Acoustic Metamaterial)

Comparative Example 1-1

A sheet (film thickness: 0.25 mm) made of latex rubber as a sheet having elasticity was used as a soundproofing material of this Comparative Example as it is.

Comparative Example 1-2

A honeycomb structure (honeycomb support having a large number of regular hexagonal cross sections) (support thickness: 25 mm) made of polyvinyl chloride was used as the soundproofing material of this Comparative Example as it is. A size (distance between opposing parallel sides in a regular hexagon of a cross-sectional shape of the honeycomb structure; distance W shown in FIG. 3) of the cylindrical cell constituting the honeycomb structure was set to be 4 mm.

Comparative Example 1-3

A sheet (film thickness: 0.25 mm) made of latex rubber and a honeycomb structure (honeycomb support having a large number of regular hexagonal cross sections) (support thickness: 25 mm; cell size: 4 mm) made of polyvinyl chloride were laminated without being bonded to produce a soundproofing material of this Comparative Example.

Example 1

An opening cross section of a honeycomb structure (honeycomb support having a large number of regular hexagonal cross sections) (support thickness: 25 mm; cell size: 4 mm) made of polyvinyl chloride is hermetically bonded to one surface of a sheet (film thickness: 0.25 mm) made of latex rubber to produce a soundproofing material of this Example having the structure shown in FIG. 1.

Figure 10:
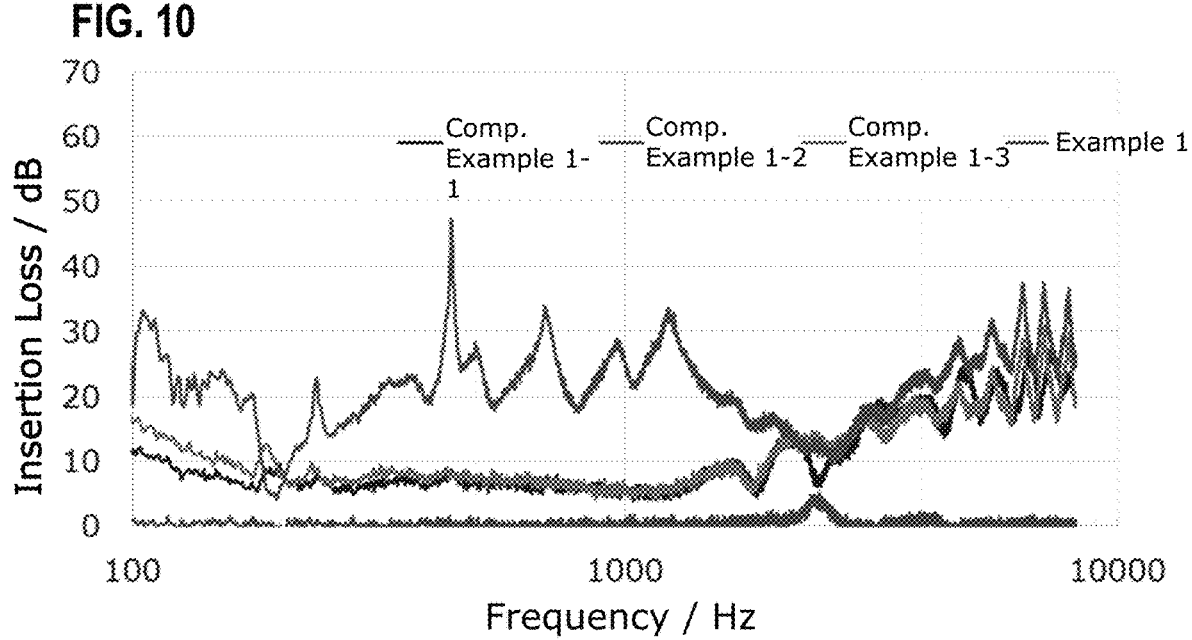
FIG. 10 is a graph showing results of measuring an insertion loss for a produced soundproofing material in a section according to examples described later.

Specifications of the above Example and Comparative Examples are shown in Table 1 below, and results of an insertion loss obtained by evaluating the soundproofing performance are shown in FIG. 10. As can be seen from these results, the soundproofing material according to the present invention exhibits the excellent soundproofing performance as compared with the case of a sheet alone or a honeycomb support alone. In addition, even if both of the sheet and the honeycomb support are provided, if they are not bonded simply by lamination, the honeycomb support which is the lattice-like structure (support portion) cannot support the sheet and the desired soundproofing performance is not exhibited.

Comparative Data Using General Soundproofing Material

Comparative Example 2-1 to Comparative Example 2-7

The conventionally known soundproofing material having the following materials was used in each Comparative Example.

Comparative Example 2-1: Aluminum plate
Comparative Example 2-2: Iron plate
Comparative Example 2-3: Miscellaneous felt
Comparative Example 2-4: Urethane foam
Comparative Example 2-5: Takapol (manufactured by Nihon Tokushu Toryo Co. Ltd.; felt+rubber sheet; rubber sheet is disposed so as to be positioned on a microphone side)
Comparative Example 2-6: Thinsulate (Thinsulate™; manufactured by 3M Co.)
Comparative Example 2-7: TECCELL T5 (manufactured by Gifu Plastic Industry Co., Ltd.; honeycomb sandwich panel).

Figure 11:
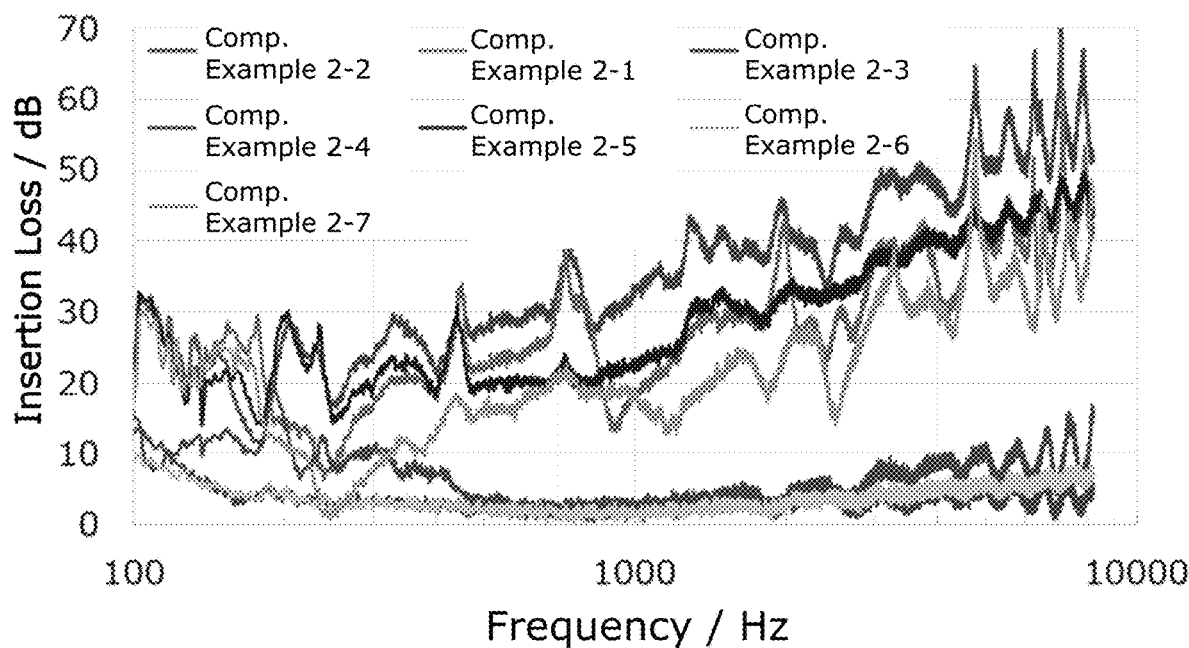
FIG. 11 is a graph showing results of measuring an insertion loss for a produced soundproofing material in a column according to examples described later.

Specifications of the above Comparative Examples are shown in Table 2 below, and results of an insertion loss obtained by evaluating the soundproofing performance are shown in FIG. 11. As can be seen from these results, the conventionally known soundproofing material cannot exhibit the soundproofing performance in a low frequency range, or even if possible, it is just expressing the performance in accordance with the mass law due to the large weight.

TABLE 1

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Comparative Example 1-1 | Latex sheet | Rubber sheet | 0.25 | 0.25 | — | — | — |
| Comparative Example 1-2 | PVC honeycomb support | Honeycomb support | 25 | 1.64 | PVC | 25 | 1.64 |
| Comparative Example 1-3 | Latex sheet + PVC honeycomb support | No bonding | 25.25 | 1.88 | PVC | 25 | 1.64 |
| Example 1 | Latex sheet + PVC honeycomb support | Bonding sheet and honeycomb support | 25.25 | 1.88 | PVC | 25 | 1.64 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Comparative Example 1-1 | — | Latex | 0.25 | 0.24 | — | — | |
| Comparative Example 1-2 | 4 | — | — | — | — | — | |
| Comparative Example 1-3 | 4 | Latex | 0.25 | 0.24 | — | — | Disposing soundproofing material so that sheet is positioned on microphone side |
| Example 1 | 4 | Latex | 0.25 | 0.24 | 82474 | 2935 | Disposing soundproofing material so that sheet is positioned on microphone side |

TABLE 2

|  | Soundproofing material | Structure | Overall thickness [mm] | Overall surface density [kg/m$^2$] | Remark |
|---|---|---|---|---|---|
| Comparative Example 2-1 | Aluminum plate | | 1 | 2.66 | |
| Comparative Example 2-2 | Iron plate | | 1 | 7.58 | |
| Comparative Example 2-3 | Miscellaneous felt | | 10 | 0.52 | |
| Comparative Example 2-4 | Urethane foam | | 10 | 0.45 | |
| Comparative Example 2-5 | Takapol | Felt + rubber sheet | 10 | 3.24 | Disposing soundproofing material so that rubber surface is positioned on microphone side |
| Comparative Example 2-6 | Thinsulate ™ | Cotton pad material | 16 | 0.14 | |
| Comparative Example 2-7 | TECCELL T5 | Honeycomb sandwich panel | 5.4 | 1.32 | |

Effect of Cell Size of Honeycomb Support (Latex Sheet)

Example 3

The soundproofing material (cell size: 4 mm) of Example 1 described above was used as a soundproofing material of this Example.

Comparative Example 3-1

A soundproofing material of this Comparative Example was produced in the same manner as in Example 3 described above except that the cell size was changed to 8 mm.

Comparative Example 3-2

A soundproofing material of this Comparative Example was produced in the same manner as in Example 3 described above except that the cell size was changed to 13 mm.

Figure 12:
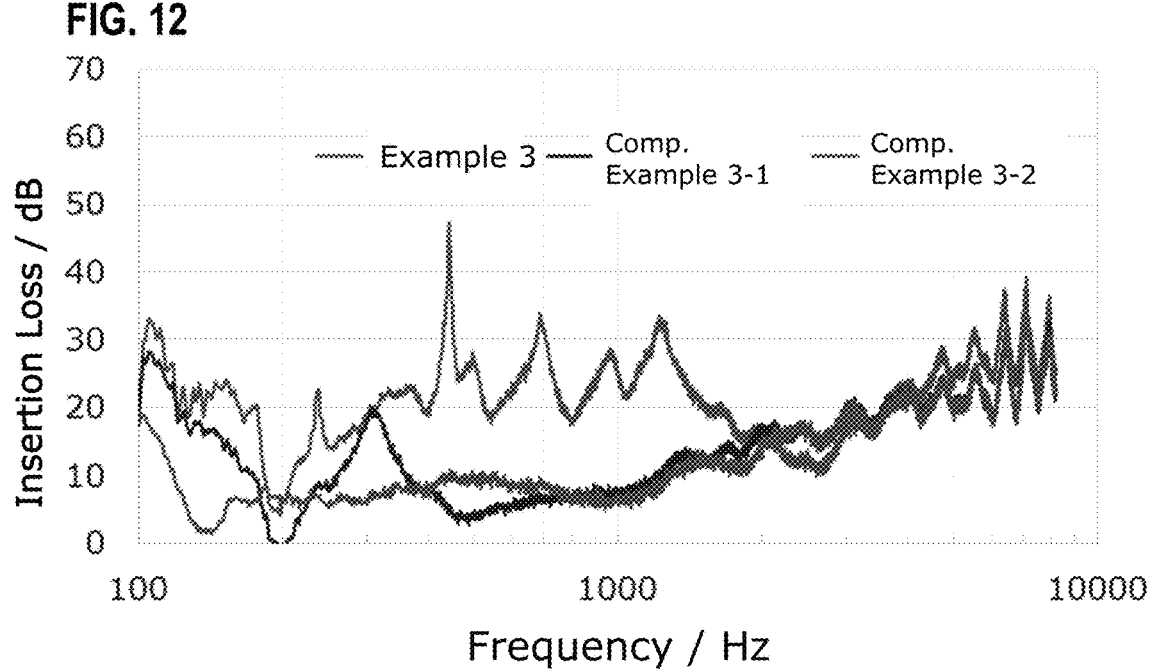
FIG. 12 is a graph showing results of measuring an insertion loss for a produced soundproofing material in a column according to examples described later.

Specifications of the above Examples and Comparative Examples are shown in Table 3 below, and results of an insertion loss obtained by evaluating soundproofing performance are shown in FIG. 12. As can be seen from these results, in the combination of this Example of the sheet and the lattice-like structure (support portion), when excellent soundproofing performance was exhibited only when the cell size is 4 mm while the desired soundproofing performance was not exhibited when the cell size is 8 mm or 13 mm. This is considered due to the fact that a value of $(k/m)^{1/2}/2\pi$ defined in the present invention is less than 900 Hz.

TABLE 3

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 3 | Latex sheet + PVC honeycomb support Cell size 4 mm | Bonding sheet and honeycomb support | 25.25 | 1.88 | PVC | 25 | 1.64 |
| Comparative Example 3-1 | Latex sheet + PVC honeycomb support Cell size 8 mm | Bonding sheet and honeycomb support | 25.25 | 0.96 | PVC | 25 | 0.72 |
| Comparative Example 3-2 | Latex sheet + PVC honeycomb support Cell size 13 mm | Bonding sheet and honeycomb support | 25.25 | 1.1 | PVC | 25 | 0.86 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 3 | 4 | Latex | 0.25 | 0.24 | 82474 | 2935 | Corresponding to Example 1 |
| Comparative Example 3-1 | 8 | Latex | 0.25 | 0.24 | 5155 | 734 | |
| Comparative Example 3-2 | 13 | Latex | 0.25 | 0.24 | 739 | 278 | |

Effect of Thickness of Sheet (Latex Sheet)

Example 4-1

The soundproofing material (film thickness of latex sheet: 0.25 mm) of Example 1 described above was used as a soundproofing material of this Example.

Example 4-2

A soundproofing material of this Example was produced in the same manner as in Example 3 described above except that the film thickness of the latex sheet was changed to 0.4 mm.

Figure 13:
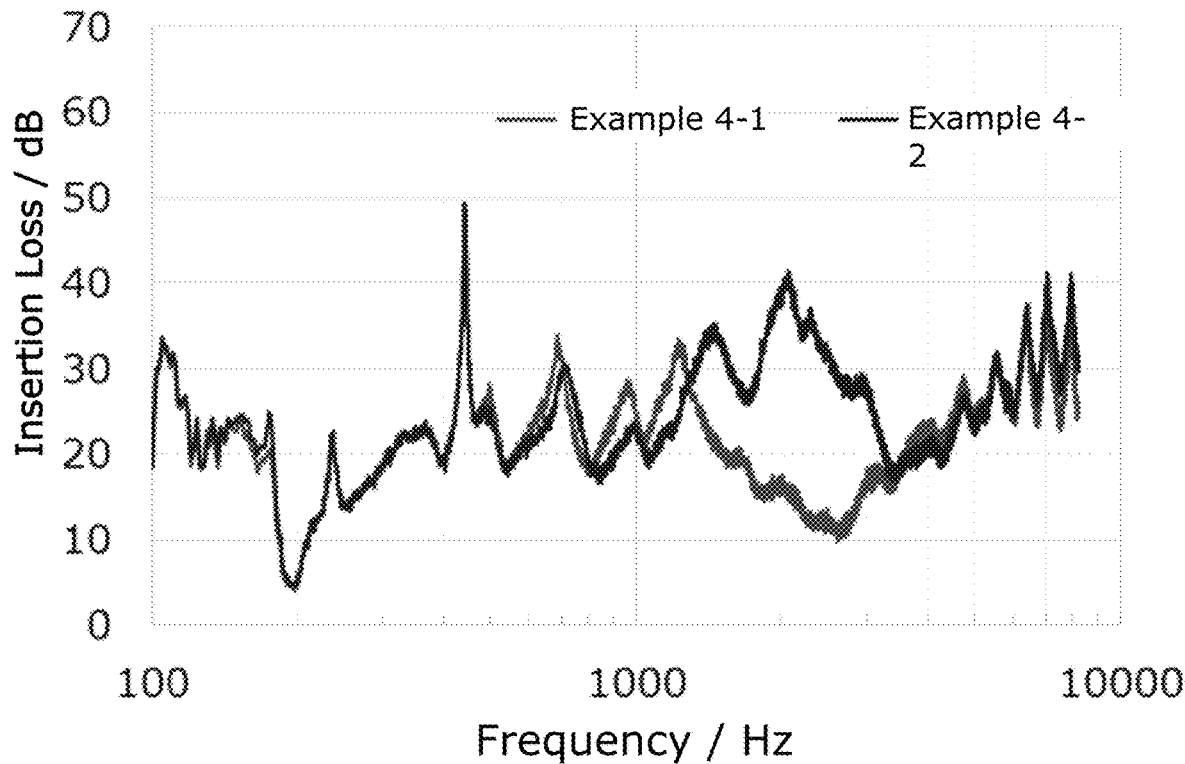
FIG. 13 is a graph showing results of measuring an insertion loss for a produced soundproofing material in a column according to examples described later.

Specifications of the above Example are shown in Table 4 below, and results of an insertion loss obtained by evaluating soundproofing performance are shown in FIG. 13. As can be seen from these results, the insertion loss in a specific frequency range can be improved by changing the film thickness of the sheet having elasticity.

Example 5-3

A soundproofing material of this Example was produced in the same manner as in Example 5-2 described above except that the sheet having elasticity was changed to an ethylene-propylene-diene rubber (EPDM) sheet whose film thickness is 0.4 mm.

Example 5-4

A soundproofing material of this Example was produced in the same manner as in Example 5-1 described above except that the sheet having elasticity was changed to a chloroprene rubber (CR) sheet whose film thickness is 0.25 mm.

Example 5-5

A soundproofing material of this Example was produced in the same manner as in Example 5-1 described above except that the sheet having elasticity was changed to a styrene-butadiene rubber (SBR) sheet whose film thickness is 0.45 mm and the film thickness was changed to 0.45 mm.

TABLE 4

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 4-1 | Latex sheet + PVC honeycomb support Film thickness of sheet 0.25 mm | Bonding sheet and honeycomb support | 25.25 | 1.88 | PVC | 25 | 1.64 |
| Example 4-2 | Latex sheet + PVC honeycomb support Film thickness of sheet 0.4 mm | Bonding sheet and honeycomb support | 25.4 | 2.03 | PVC | 25 | 1.64 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 4-1 | 4 | Latex | 0.25 | 0.24 | 82474 | 2935 | Corresponding to Example 1 |
| Example 4-2 | 4 | Latex | 0.4 | 0.39 | 337812 | 4696 | |

Example Using Various Kinds of Rubber Sheets as Elastic Sheet

Example 5-1

The soundproofing material (latex sheet; sheet film thickness 0.25 mm) of Example 4-1 (that is, Example 1) described above was used as a soundproofing material of this Example.

Example 5-2

The soundproofing material (latex sheet; sheet film thickness 0.4 mm) of Example 4-2 described above was used as a soundproofing material of this Example.

Example 5-6

A soundproofing material of this Example was produced in the same manner as in Example 5-2 described above except that the sheet having elasticity was changed to a silicone resin sheet whose film thickness is 0.4 mm.

Figure 14:
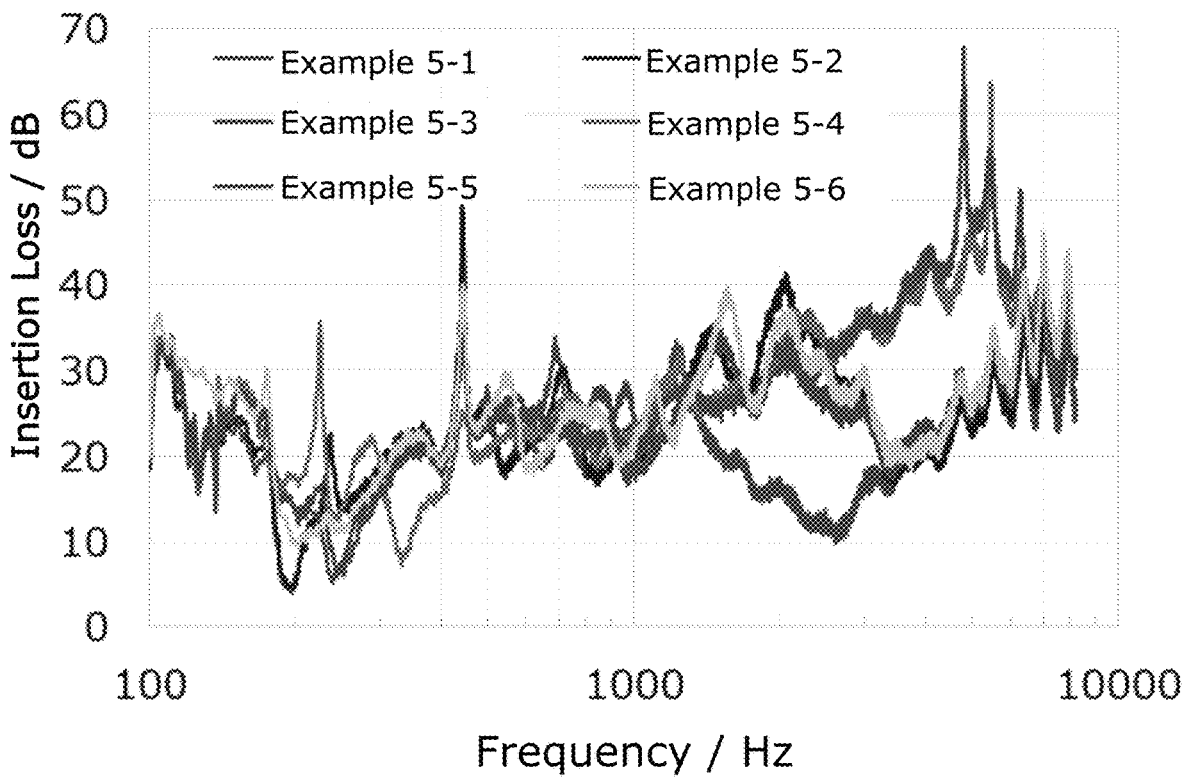
FIG. 14 is a graph showing results of measuring an insertion loss for a produced soundproofing material in a column according to examples described later.

Specifications of the above Example are shown in Table 5 below, and results of an insertion loss obtained by evaluating soundproofing performance are shown in FIG. 14. As can be seen from these results, it is possible to change the value of the insertion loss depending on the material of the sheet having elasticity.

TABLE 5

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 5-1 | Latex sheet + PVC honeycomb support Film thickness of sheet 0.25 mm | Bonding sheet and honeycomb support | 25.25 | 1.88 | PVC | 25 | 1.64 |
| Example 5-2 | Latex sheet + PVC honeycomb support Film thickness of sheet 0.4 mm | Bonding sheet and honeycomb support | 25.4 | 2.03 | PVC | 25 | 1.64 |
| Example 5-3 | EPDM sheet + PVC honeycomb support Film thickness of sheet 0.4 mm | Bonding sheet and honeycomb support | 25.4 | 1.98 | PVC | 25 | 1.64 |
| Example 5-4 | CR sheet + PVC honeycomb support Film thickness of sheet 0.25 mm | Bonding sheet and honeycomb support | 25.25 | 1.93 | PVC | 25 | 1.64 |
| Example 5-5 | SBR sheet + PVC honeycomb support Film thickness of sheet 0.45 mm | Bonding sheet and honeycomb support | 25.45 | 2.07 | PVC | 25 | 1.64 |
| Example 5-6 | Silicone sheet + PVC honeycomb support Film thickness of sheet 0.4 mm | Bonding sheet and honeycomb support | 25.4 | 2.03 | PVC | 25 | 1.64 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 5-1 | 4 | Latex | 0.25 | 0.24 | 82474 | 2935 | Corresponding to Example 4-1 |
| Example 5-2 | 4 | Latex | 0.4 | 0.39 | 337812 | 4696 | Corresponding to Example 4-2 |
| Example 5-3 | 4 | EPDM | 0.4 | 0.34 | 350919 | 5083 | |
| Example 5-4 | 4 | CR | 0.25 | 0.29 | 51404 | 2128 | |
| Example 5-5 | 4 | SBR | 0.45 | 0.43 | 299789 | 4215 | |
| Example 5-6 | 4 | Silicone | 0.4 | 0.39 | 210551 | 3708 | |

Example Using Various Kinds of Rubber-Coated Cloths as Elastic Sheet

Example 6-1

A soundproofing material of this Example was produced in the same manner as Example 5-1 (that is, Example 1) described above except that the material of the sheet having elasticity was changed to a thinning rubber-coated cloth (laminate of polyester (PEs) base fabric of 84 dtex and chlorosulfonated polyethylene (CSM) rubber) whose film thickness is 0.2 mm.

Example 6-2

A soundproofing material of this Example was produced in the same manner as Example 6-1 described above except that the material of the sheet having elasticity was changed to a thinning rubber-coated cloth (laminate of nylon (polyamide (PA)) base fabric of 78 dtex and chloroprene (CR) rubber) whose film thickness is 0.15 mm.

Example 6-3

A soundproofing material of this Example was produced in the same manner as Example 6-1 described above except that the material of the sheet having elasticity was changed to a coated cloth (laminate of nylon (polyamide (PA)) base fabric of 235 dtex and thermoplastic polyurethane elastomer (TPU)) whose film thickness is 0.3 mm.

Example 6-4

A soundproofing material of this Example was produced in the same manner as Example 6-1 described above except that the material of the sheet having elasticity was changed to a coated cloth (laminate of polyester (PEs) base fabric of 84 dtex and thermoplastic polyurethane elastomer (TPU)) whose film thickness is 0.2 mm.

Example 6-5

A soundproofing material of this Example was produced in the same manner as Example 6-1 described above except that the material of the sheet having elasticity was changed to an oil-proof rubber-coated cloth (laminate of polyester (PEs) base fabric of 84 dtex and acrylonitrile-butadiene rubber (NBR)) whose film thickness is 0.15 mm.

Figure 15:
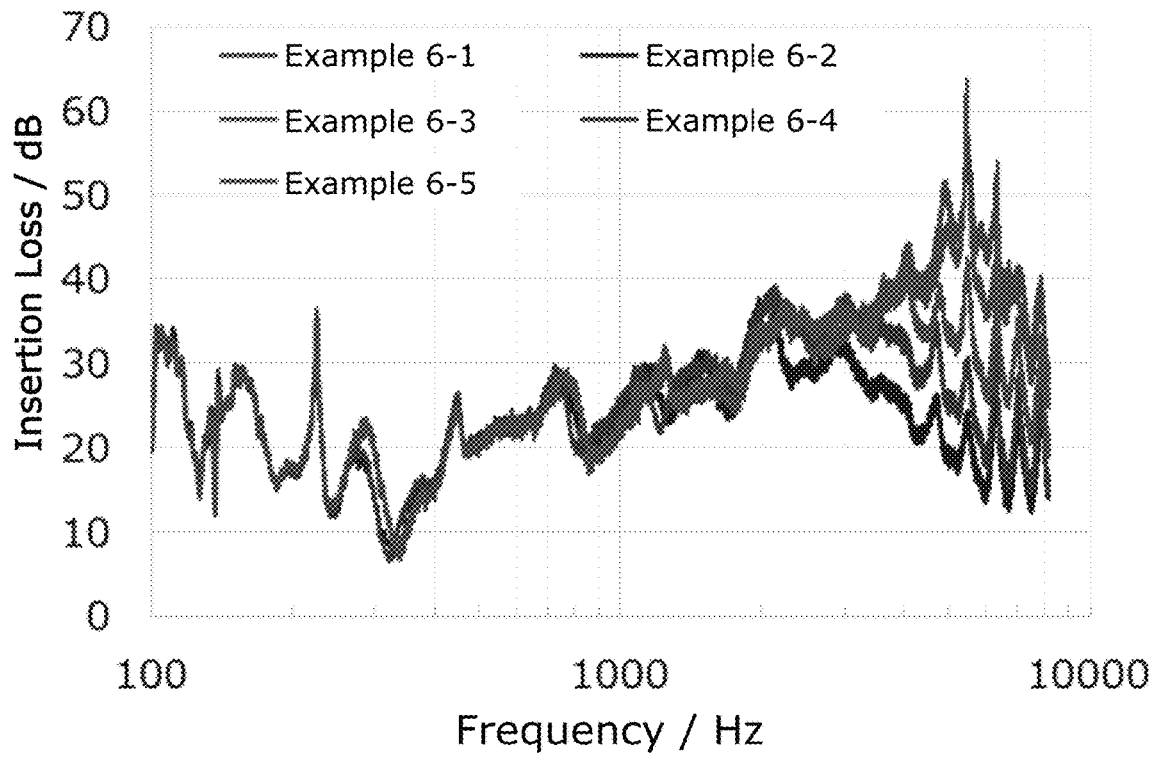
FIG. 15 is a graph showing results of measuring an insertion loss for a produced soundproofing material in a column according to examples described later.

Specifications of the above Example are shown in Table 6 below, and results of an insertion loss obtained by evaluating soundproofing performance are shown in FIG. 15. As can be seen from these results, it was found that there is little difference in an insertion loss in a low frequency range when various coated cloths are used, but there is a difference in an insertion loss in a high frequency range.

TABLE 6

| Soundproofing material | | Structure | Overall thickness [mm] | Overall surface density [kg/m$^2$] | Support material | Support thickness [mm] | Surface density of support [kg/m$^2$] |
|---|---|---|---|---|---|---|---|
| Example 6-1 | Thinning rubber-coated cloth (CSM + PEs) + PVC honeycomb support | Bonding sheet and honeycomb support | 25.2 | 1.96 | PVC | 25 | 1.64 |
| Example 6-2 | Thinning rubber-coated cloth (CR + PA) + PVC honeycomb support | Bonding sheet and honeycomb support | 25.15 | 1.8 | PVC | 25 | 1.64 |
| Example 6-3 | Coated cloth (TPU + PA) + PVC honeycomb support | Bonding sheet and honeycomb support | 25.3 | 1.97 | PVC | 25 | 1.64 |
| Example 6-4 | Coated cloth (TPU + PEs) + PVC honeycomb support | Bonding sheet and honeycomb support | 25.2 | 1.86 | PVC | 25 | 1.64 |
| Example 6-5 | Oil-proof rubber-coated cloth (NBR + PEs) + PVC honeycomb support | Bonding sheet and honeycomb support | 25.15 | 1.87 | PVC | 25 | 1.64 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 6-1 | 4 | CSM + PEs | 0.2 | 0.32 | 2643644 | 11858 | Base fabric: polyester (PEs) 84 dtex |
| Example 6-2 | 4 | CR + PA | 0.15 | 0.16 | 495683 | 7664 | Base fabric: nylon (PA) 78 dtex |
| Example 6-3 | 4 | TPU + PA | 0.3 | 0.33 | 1958255 | 21235 | Base fabric: nylon (PA) 235 dtex |
| Example 6-4 | 4 | TPU + PEs | 0.2 | 0.22 | 783302 | 9551 | Base fabric: polyester (PEs) 84 dtex |
| Example 6-5 | 4 | NBR + PEs | 0.15 | 0.23 | 1321822 | 12000 | Base fabric: polyester (PEs) 84 dtex |

Effect of Thickness of Honeycomb Support

Comparative Example 7-1

The soundproofing material (latex sheet; no honeycomb support) of Comparative Example 1-1 described above was used as a soundproofing material of this Comparative Example.

Example 7-1

The soundproofing material (thickness of honeycomb support: 25 mm) of Example 1 described above was used as a soundproofing material of this Example.

Example 7-2

A soundproofing material of this Example was produced in the same manner as in Example 7-1 described above except that the thickness of the honeycomb support was changed to 12.5 mm.

Example 7-3

A soundproofing material of this Example was produced in the same manner as in Example 7-1 described above except that the thickness of the honeycomb support was changed to 6 mm.

Comparative Example 7-2

The soundproofing material (honeycomb sandwich panel) of Comparative Example 2-7 described above was used as a soundproofing material of this Comparative Example.

Figure 16:
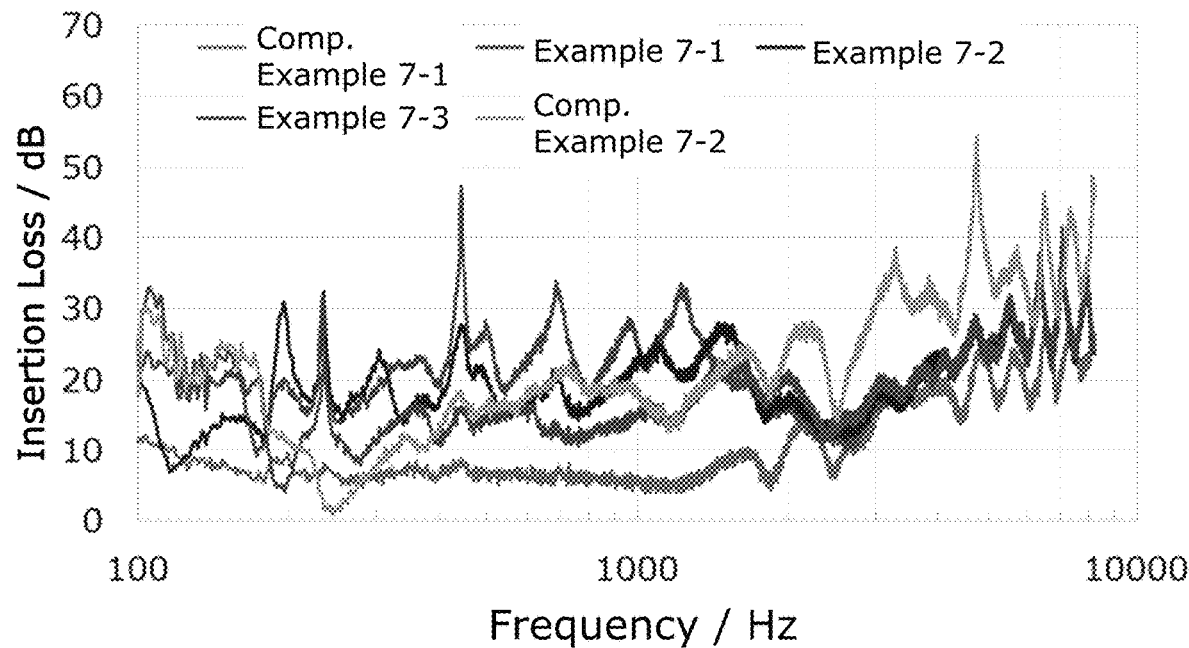
FIG. 16 is a graph showing results of measuring an insertion loss for a produced soundproofing material in a column according to examples described later.

Specifications of the above Examples and Comparative Examples are shown in Table 7 below, and results of an insertion loss obtained by evaluating soundproofing performance are shown in FIG. 16. As can be seen from these results, it is possible to change the value of the insertion loss depending on a thickness of a honeycomb support which is a lattice-like structure (support portion).

TABLE 7

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Comparative Example 7-1 | Latex sheet | — | 0.25 | 0.25 | — | — | — |
| Example 7-1 | Latex sheet + PVC honeycomb support Support thickness 25 mm | Bonding sheet and honeycomb support | 25.25 | 1.88 | PVC | 25 | 1.64 |
| Example 7-2 | Latex sheet + PVC honeycomb support Support thickness 12.5 mm | Bonding sheet and honeycomb support | 12.75 | 1.07 | PVC | 12.5 | 0.83 |
| Example 7-3 | Latex sheet + PVC honeycomb support Support thickness 6 mm | Bonding sheet and honeycomb support | 6.25 | 0.62 | PVC | 6 | 0.38 |
| Comparative Example 7-2 | TECCELL 75 | Honeycomb sandwich panel | 5.4 | 1.32 | — | — | — |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Comparative Example 7-1 | — | Latex | 0.25 | 0.24 | — | — | Corresponding to Comparative Example 1-1 |
| Example 7-1 | 4 | Latex | 0.25 | 0.24 | 82474 | 2935 | Corresponding to Example 1 |
| Example 7-2 | 4 | Latex | 0.25 | 0.24 | 82474 | 2935 | |
| Example 7-3 | 4 | Latex | 0.25 | 0.24 | 82474 | 2935 | |
| Comparative Example 7-2 | — | — | — | — | — | — | Corresponding to Comparative Example 2-7 |

Effect of Disposition Form of Soundproofing Material

Example 8-1

The soundproofing material of Example 1 described above was used as a soundproofing material of this Example, and the soundproofing performance was evaluated by disposing the soundproofing material so that the sheet having elasticity is positioned on a microphone side in the same manner as in Example 1.

Example 8-2

The support (thickness: 25 mm) of the soundproofing material of Example 1 described above was bisected in a thickness direction, and the bisected supports are each bonded to both surfaces of a sheet having elasticity (latex sheet) to produce a soundproofing material of this Example.

Example 8-3

The soundproofing material of Example 1 described above was used as a soundproofing material of this Example. However, a disposition form of the soundproofing material was reversed from that in Example 1 at the time of evaluating the soundproofing performance, and the soundproofing material was disposed so that the honeycomb support is positioned on a microphone side (elastic sheet is positioned on a speaker side) to perform the evaluation of the soundproofing performance.

Figure 17:
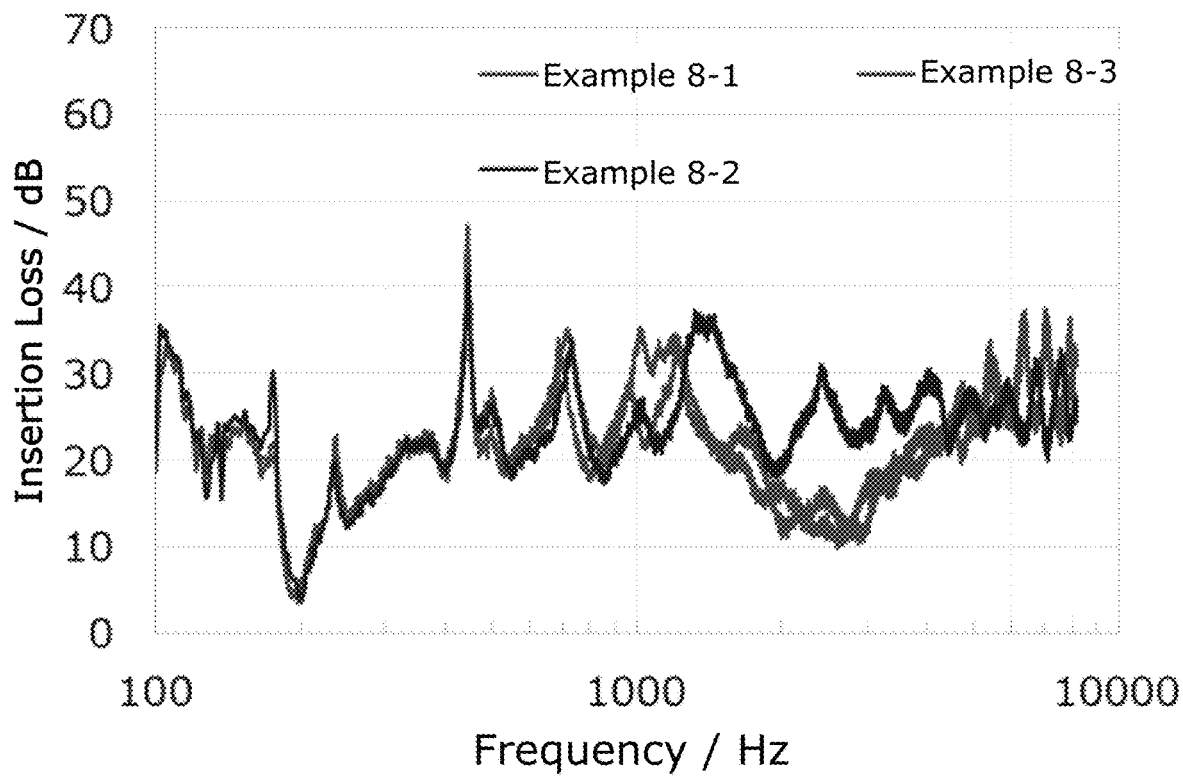
FIG. 17 is a graph showing results of measuring an insertion loss for a produced soundproofing material in a column according to examples described later.

Specifications of the above Example are shown in Table 8 below, and results of an insertion loss obtained by evaluating the soundproofing performance are shown in FIG. 17. As can be seen from these results, by changing the disposition form of the soundproofing material and the disposition form of the sheet and the lattice-like structure (support portion) in the soundproofing material, the insertion loss in the frequency range of 1000 Hz or more can be changed.

TABLE 8

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 8-1 | Latex sheet + PVC honeycomb support Support thickness 25 mm | Bonding sheet and honeycomb support | 25.25 | 1.88 | PVC | 25 | 1.64 |

TABLE 8-continued

| | | | | | | | |
|---|---|---|---|---|---|---|---|
| Example 8-2 | Latex sheet + PVC honeycomb support Support thickness 25 mm (12.5 mm × 2) | Bonding sheet and honeycomb support | 25.25 | 1.9 | PVC | 25 | 1.66 |
| Example 8-3 | Latex sheet + PVC honeycomb support Support thickness 25 mm | Bonding sheet and honeycomb support | 25.25 | 1.88 | PVC | 25 | 1.64 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 8-1 | 4 | Latex | 0.25 | 0.24 | 82474 | 2935 | Corresponding to Example 1 (disposing soundproofing material so that sheet is positioned on microphone side) |
| Example 8-2 | 4 | Latex | 0.25 | 0.24 | 82474 | 2935 | Disposing honeycomb support on both sides of sheet |
| Example 8-3 | 4 | Latex | 0.25 | 0.24 | 82474 | 2935 | Disposing soundproofing material so that sheet is positioned on speaker side |

Example Using Various Kinds of Plastic (Resin) Sheets as Elastic Sheet

Example 9-1

The soundproofing material (latex sheet; sheet film thickness 0.25 mm) of Example 4-1 (that is, Example 1) described above was used as a soundproofing material of this Example.

Example 9-2

A soundproofing material of this Example was produced in the same manner as in Example 9-1 described above except that the sheet having elasticity was changed to a rigid polyvinyl chloride (PVC) sheet whose film thickness is 0.2 mm.

Example 9-3

A soundproofing material of this Example was produced in the same manner as in Example 9-1 described above except that the sheet having elasticity was changed to a low density polyethylene (LDPE) sheet whose film thickness is 0.08 mm.

Example 9-4

A soundproofing material of this Example was produced in the same manner as in Example 9-1 described above except that the sheet having elasticity was changed to a rigid polypropylene (PP) sheet whose film thickness is 1 mm.

Figure 18:
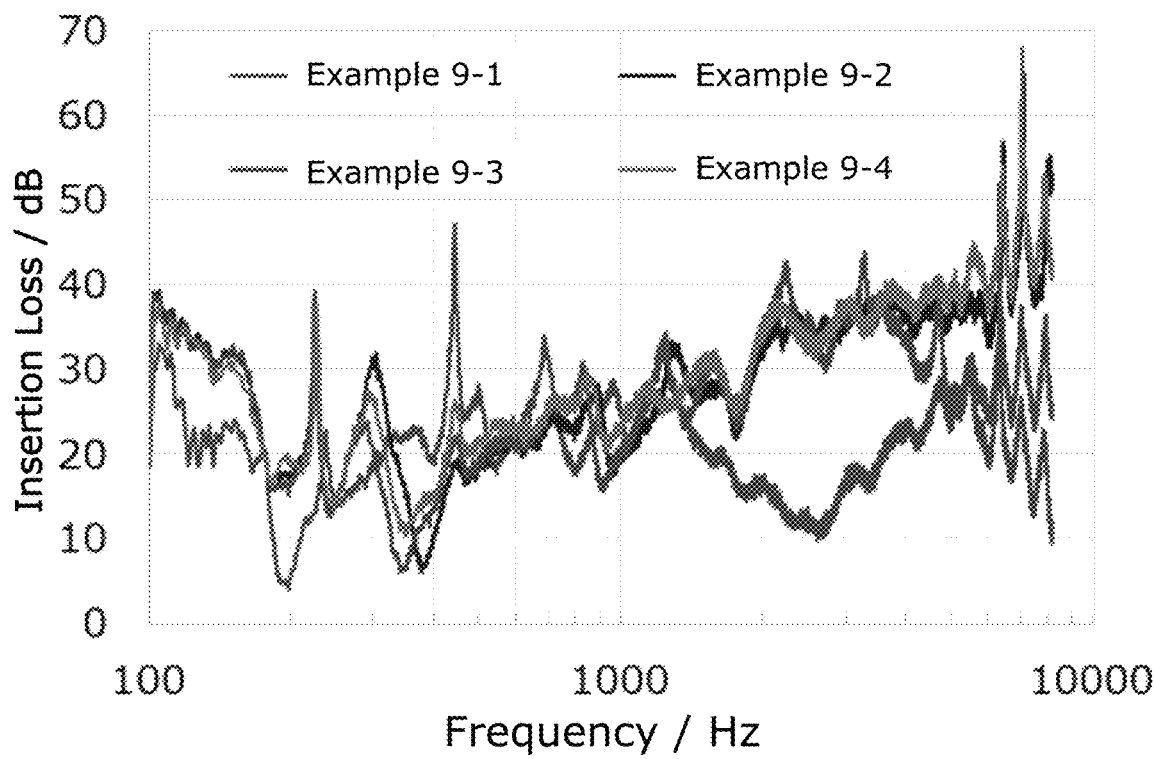
FIG. 18 is a graph showing results of measuring an insertion loss for a produced soundproofing material in a column according to examples described later.

Specifications of the above Example are shown in Table 9 below, and results of an insertion loss obtained by evaluating soundproofing performance are shown in FIG. 18. As can be seen from these results, even when a sheet made of various plastics (resins) is used as the sheet having elasticity, it is possible to exhibit excellent soundproofing performance as in the case of using rubber materials such as latex sheet.

TABLE 9

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 9-1 | Latex sheet + PVC honeycomb support Film thickness of sheet 0.25 mm | Bonding sheet and honeycomb support | 25.25 | 1.88 | PVC | 25 | 1.64 |
| Example 9-2 | Rigid PVC sheet + PVC honeycomb support Film thickness of sheet 0.2 mm | Bonding sheet and honeycomb support | 25 | 1.92 | PVC | 25 | 1.64 |

TABLE 9-continued

| | | | | | | | |
|---|---|---|---|---|---|---|---|
| Example 9-3 | LDPE sheet + PVC honeycomb support Film thickness of sheet 0.08 mm | Bonding sheet and honeycomb support | 25.08 | 1.71 | PVC | 25 | 1.64 |
| Example 9-4 | PP sheet + PVC honeycomb support Film thickness of sheet 1 mm | Bonding sheet and honeycomb support | 26 | 2.54 | PVC | 25 | 1.64 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 9-1 | 4 | Latex | 0.25 | 0.24 | 82474 | 2935 | Corresponding to Example 1 |
| Example 9-2 | 4 | Rigid PVC | 0.2 | 0.28 | 24993154 | 47550 | |
| Example 9-3 | 4 | LDPE | 0.08 | 0.07 | 518280 | 13356 | |
| Example 9-4 | 4 | PP | 1 | 0.9 | 1958254841 | 234765 | |

Example Using Other Various Kinds of Materials as Elastic Sheet

Example 10-1

The soundproofing material (latex sheet; sheet film thickness 0.25 mm) of Example 4-1 (that is, Example 1) described above was used as a soundproofing material of this Example.

Example 10-2

A soundproofing material of this Example was produced in the same manner as in Example 10-1 described above except that the sheet having elasticity was changed to an aluminum foil whose film thickness is 0.012 mm.

Example 10-3

A soundproofing material of this Example was produced in the same manner as in Example 10-1 described above except that the sheet having elasticity was changed to drawing paper whose film thickness is 0.25 mm.

Example 10-4

A soundproofing material of this Example was produced in the same manner as in Example 10-1 described above except that the sheet having elasticity was changed to air cushion.

Figure 19:
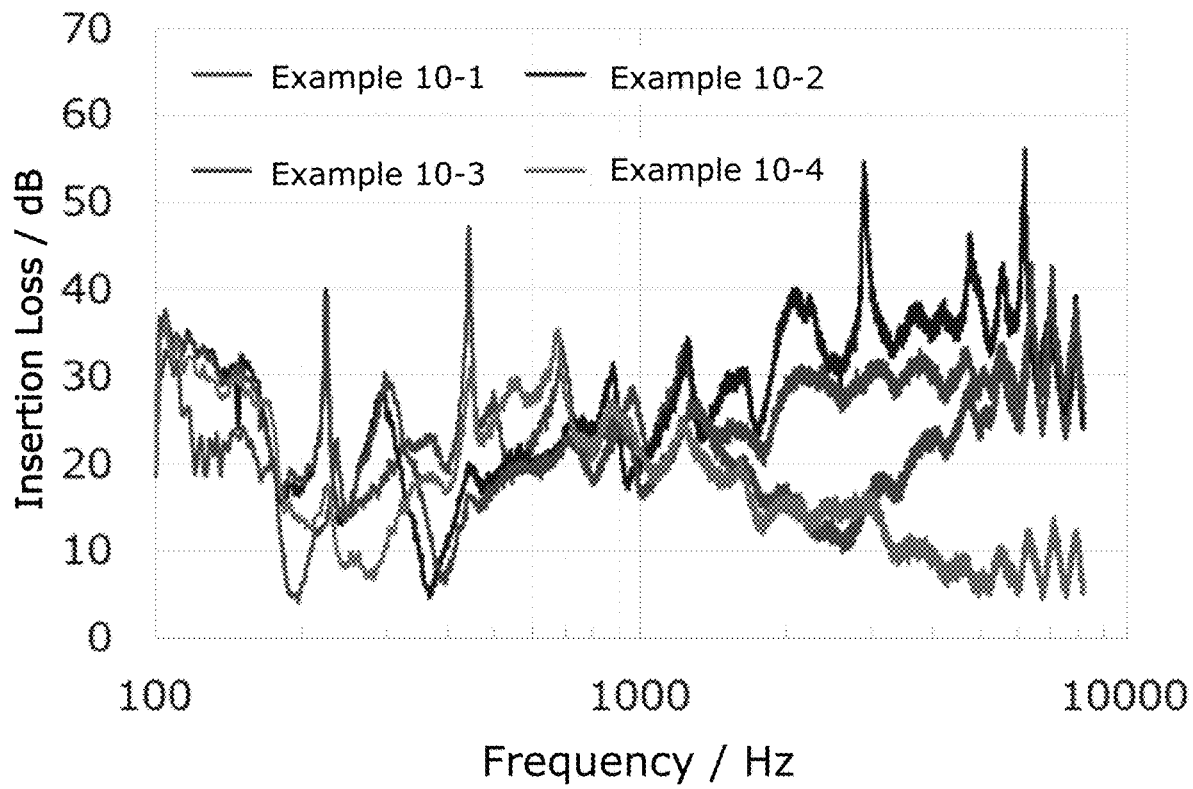
FIG. 19 is a graph showing results of measuring an insertion loss for a produced soundproofing material in a column according to examples described later.

Specifications of the above Example are shown in Table 10 below, and results of an insertion loss obtained by evaluating soundproofing performance are shown in FIG. 19. As can be seen from these results, even when various kinds of materials (metal material, paper material, and the like) are used as the sheet having elasticity, it is possible to exhibit excellent soundproofing performance as in the case of using rubber materials such as latex sheet. Note that it was found that even when the air cushion was used as a sheet, the soundproofing performance in the low frequency range was excellent, but the soundproofing performance in the high frequency range tended to decrease.

TABLE 10

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 10-1 | Latex sheet + PVC honeycomb support Film thickness of sheet 0.25 mm | Bonding sheet and honeycomb support | 25.25 | 1.88 | PVC | 25 | 1.64 |
| Example 10-2 | Aluminum foil + PVC honeycomb support Film thickness of sheet 0.012 mm | Bonding sheet and honeycomb support | 25.01 | 1.67 | PVC | 25 | 1.64 |
| Example 10-3 | Drawing paper + PVC honeycomb support Film thickness of sheet 0.25 mm | Bonding sheet and honeycomb support | 25.25 | 1.79 | PVC | 25 | 1.64 |
| Example 10-4 | Air cushion + PVC honeycomb support | Bonding sheet and honeycomb support | — | 1.69 | PVC | 25 | 1.64 |

TABLE 10-continued

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 10-1 | 4 | Latex | 0.25 | 0.24 | 82474 | 2935 | |
| Example 10-2 | 4 | Al | 0.012 | 0.03 | 110184 | 9281 | |
| Example 10-3 | 4 | Drawing paper | 0.25 | 0.15 | 57815 | 76537 | |
| Example 10-4 | 4 | Air cushion | — | 0.05 | 27331 | 5008 | |

Example Using Aluminum Honeycomb Support

Example 11-1

The soundproofing material (PVC honeycomb support whose cell size is 4 mm) of Example 1 described above was used as a soundproofing material of this Example.

Example 11-2

A soundproofing material of this Example was produced in the same manner as in Example 11-1 described above except that a honeycomb support was changed to an aluminum honeycomb support whose cell size is 3.2 mm.

Example 11-3

A soundproofing material of this Example was produced in the same manner as in Example 11-1 described above except that a honeycomb support was changed to an aluminum honeycomb support whose cell size is 6.3 mm.

Figure 20:
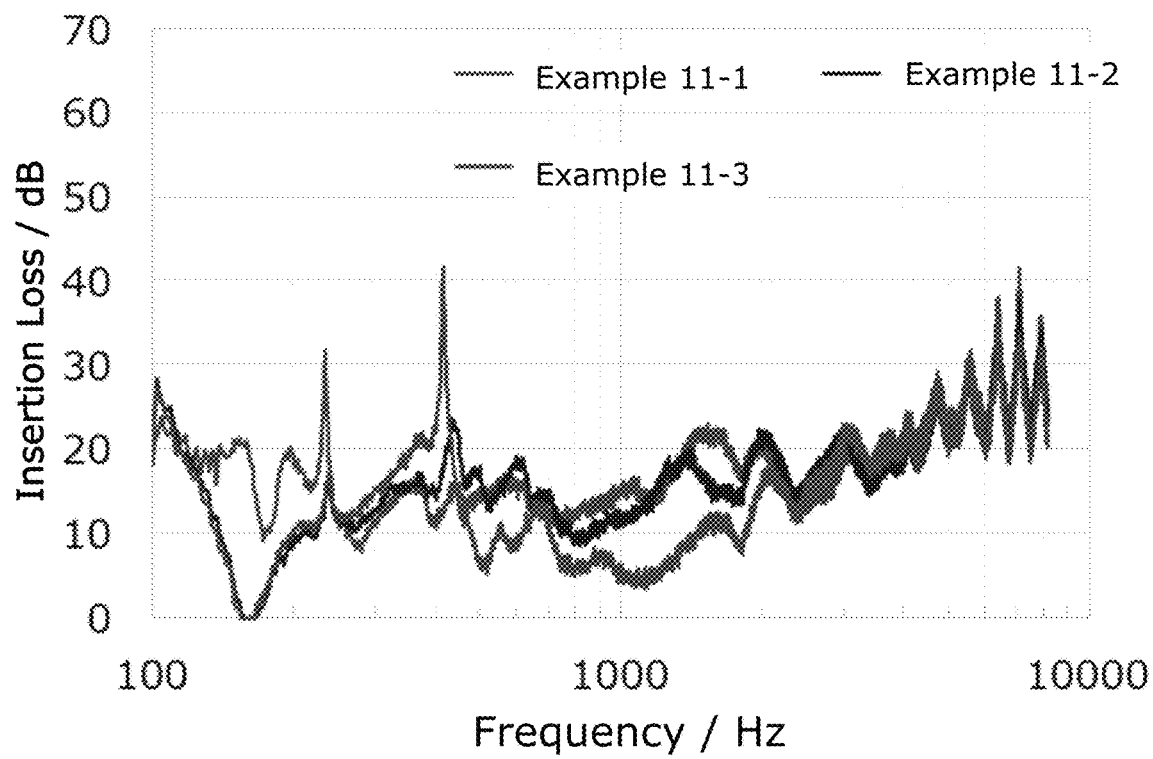
FIG. 20 is a graph showing results of measuring an insertion loss for a produced soundproofing material in a column according to examples described later.

Specifications of the above Example are shown in Table 11 below, and results of an insertion loss obtained by evaluating soundproofing performance are shown in FIG. 20. As can be seen from these results, even when the aluminum honeycomb support is used as the lattice-like structure (support portion), the excellent soundproofing performance can be exhibited similarly. It is also possible to change the frequency range in which the soundproofing performance is exhibited by changing the cell size.

TABLE 11

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 11-1 | Latex sheet + PVC honeycomb support Cell size 4 mm | Bonding sheet and honeycomb support | 6.25 | 0.62 | PVC | 6 | 0.38 |
| Example 11-2 | Latex sheet + aluminum honeycomb support Cell size 3.2 mm | Bonding sheet and honeycomb support | 6.25 | 0.56 | Al | 6 | 0.32 |
| Example 11-3 | Latex sheet + aluminum honeycomb support Cell size 6.3 mm | Bonding sheet and honeycomb support | 6.25 | 0.55 | Al | 6 | 0.31 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 11-1 | 4 | Latex | 0.25 | 0.25 | 82474 | 2935 | Corresponding to Example 1 |
| Example 11-2 | 3.2 | Latex | 0.25 | 0.25 | 201352 | 4586 | |
| Example 11-3 | 6.3 | Latex | 0.25 | 0.25 | 13403 | 1183 | |

Example of Changing Thickness of Aluminum Honeycomb Support

Example 12-1

The soundproofing material (aluminum honeycomb support whose thickness is 6 mm) of Example 11-3 described above was used as a soundproofing material of this Example.

Example 12-2

A soundproofing material of this Example was produced in the same manner as in Example 12-1 described above except that the thickness of the aluminum honeycomb support was changed to 12.5 mm.

Figure 21:
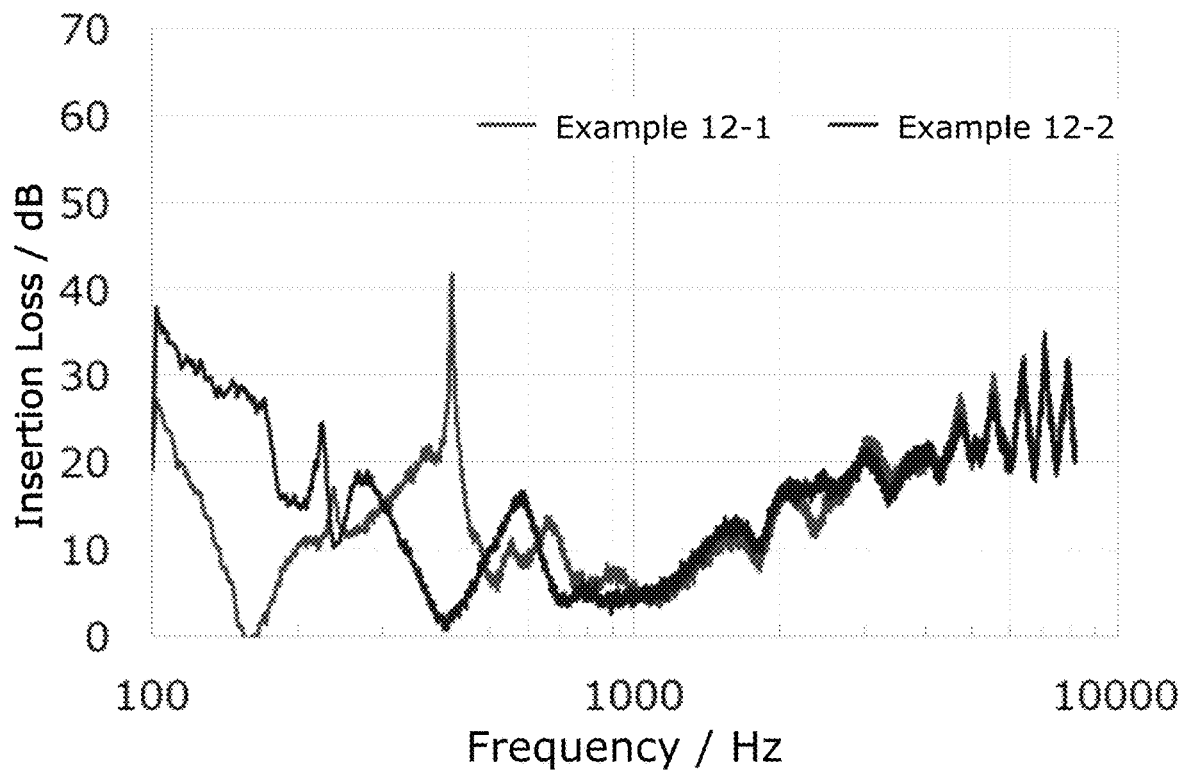
FIG. 21 is a graph showing results of measuring an insertion loss for a produced soundproofing material in a column according to examples described later.

Specifications of the above Example are shown in Table 12 below, and results of an insertion loss obtained by evaluating soundproofing performance are shown in FIG. 21. As can be seen from these results, even when the aluminum honeycomb support is used as the lattice-like structure (support portion), the excellent soundproofing performance can be exhibited similarly. It is also possible to change the frequency range in which the soundproofing performance is exhibited by changing a thickness of the aluminum honeycomb support which is a lattice-like structure (support portion).

Example Using PP Sheet and PP Corrugated Support

Example 13-1

The soundproofing material (latex sheet+PVC honeycomb support) of Example 7-2 described above was used as a soundproofing material of this Example.

Example 13-2

The soundproofing material of this Example was produced in the same manner as Example 13-1 described above except that a polypropylene (PP) sheet whose film thickness is 0.1 mm is used as a sheet having elasticity and a polypropylene (PP) corrugated support is used as a support.

Example 13-3

The soundproofing material of this Example was produced in the same manner as Example 13-1 described above except that a polypropylene (PP) sheet whose film thickness is 0.03 mm is used as a sheet having elasticity and a polypropylene (PP) corrugated support is used as a support.

Figure 22:
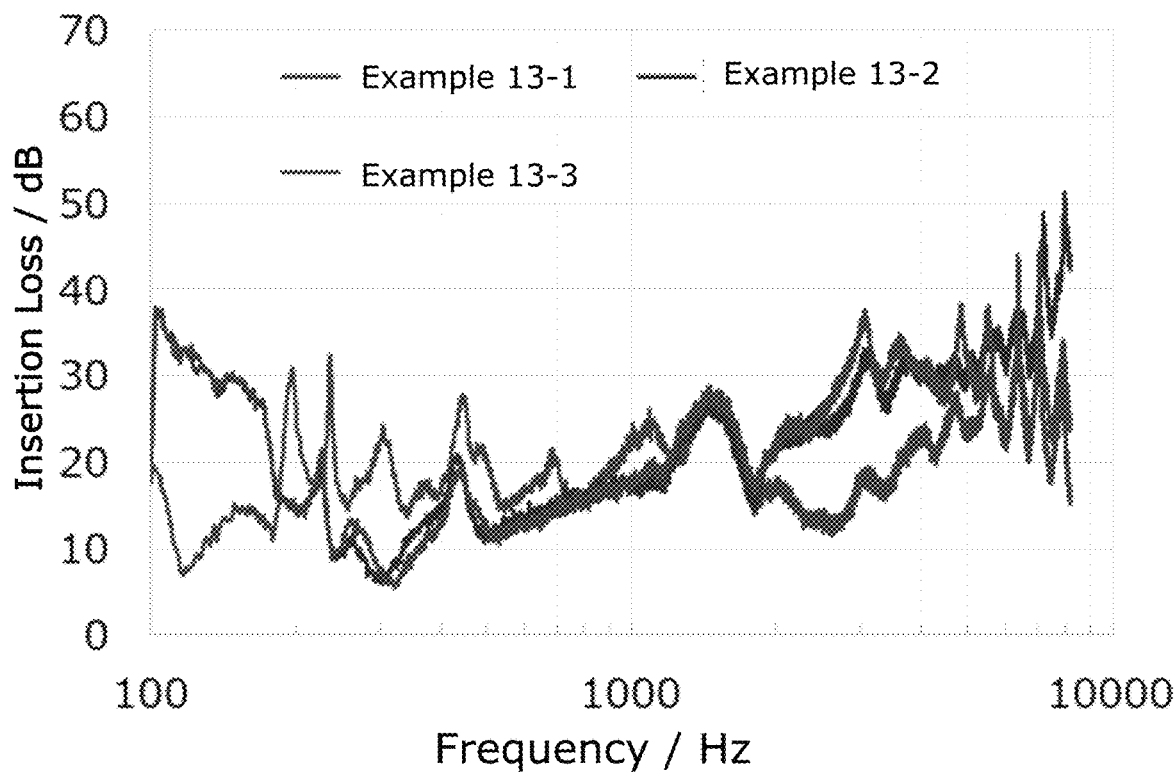
FIG. 22 is a graph showing results of measuring an insertion loss for a produced soundproofing material in a column according to examples described later.

Specifications of the above Example are shown in Table 13 below, and results of an insertion loss obtained by evaluating soundproofing performance are shown in FIG. 22. As can be seen from these results, even when the PP corrugated support is used as the lattice-like structure (support portion), the excellent soundproofing performance can be exhibited similarly. In addition, in this case, the effect of the film thickness of the sheet having elasticity was observed only in the high frequency range.

TABLE 12

| | Soundproofing material | Structure | Overall thickness [mm] | Overall surface density [kg/m$^2$] | Support material | Support thickness [mm] | Surface density of support [kg/m$^2$] |
|---|---|---|---|---|---|---|---|
| Example 12-1 | Latex sheet + aluminum honeycomb support Support thickness 6 mm | Bonding sheet and honeycomb support | 6.25 | 0.55 | Al | 6 | 0.31 |
| Example 12-2 | Latex sheet + aluminum honeycomb support Support thickness 12.5 mm | Bonding sheet and honeycomb support | 12.75 | 0.87 | Al | 12.5 | 0.63 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 12-1 | 6.3 | Latex | 0.25 | 0.24 | 13403 | 1183 | Corresponding to Example 11-3 |
| Example 12-2 | 6.3 | Latex | 0.25 | 0.24 | 13403 | 1183 | |

TABLE 13

| Soundproofing material | Structure | Overall thickness [mm] | Overall surface density [kg/m$^2$] | Support material | Support thickness [mm] | Surface density of support [kg/m$^2$] |
|---|---|---|---|---|---|---|
| Example 13-1 | Latex sheet + PVC honeycomb support Film thickness of sheet 0.25 mm | Bonding sheet and honeycomb support | 12.75 | 1.07 | PVC | 12.5 | 0.83 |
| Example 13-2 | PP sheet + PP corrugated support Film thickness of sheet 0.1 mm | Bonding sheet and corrugated support | 12.6 | 0.85 | PP | 12.5 | 0.76 |
| Example 13-3 | PP sheet + PP corrugated support Film thickness of sheet 0.03 mm | Bonding sheet and corrugated support | 12.53 | 0.79 | PP | 12.5 | 0.76 |

| | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|
| Example 13-1 | 4 | Latex | 0.25 | 0.24 | 82474 | 2935 | Corresponding to Example 7-2 |
| Example 13-2 | — | PP | 0.1 | 0.09 | 3597766 | 135006 | |
| Example 13-3 | — | PP | 0.03 | 0.03 | 97140 | 40502 | |

Example of Changing Thickness and Disposition Form of Corrugated Support

Example 14-1

The soundproofing material (thickness of corrugated support: 12.5 mm) of Example 13-2 described above was used as a soundproofing material of this Example.

Example 14-2

A soundproofing material of this Example was produced in the same manner as in Example 14-1 described above except that the thickness of the corrugated support was changed to 6 mm.

Example 14-3

A soundproofing material of this Example was produced in the same manner as in Example 14-2 described above except that PP sheets are disposed on (bonded to) both surfaces of a corrugated support.

Figure 23:
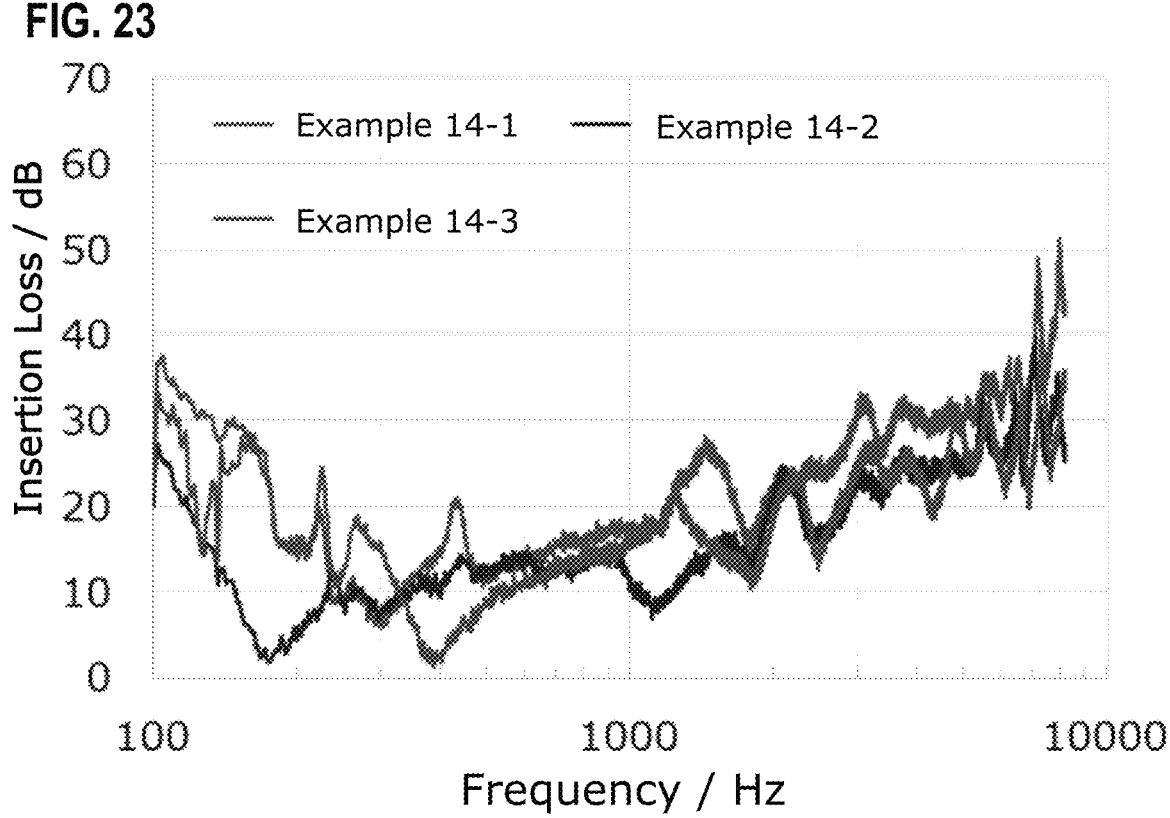
FIG. 23 is a graph showing results of measuring an insertion loss for a produced soundproofing material in a column according to examples described later.

Specifications of the above Example are shown in Table 14 below, and results of an insertion loss obtained by evaluating soundproofing performance are shown in FIG. 23. As can be seen from these results, even when the PP corrugated support is used as the lattice-like structure (support portion), the excellent soundproofing performance can be exhibited similarly. Note that the thickness and disposition form of the PP corrugated support did not significantly affect the expression of the soundproofing performance.

TABLE 14

| Soundproofing material | Structure | Overall thickness [mm] | Overall surface density [kg/m$^2$] | Support material | Support thickness [mm] | Surface density of support [kg/m$^2$] |
|---|---|---|---|---|---|---|
| Example 14-1 | PP sheet + PP corrugated support Film thickness of sheet 0.1 mm/support thickness 12.5 mm | Bonding sheet and corrugated support | 12.6 | 0.85 | PP | 12.5 | 0.76 |
| Example 14-2 | PP sheet + PP corrugated support Film thickness of sheet 0.1 mm/support thickness 6 mm | Bonding sheet and corrugated support | 6.1 | 0.41 | PP | 6 | 0.32 |
| Example 14-3 | PP sheet + PP corrugated support + PP sheet Film thickness of sheet 0.1 mm/support thickness 6 mm | Bonding sheets on both surfaces of corrugated support | 6.1 | 0.41 | PP | 6 | 0.32 |

TABLE 14-continued

| | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|
| Example 14-1 | — | PP | 0.1 | 0.09 | 3597766 | 135006 | Disposing soundproofing material so that sheet is positioned on microphone side |
| Example 14-2 | — | PP | 0.1 | 0.09 | 3597766 | 135006 | Disposing soundproofing material so that sheet is positioned on microphone side |
| Example 14-3 | — | PP | 0.1 | 0.09 | 3597766 | 135006 | Disposing sheets on both surfaces of support |

Example of Dividing Honeycomb Support

Example 15-1

The soundproofing material (honeycomb support is not divided) of Example 1 described above was used as a soundproofing material of this Example.

Example 15-2

A soundproofing material of this Example was produced in the same manner as in Example 15-1 described above except that the honeycomb support (planar shape is square) is divided into four quadrants in two straight lines that pass through a center of the square and parallel to sides of the square and one latex sheet is bonded thereto.

Figure 24:
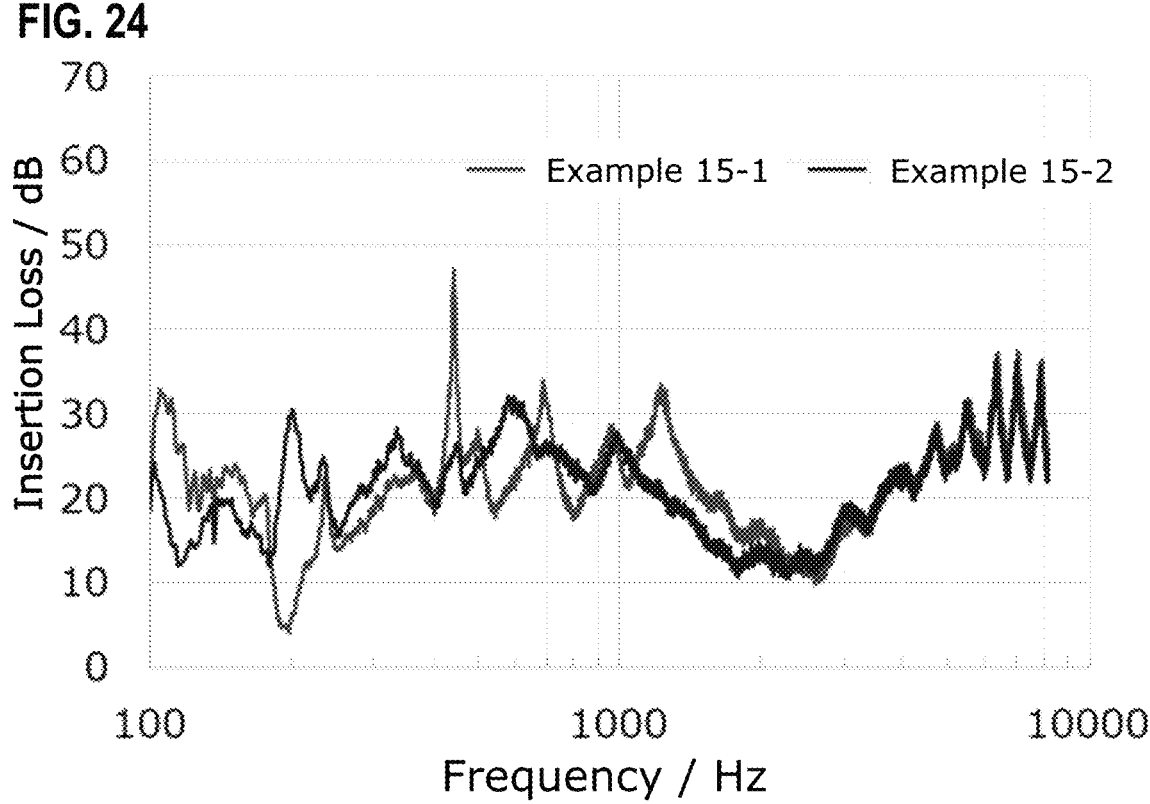
FIG. 24 is a graph showing results of measuring an insertion loss for a produced soundproofing material in a column according to examples described later.

Specifications of the above Example are shown in Table 15 below, and results of an insertion loss obtained by evaluating soundproofing performance are shown in FIG. 24. As can be seen from these results, substantially the same soundproofing performance profile was obtained even when a lattice-like structure (support portion) was divided into four. From this, by dividing the support portion as appropriate, the soundproofing material can have flexibility, and the disposition form of the soundproofing material can be made to follow various sound sources.

TABLE 15

| | Soundproofing material | Structure | Overall thickness [mm] | Overall surface density [kg/m²] | Support material | Support thickness [mm] | Surface density of support [kg/m²] |
|---|---|---|---|---|---|---|---|
| Example 15-1 | Latex sheet + PVC honeycomb support No division of support | Bonding sheet and honeycomb support | 25.25 | 1.88 | PVC | 25 | 1.64 |
| Example 15-2 | Latex sheet + PVC honeycomb support Dividing support into four pieces | Equally dividing honeycomb support into four pieces | 25.25 | 1.88 | PVC | 25 | 1.64 |

| | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|
| Example 15-1 | 4 | Latex | 0.25 | 0.24 | 82474 | 2935 | Corresponding to Example 1 |
| Example 15-2 | 4 | Latex | 0.25 | 0.24 | 82474 | 2935 | |

Example Using Tricarnet as Support

Example 16-1

The soundproofing material (latex sheet+PVC honeycomb support) of Example 1 described above was used as a soundproofing material of this Example.

Example 16-2

A soundproofing material of this Example was produced in the same manner as in Example 16-1 described above except that a honeycomb support was changed to a polypropylene (PP) Tricarnet support whose cell size is 2.7 mm and thickness is 1.1 mm.

Example 16-3

A soundproofing material of this Example was produced in the same manner as in Example 16-1 described above except that a honeycomb support was changed to a high density polyethylene (HDPE) Tricarnet support whose cell size is 2 mm and thickness is 1 mm and a sheet having elasticity was changed to a polypropylene (PP) sheet whose film thickness is 0.03 mm.

Example 16-4

A soundproofing material of this Example was produced in the same manner as in Example 16-3 described above except that a film thickness of a sheet having elasticity (polypropylene (PP) sheet) was changed to 0.1 mm.

Figure 25:
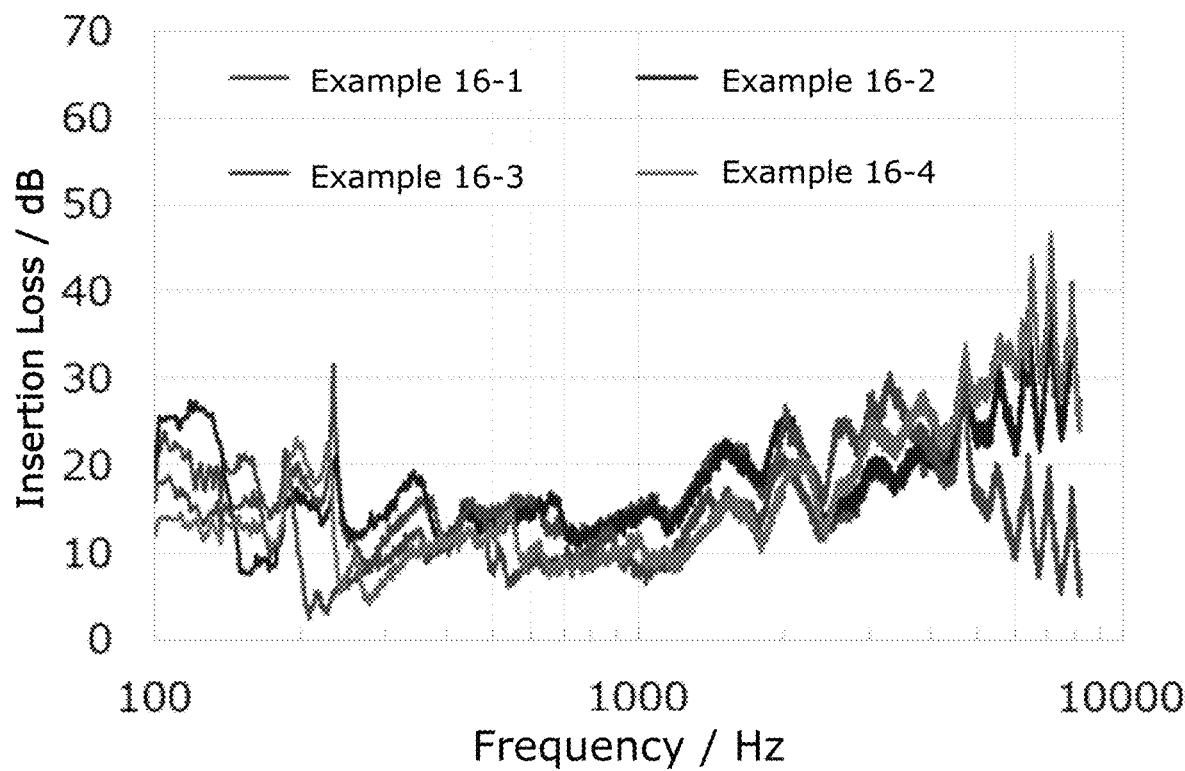
FIG. 25 is a graph showing results of measuring an insertion loss for a produced soundproofing material in a column according to examples described later.

Specifications of the above Example are shown in Table 16 below, and results of an insertion loss obtained by evaluating soundproofing performance are shown in FIG. 25. As can be seen from these results, even when a Tricarnet support is used as a lattice-like structure (support portion), excellent soundproofing performance can be exhibited similarly.

TABLE 16

| | Soundproofing material | Structure | Overall thickness [mm] | Overall surface density [kg/m$^2$] | Support material | Support thickness [mm] | Surface density of support [kg/m$^2$] | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|---|---|---|---|---|---|---|
| Example 16-1 | Latex sheet + PVC honeycomb support Film thickness of sheet 0.25 mm/ support thickness 6 mm | Bonding sheet and honeycomb support | 6.25 | 0.62 | PVC | 6 | 0.38 | 4 | Latex | 0.25 | 0.24 | 82474 | 2935 | Corresponding to Example 1 |
| Example 16-2 | Latex sheet + PP Tricarnet support Film thickness of sheet 0.25 mm/ support thickness 1.1 mm | Bonding sheet and Tricarnet support | 1.35 | 0.68 | PP | 1.1 | 0.44 | 2.7 | Latex | 0.25 | 0.24 | 195493 | 14074 | |
| Example 16-3 | PP sheet + HDPE Tricarnet support Film thickness of sheet 0.03 mm/ support thickness 1 mm | Bonding sheet and Tricarnet support | 1.03 | 0.36 | HDPE | 1 | 0.33 | 2 | PP | 0.03 | 0.03 | 87730 | 38490 | |

TABLE 16-continued

| | Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|---|
| Example 16-4 | PP sheet + HDPE Tricarnet support Film thickness of sheet 0.1 mm/ support thickness 1 mm | Bonding sheet and Tricarnet support | 1.1 | 0.42 | HDPE | 1 | 0.33 | 2 | PP | 0.1 | 0.09 | 3249252 | 128300 | |

Example in which Sheets Having Elasticity are Disposed on Both Surfaces of Support Example 17-1

The soundproofing material (latex sheet+PVC honeycomb support) of Example 7-3 described above was used as a soundproofing material of this Example.

Example 17-2

A soundproofing material of this Example was produced in the same manner as in Example 17-1 described above except that the latex sheets are disposed on (bonded to) both surfaces of the honeycomb support.

Example 17-3

A soundproofing material of this Example was produced in the same manner as in Example 17-1 described above except that the sheet having elasticity was changed to the PVC sheet whose film thickness is 0.2 mm.

Example 17-4

A soundproofing material of this Example was produced in the same manner as in Example 17-3 described above except that the PVC sheets are disposed on (bonded to) both surfaces of the honeycomb support.

Figure 26:
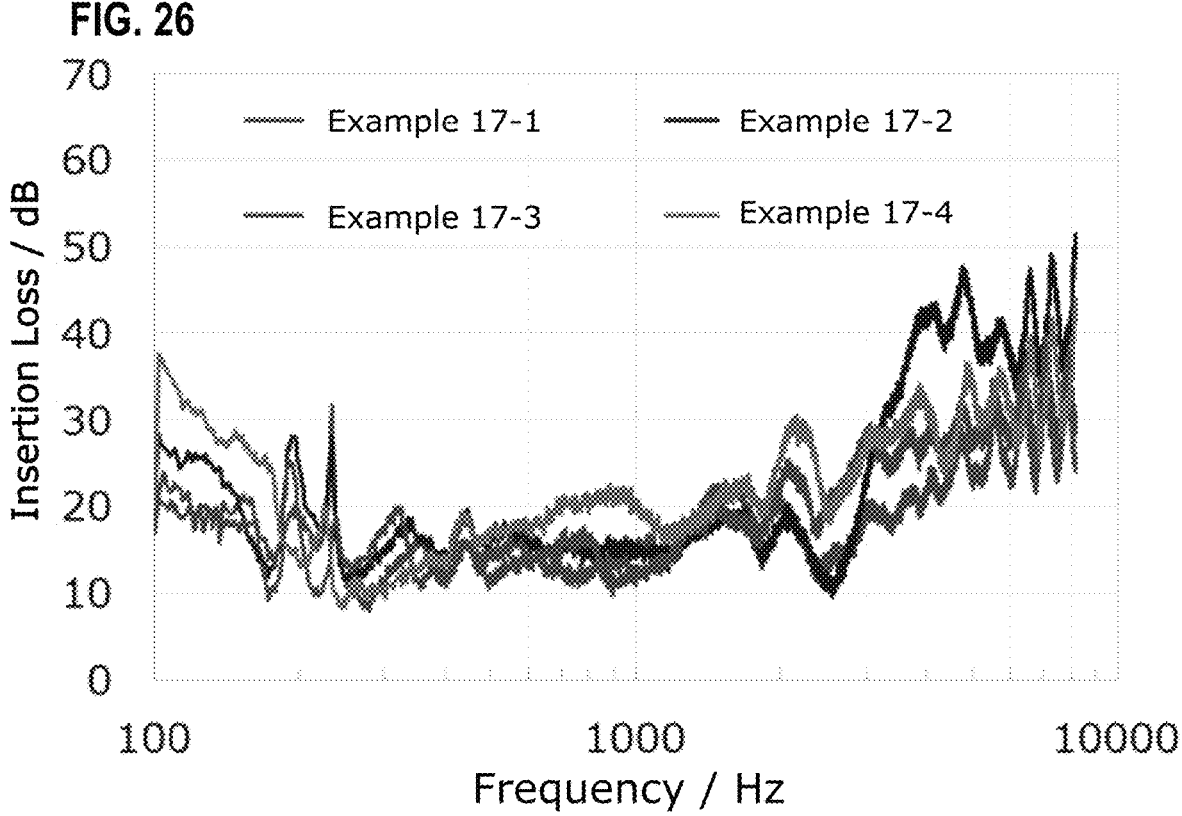
FIG. 26 is a graph showing results of measuring an insertion loss for a produced soundproofing material in a column according to examples described later.

Specifications of the above Example are shown in Table 17 below, and results of an insertion loss obtained by evaluating soundproofing performance are shown in FIG. 26. As can be seen from these results, even when the sheets having elasticity were disposed on both surfaces of a lattice-like structure (support portion), the same excellent soundproofing performance as when the sheet was disposed on one side of the lattice-like structure was exhibited. Note that in particular, when the latex sheets were disposed on the both surfaces, the excellent soundproofing performance was exhibited even in a high frequency range.

TABLE 17

| | Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|---|
| Example 17-1 | Latex sheet + PVC honeycomb support | Bonding sheet and honeycomb support | 6.25 | 0.62 | PVC | 6 | 0.38 | 4 | Latex | 0.25 | 0.24 | 82474 | 2935 | Corresponding to Example 7-3 Disposing soundproofing material so that sheet is positioned on microphone side |
| Example 17-2 | Latex sheet + PVC honeycomb support + latex sheet | Bonding sheet and Tricarnet support | 6.5 | 0.87 | PVC | 6 | 0.38 | 4 | Latex | 0.25 | 0.24 | 82474 | 2935 | Disposing sheets on both surfaces of support |

TABLE 17-continued

| | Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|---|
| Example 17-3 | PVC sheet + PVC honeycomb support | Bonding sheet and honeycomb support | 6.2 | 0.66 | PVC | 6 | 0.38 | 4 | PVC | 0.2 | 0.28 | 1153530 | 10215 | Disposing soundproofing material so that sheet is positioned on microphone side |
| Example 17-4 | PVC sheet + PVC honeycomb support + PVC sheet | Bonding sheet on both surfaces of honeycomb | 6.4 | 0.94 | PVC | 6 | 0.38 | 4 | PVC | 0.2 | 0.28 | 1153530 | 10215 | Disposing sheets on both surfaces of support |

Example Using LDPE Sheet as Elastic Sheet

Example 18-1

The soundproofing material (LDPE sheet+PVC honeycomb support) of Example 9-3 described above was used as a soundproofing material of this Example.

Example 18-2

A soundproofing material of this Example was produced in the same manner as in Example 9-1 described above except that the film thickness of the sheet having elasticity was changed to 0.03 mm.

Example 18-3

A soundproofing material of this Example was produced in the same manner as in Example 9-1 described above except that the film thickness of the sheet having elasticity was changed to 0.01 mm.

Comparative Example 18

A soundproofing material of this Comparative Example was produced in the same manner as in Example 18-3 described above except that one in which a large number of pores were punched in all partition portions of a sheet having elasticity was used.

Figure 27:
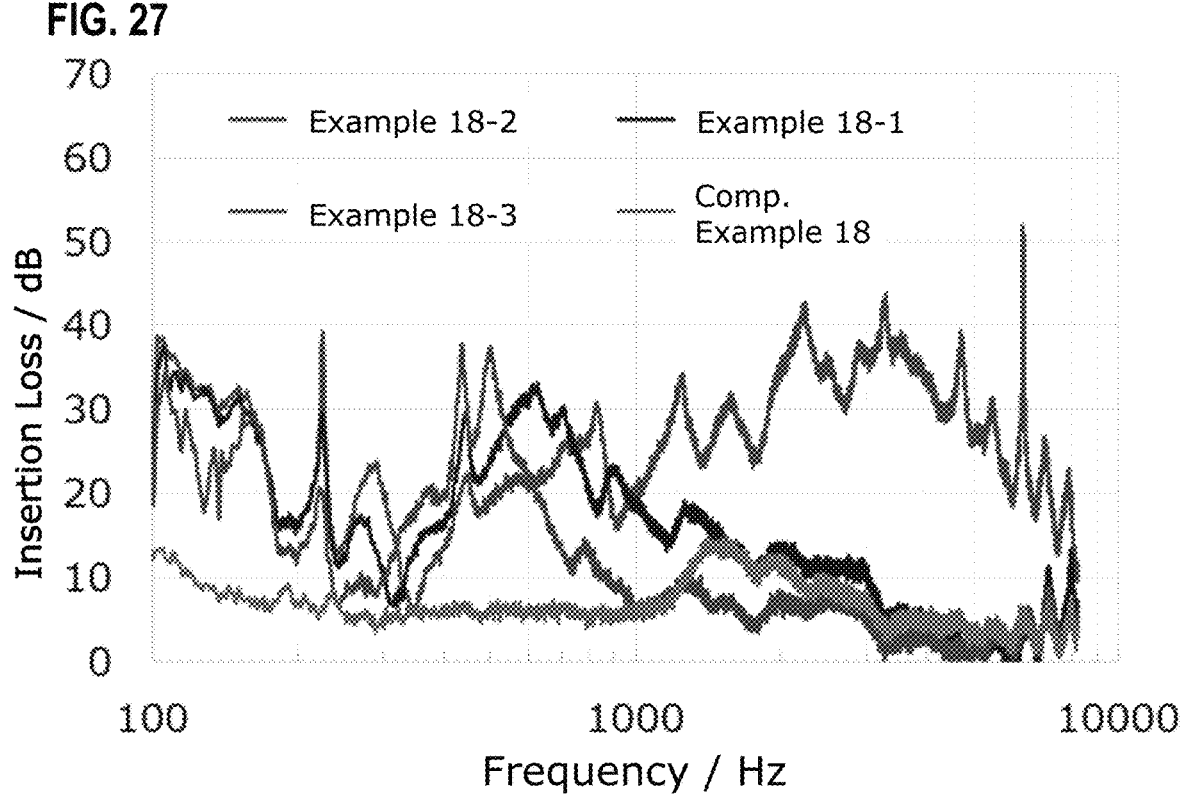
FIG. 27 is a graph showing results of measuring an insertion loss for a produced soundproofing material in a column according to examples described later.

Specifications of the above Examples and Comparative Examples are shown in Table 18 below, and results of an insertion loss obtained by evaluating soundproofing performance are shown in FIG. 27. As can be seen from these results, even when an LDPE sheet is used as the sheet having elasticity, excellent soundproofing performance can be exhibited similarly.

In addition, depending on the thickness of the sheet, it is possible to change the frequency range in which soundproofing performance is exhibited. Note that in Comparative Example 18 in which a large number of pores were punched in the sheet, the desired soundproofing performance was not obtained in the low frequency range because the airtightness of the partition portion was not ensured.

TABLE 18

| | Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|---|
| Example 18-1 | LDPE sheet + PVC honeycomb support Film thickness of sheet 0.08 mm | Bonding sheet and honeycomb support | 25.08 | 1.71 | PVC | 25 | 1.64 | 4 | LDPE | 0.08 | 0.07 | 518281 | 13356 | Corresponding to Example 9-3 |
| Example 18-2 | LDPE sheet + PVC honeycomb support | Bonding sheet and honeycomb support | 25.03 | 1.67 | PVC | 25 | 1.64 | 4 | LDPE | 0.03 | 0.03 | 27331 | 5008 | |

TABLE 18-continued

| | Soundproofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|---|
| Example 18-3 | LDPE sheet + PVC honeycomb support Film thickness of sheet 0.03 mm | Bonding sheet and honeycomb support | 25.01 | 1.65 | PVC | 25 | 1.64 | 4 | LDPE | 0.01 | 0.01 | 1012 | 1669 | |
| Example 18-4 | LDPE sheet + PVC honeycomb support Film thickness of sheet 0.01 mm | Bonding sheet and honeycomb support | 25.01 | 1.65 | PVC | 25 | 1.64 | 4 | LDPE | 0.01 | 0.01 | Non-measurable | Non-measurable | There are pores in sheet |

Example Using Rigid PVC Sheet as Elastic Sheet

Example 19-1

A soundproofing material of this Example was produced in the same manner as in Example 7-3 described above except that the sheet having elasticity was changed to a rigid polyvinyl chloride (PVC) sheet whose film thickness is 0.4 mm.

Example 19-2

A soundproofing material of this Example was produced in the same manner as in Example 19-1 described above except that the film thickness of the sheet having elasticity was changed to 0.5 mm.

Example 19-3

A soundproofing material of this Example was produced in the same manner as in Example 19-1 described above except that the film thickness of the sheet having elasticity was changed to 1 mm.

Example 19-4

A soundproofing material of this Example was produced in the same manner as in Example 19-1 described above except that the film thickness of the sheet having elasticity was changed to 2 mm.

Figure 28:
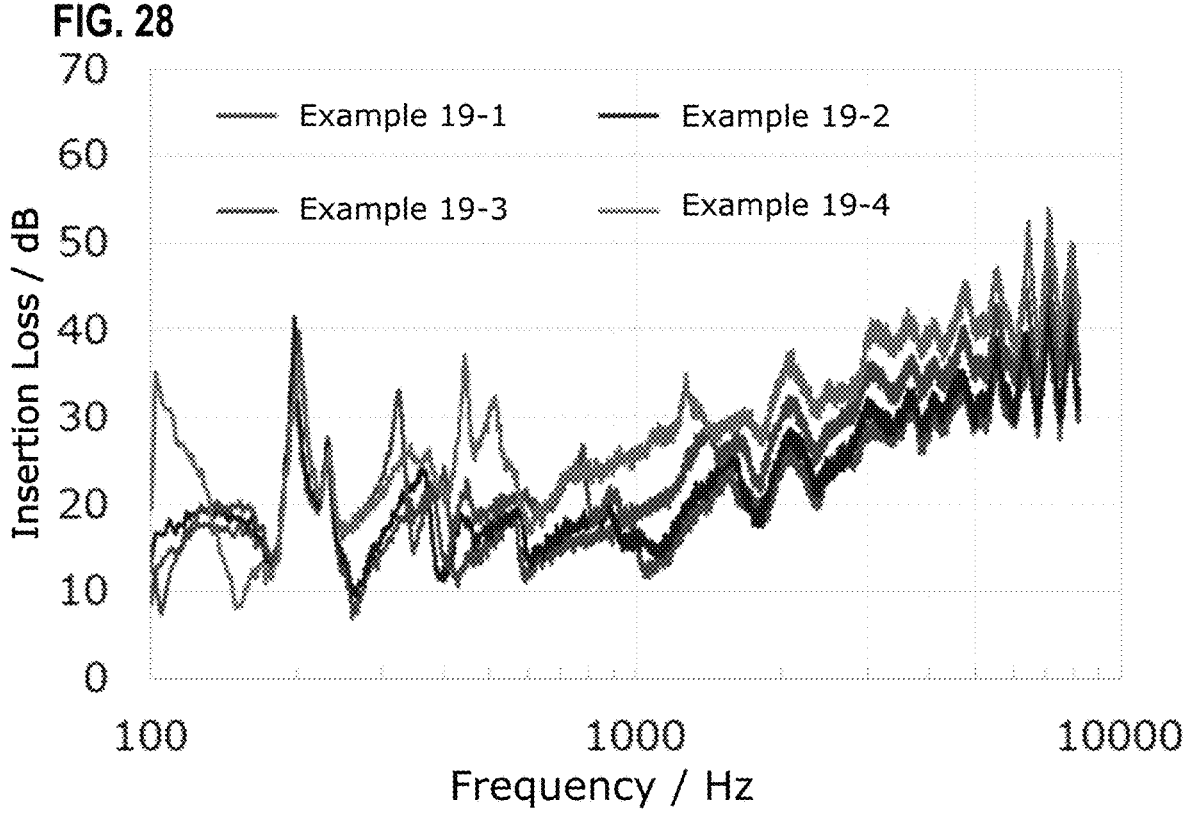
FIG. 28 is a graph showing results of measuring an insertion loss for a produced soundproofing material in a column according to examples described later.

Specifications of the above Example are shown in Table 19 below, and results of an insertion loss obtained by evaluating soundproofing performance are shown in FIG. 28. As can be seen from these results, even when a rigid PVC sheet is used as the sheet having elasticity, excellent soundproofing performance can be exhibited similarly.

TABLE 19

| | Soundproofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|---|
| Example 19-1 | Rigid PVC sheet + PVC honeycomb support | Bonding sheet and honeycomb support | 6.4 | 0.94 | PVC | 6 | 0.38 | 4 | Rigid PVC | 0.4 | 0.56 | 199945235 | 95100 | |

TABLE 19-continued

| Soundproofing material | Structure | Overall thickness [mm] | Overall surface density [kg/m$^2$] | Support material | Support thickness [mm] | Surface density of support [kg/m$^2$] | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|---|---|---|---|---|---|
| Example 19-2 | Rigid PVC sheet + PVC honeycomb support | Bonding sheet and honeycomb support | 6.5 | 1.08 | PVC | 6 | 0.38 | 4 | Rigid PVC | 0.5 | 0.7 | 390518037 | 118875 | Film thickness of sheet 0.4 mm |
| Example 19-3 | Rigid PVC sheet + PVC honeycomb support | Bonding sheet and honeycomb support | 7 | 1.78 | PVC | 6 | 0.38 | 4 | Rigid PVC | 1 | 1.4 | 3124144295 | 237751 | Film thickness of sheet 0.5 mm |
| Example 19-4 | Rigid PVC sheet + PVC honeycomb support | Bonding sheet and honeycomb support | 8 | 3.18 | PVC | 6 | 0.38 | 4 | Rigid PVC | 2 | 2.8 | 24993154358 | 475501 | Film thickness of sheet 1 mm |
|  |  |  |  |  |  |  |  |  |  |  |  |  | Film thickness of sheet 2 mm |

Example in which Different Sheets are Disposed on Both Surfaces of Support

Example 20-1

The soundproofing material (PVC sheet+PVC honeycomb support+PVC sheet) of Example 17-4 described above was used as a soundproofing material of this Example.

Example 20-2

A soundproofing material of this Example was produced in the same manner as in Example 20-1 described above except that one of the sheets having elasticity was changed to a low density polyethylene (LDPE) sheet. Note that upon evaluating the soundproofing performance, the soundproofing performance was evaluated by disposing the soundproofing material so that the PVC sheet is positioned on a microphone side (LDPE sheet is positioned on a speaker side).

Example 20-3

The soundproofing material of Example 20-2 described above was used as a soundproofing material of this Example. However, a disposition form of the soundproofing material was reversed from that in Example 20-2 upon evaluating the soundproofing performance, and the soundproofing material was disposed so that the LDPE sheet is positioned on a microphone side (PVC sheet is positioned on a speaker side) to perform the evaluation of the soundproofing performance.

Figure 29:
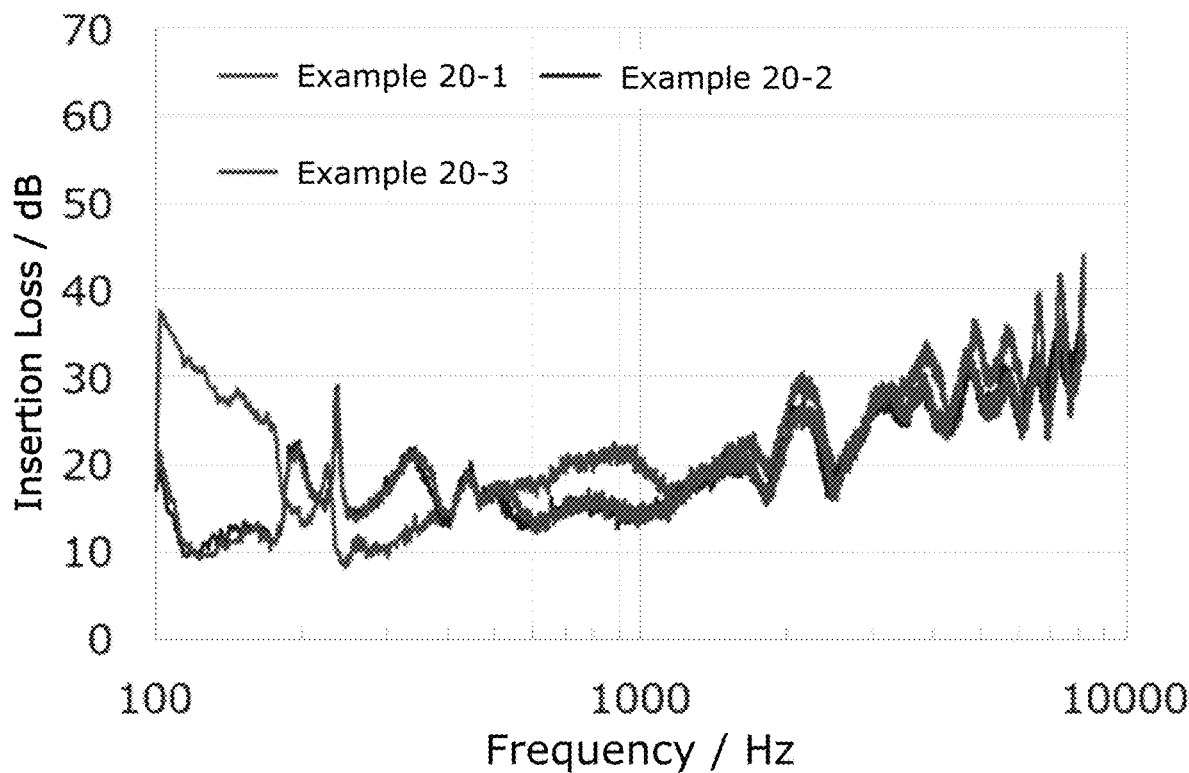
FIG. 29 is a graph showing results of measuring an insertion loss for a produced soundproofing material in a column according to examples described later.

Specifications of the above Example are shown in Table 20 below, and results of an insertion loss obtained by evaluating soundproofing performance are shown in FIG. 29. As can be seen from these results, even when different sheets were disposed on surfaces of each of the lattice-like structures (support portions) as a sheet having elasticity, excellent soundproofing performance can be exhibited similarly.

TABLE 20

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 20-1 | PVC sheet + PVC honey-comb support + PVC sheet | Bonding each sheet and honey-comb support | 6.4 | 0.94 | PVC | 6 | 0.38 | 4 | PVC | 0.2 | 0.28 | 1153530 | 10215 | Corresponding to Example 17.4 |
| Example 20-2 | LDPE sheet + honey-comb support + PVC sheet | Bonding each sheet and honey-comb support | 6.21 | 0.67 | PVC | 6 | 0.38 | 4 | LDPE, PVC | 0.01, 0.2 | 0.01, 0.28 | 1153530 | 10215 | Disposing sound-proofing material so that PVC sheet is positioned on microphone side |
| Example 20-3 | PVC sheet + honey-comb support + LDPE sheet | Bonding each sheet and honey-comb support | 6.21 | 0.67 | PVC | 6 | 0.38 | 4 | PVC, LDPE | 0.2, 0.01 | 0.28, 0.01 | 1153530 | 10215 | Disposing sound-proofing material so that LDPE sheet is positioned on microphone side |

Example in which Supports Having Different Thickness are Disposed on Both Surfaces of Elastic Sheet Example 21-1

A soundproofing material of this Example was produced the same manner as in Example 1 described above except that PVC honeycomb supports (cell size: 4 mm) whose thicknesses are 6 mm and 12.5 mm, respectively, were disposed on (bonded to) both surfaces of a sheet having elasticity (latex sheet). Note that upon evaluating the soundproofing performance, soundproofing performance was evaluated by disposing the soundproofing material so that the PVC honeycomb support whose thickness is 12.5 mm is positioned on a microphone side (PVC honeycomb support whose thickness is 6 mm is positioned on a speaker side).

Example 21-2

The soundproofing material of Example 21-1 described above was used as a soundproofing material of this Example. However, a disposition form of the soundproofing material was reversed from that in Example 21-1 upon evaluating the soundproofing performance, and the soundproofing material was disposed so that the PVC honeycomb support whose thickness is 6 mm is positioned on a microphone side (PVC honeycomb support whose thickness is 12.5 mm is positioned on a speaker side) to perform the evaluation of the soundproofing performance.

Figure 30:
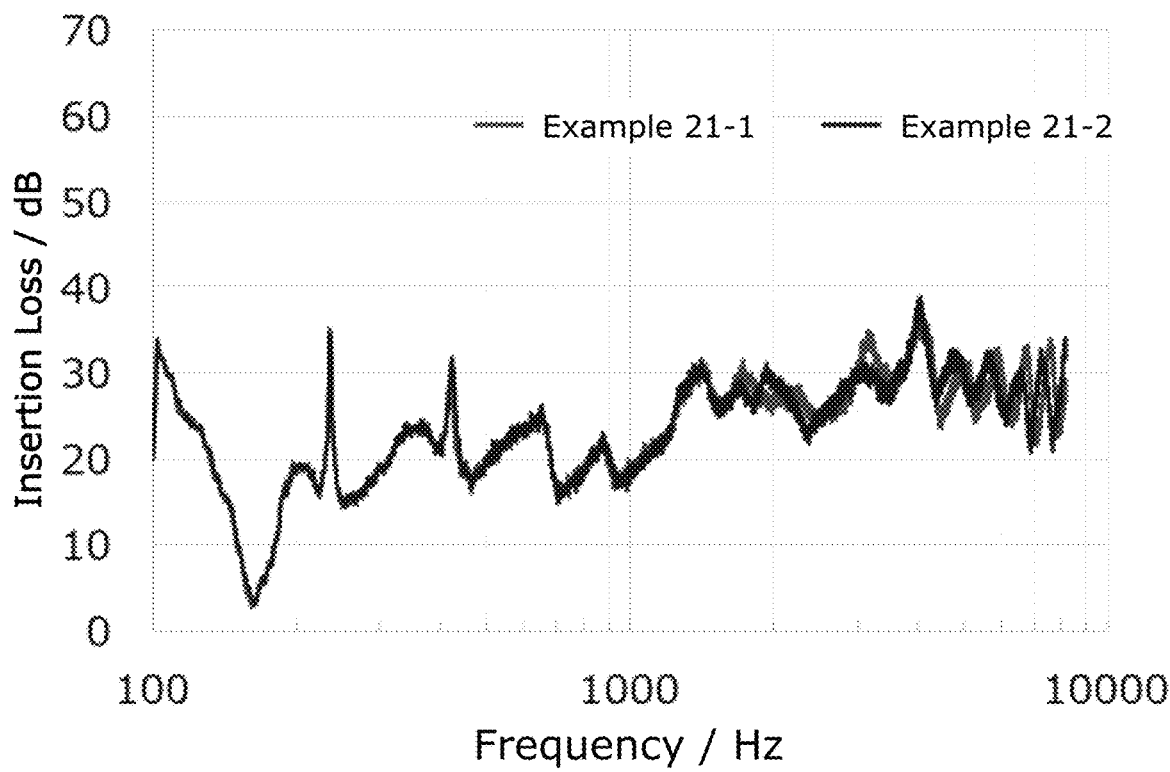
FIG. 30 is a graph showing results of measuring an insertion loss for a produced soundproofing material in a column according to examples described later.

Specifications of the above Example are shown in Table 21 below, and results of an insertion loss obtained by evaluating soundproofing performance are shown in FIG. 30. As can be seen from these results, in the soundproofing material in which the lattice-like structures (support portions) are disposed on both surfaces of the sheet having elasticity, there was no significant change in soundproofing performance even when the thicknesses of each of the lattice-like structures (support portions) change.

TABLE 21

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 21-1 | Latex sheet + PVC honey-comb | Bonding sheet and honey-comb | 18.75 | 1.46 | PVC | 6, 12.5 | 0.38, 0.83 | 4 | Latex | 0.25 | 0.25 | 82474 | 2935 | Disposing sound-proofing material so that |

TABLE 21-continued

| Sound-proofing material | Structure | Over-all thick-ness [mm] | Over-all surface density [kg/m²] | Support material | Support thick-ness [mm] | Surface density of support [kg/m²] | Cell size [mm] | Sheet material | Film thick-ness of sheet [mm] | Surface density of sheet m [kg/m²] | Surface rigidity of sheet k [N/mm] | (k/m)^(1/2)/2π [Hz] | Remark |
|---|---|---|---|---|---|---|---|---|---|---|---|---|---|
| | support Support thickness 18.5 mm (6 mm + 12.5 mm) | support | | | | | | | | | | | honey-comb support (12.5 mm) is positioned on micro-phone side |
| Example 21-2 | Latex sheet + PVC honey-comb support Support thick-ness 18.5 mm (12.5 mm + 6 mm) | Bonding sheet and honey-comb support | 18.75 | 1.46 | PVC | 12.5, 6 | 0.83, 0.38 | 4 | Latex | 0.25 | 0.25 | 82474 | 2935 | Disposing sound-proofing material so that honey-comb support (6 mm) is positioned on micro-phone side |

Example Using EPDM Sheet as Elastic Sheet

Example 22-1

A soundproofing material of this Example was produced in the same manner as in Example 1 described above except that a sheet having elasticity was changed to an ethylene-propylene-diene rubber (EPDM) sheet whose film thickness is 0.2 mm.

Example 22-2

A soundproofing material of this Example was produced in the same manner as in Example 22-1 described above except that the film thickness of the sheet having elasticity was changed to 0.4 mm.

Example 22-3

A soundproofing material of this Example was produced in the same manner as in Example 22-1 described above except that the film thickness of the sheet having elasticity was changed to 0.6 mm.

Figure 31:
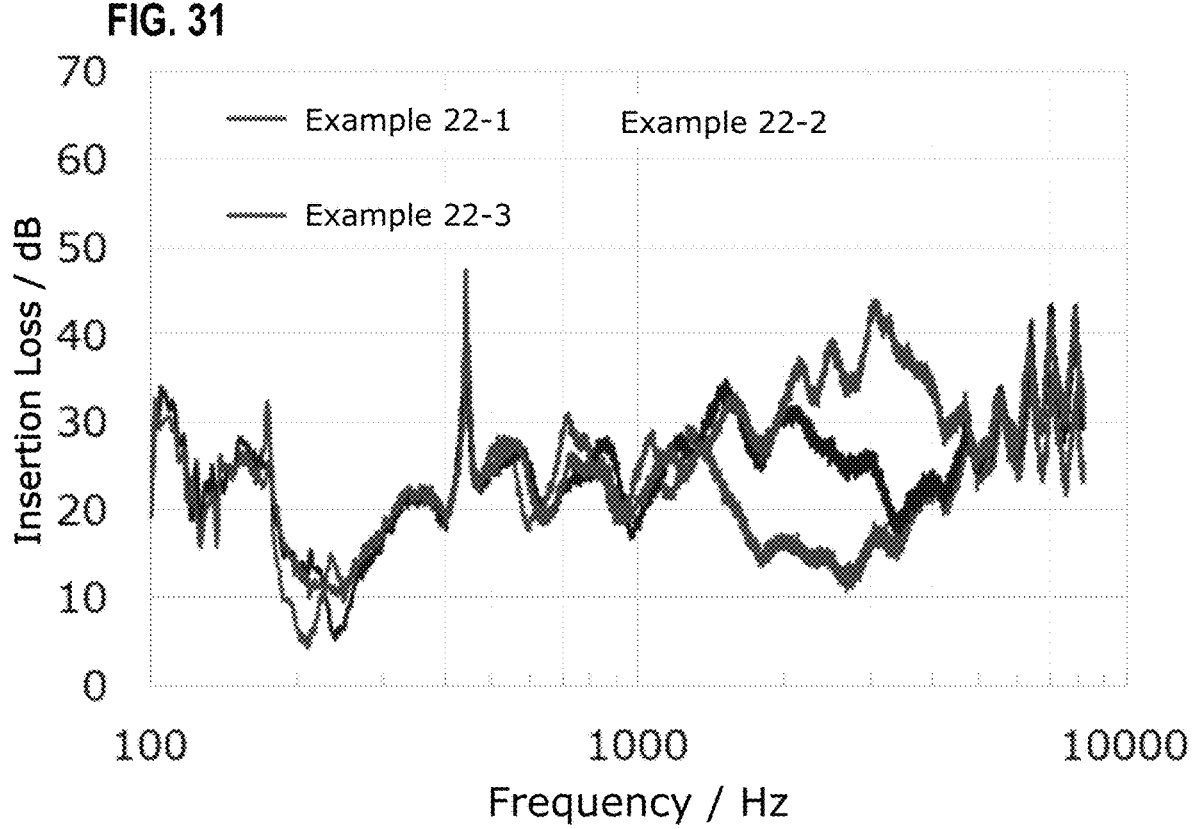
FIG. 31 is a graph showing results of measuring an insertion loss for a produced soundproofing material in a column according to examples described later.

Specifications of the above Example are shown in Table 22 below, and results of an insertion loss obtained by evaluating soundproofing performance are shown in FIG. 31. As can be seen from these results, it was found that there is little difference in an insertion loss in a low frequency range when the EPDM sheet is used as the sheet having elasticity, but there is a difference in an insertion loss in a high frequency range.

TABLE 22

| Sound-proofing material | Structure | Overall thick-ness [mm] | Overall surface density [kg/m²] | Support material | Support thick-ness [mm] | Surface density of support [kg/m²] | Cell size [mm] | Sheet material | Film thick-ness of sheet [mm] | Surface density of sheet m [kg/m²] | Surface rigidity of sheet k [N/mm] | (k/m)^(1/2)/2π [Hz] | Remark |
|---|---|---|---|---|---|---|---|---|---|---|---|---|---|
| Example 22-1 | EPDM sheet + PVC honey-comb support Film thickness of sheet 0.2 mm | Bonding sheet and honey-comb support | 25.2 | 1.81 | PVC | 25 | 1.64 | 4 | EPDM | 0.2 | 0.17 | 43865 | 2542 | |
| Example 22-2 | EPDM sheet + PVC honey-comb support | Bonding sheet and honey-comb support | 25.4 | 1.98 | PVC | 25 | 1.64 | 4 | EPDM | 0.4 | 0.34 | 350919 | 5083 | Corresponding to Example 5-3 |

TABLE 22-continued

| Sound-proofing material | Structure | Overall thickness [mm] | Overall surface density [kg/m$^2$] | Support material | Support thickness [mm] | Surface density of support [kg/m$^2$] | Cell size [mm] | Sheet material | Film thickness of sheet [mm] | Surface density of sheet m [kg/m$^2$] | Surface rigidity of sheet k [N/mm] | (k/m)$^{1/2}$/2π [Hz] | Remark |
|---|---|---|---|---|---|---|---|---|---|---|---|---|---|
| Example 22-3 | Film thickness of sheet 0.4 mm EPDM sheet + PVC honeycomb support Film thickness of sheet 0.6 mm | Bonding sheet and honeycomb support | 25.6 | 2.16 | PVC | 25 | 1.64 | 4 | EPDM | 0.6 | 0.52 | 1184353 | 7625 | |

Effect of Cell Size of Honeycomb Support (EPDM Sheet)

Example 23-1

The soundproofing material (EPDM sheet+PVC honeycomb support (cell size 4 mm) of Example 5-3 described above was used as a soundproofing material of this Example.

Example 23-2

A soundproofing material of this Comparative Example was produced in the same manner as in Example 23-1 described above except that the cell size was changed to 8 mm.

Comparative Example 23

A soundproofing material of this Comparative Example was produced in the same manner as in Example 23-1 described above except that the cell size was changed to 13 mm.

Figure 32:
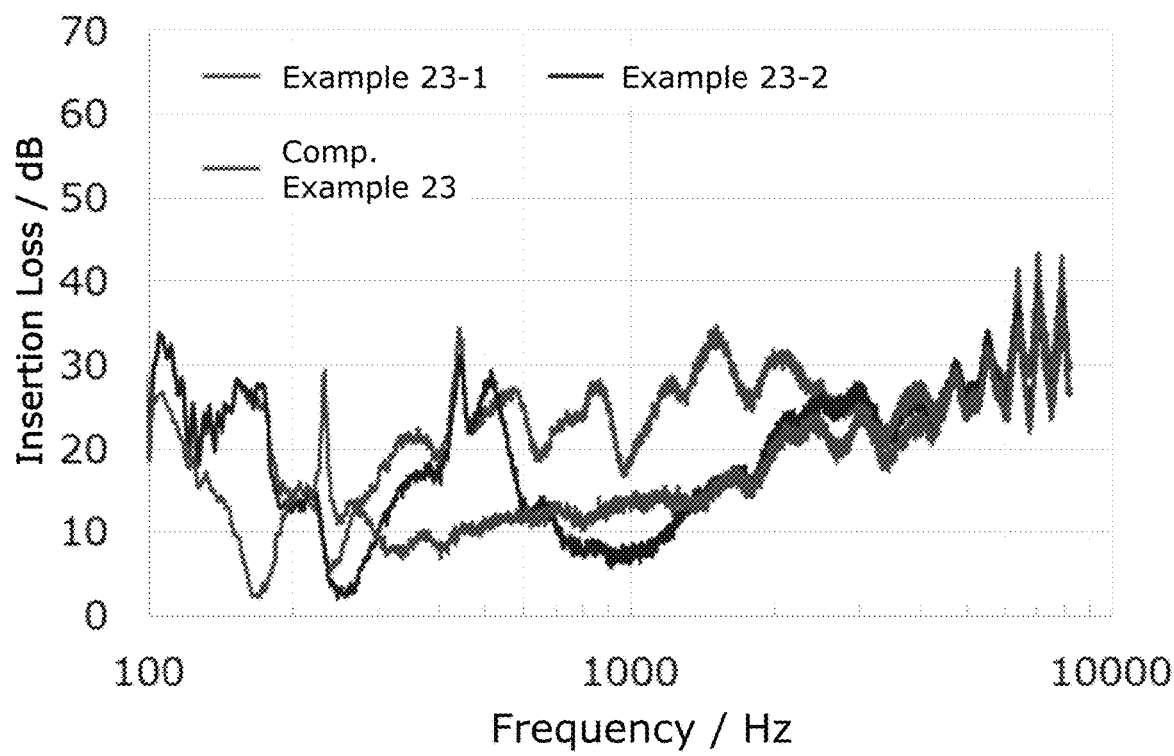
FIG. 32 is a graph showing results of measuring an insertion loss for a produced soundproofing material in a column according to examples described later.

Specifications of the above Examples and Comparative Examples are shown in Table 23 below, and results of an insertion loss obtained by evaluating soundproofing performance are shown in FIG. 32. As can be seen from these results, in the combination of this Example of the sheet and the lattice-like structure (support portion), when excellent soundproofing performance was exhibited only when the cell size is 4 mm or 8 mm and the desired soundproofing performance was not exhibited when the cell size is 13 mm. This is considered due to the fact that a value of (k/m)$^{1/2}$/2π defined in the present invention is less than 900 Hz.

TABLE 23

| Soundproofing material | Structure | Overall thickness [mm] | Overall surface density [kg/m$^2$] | Support material | Support thickness [mm] | Surface density of support [kg/m$^2$] | Cell size [mm] | Sheet material | Film thickness of sheet [mm] | Surface density of sheet m [kg/m$^2$] | Surface rigidity of sheet k [N/mm] | (k/m)$^{1/2}$/2π [Hz] | Remark |
|---|---|---|---|---|---|---|---|---|---|---|---|---|---|
| Example 23-1 | EPDM sheet + PVC honeycomb support Cell size 4 mm | Bonding sheet and honeycomb support | 25.4 | 1.98 | PVC | 25 | 1.64 | 4 | EPDM | 0.4 | 0.34 | 350919 | 5083 | Corresponding to Example 5-3 |
| Example 23-2 | EPDM sheet + PVC honeycomb support Cell size 8 mm | Bonding sheet and honeycomb support | 25.4 | 1.07 | PVC | 25 | 0.72 | 8 | EPDM | 0.4 | 0.34 | 21932 | 1271 | |
| Comparative Example 23 | EPDM sheet + PVC honeycomb support | Bonding sheet and honeycomb support | 25.4 | 1.2 | PVC | 25 | 0.86 | 13 | EPDM | 0.4 | 0.34 | 3145 | 481 | |

TABLE 23-continued

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Cell size 13 mm | | | | | | | | | | | | | |

Effect of Thickness of Sheet (Polypropylene (PP) Sheet)

Example 24-1

The soundproofing material (film thickness of polypropylene (PP) sheet: 1 mm) of Example 9-4 described above was used as a soundproofing material of this Example.

Example 24-2

A soundproofing material of this Example was produced in the same manner as in Example 24-1 described above except that a film thickness of a polypropylene (PP) sheet was changed to 0.1 mm.

Example 24-3

A soundproofing material of this Example was produced in the same manner as in Example 24-1 described above except that a film thickness of a polypropylene (PP) sheet was changed to 0.03 mm.

Figure 33:
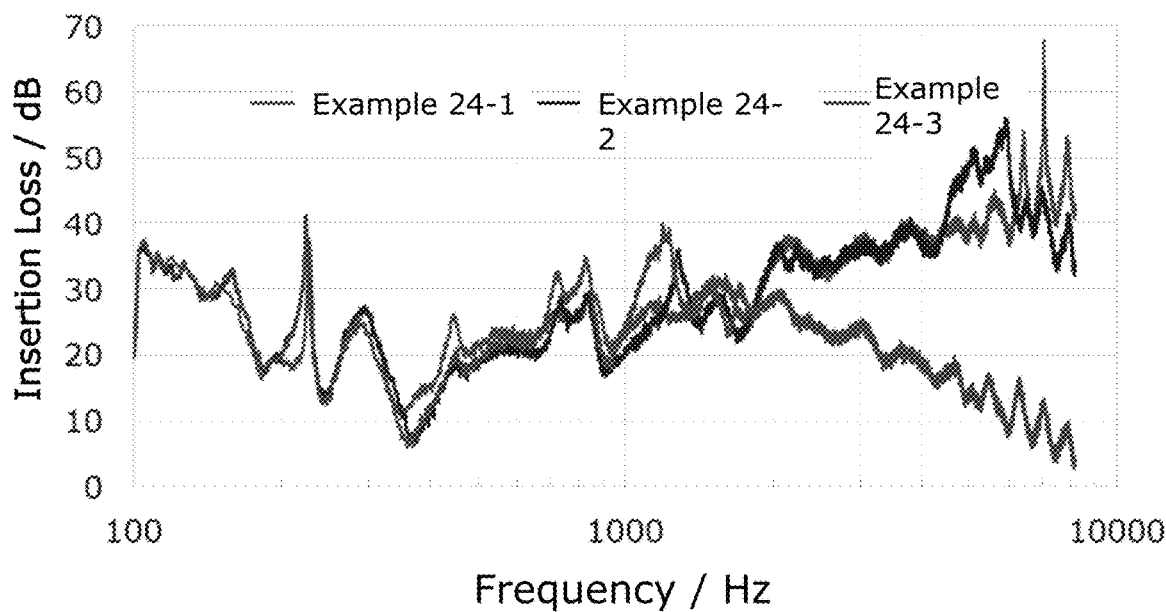
FIG. 33 is a graph showing results of measuring an insertion loss for a produced soundproofing material in a column according to examples described later.

Specifications of the above Example are shown in Table 24 below, and results of an insertion loss obtained by evaluating soundproofing performance are shown in FIG. 33. From these results, when a polypropylene (PP) sheet is used as a sheet having elasticity, even if the film thickness changes in the range of 1 mm to 0.03 mm, according to the soundproofing material according to the present invention, it can be seen that the insertion loss is kept comparable in the low frequency range of 2000 Hz or less.

TABLE 24

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 24-1 | PP sheet + PVC honeycomb support Film thickness of sheet 1 mm | Bonding sheet and honeycomb support | 26 | 2.54 | PVC | 25 | 1.64 | 4 | PP | 1 | 0.9 | 1958254841 | 234765 | Corresponding to Example 9-4 |
| Example 24-2 | PP sheet + PVC honeycomb support Film thickness of sheet 0.1 mm | Bonding sheet and honeycomb support | 25.1 | 1.73 | PVC | 25 | 1.64 | 4 | PP | 0.1 | 0.09 | 1958255 | 23477 | |
| Example 24-3 | PP sheet + PVC honeycomb support Film thickness of sheet 0.03 mm | Bonding sheet and honeycomb support | 25.03 | 1.67 | PVC | 25 | 1.64 | 4 | PP | 0.03 | 0.03 | 52873 | 7043 | |

Effect of Shape of Support and Thickness of Elastic Sheet

Example 25-1

The soundproofing material (PVC honeycomb support (cell size: 4 mm)+latex sheet (film thickness 1 mm)) of Example 7-2 described above was used as a soundproofing material of this Example.

Example 25-2

A soundproofing material of this Example was produced in the same manner as in Example 25-1 described above except that a polypropylene (PP) sheet (film thickness: 0.1 mm) is used as a sheet having elasticity.

Example 25-3

A soundproofing material of this Example was produced in the same manner as in Example 25-2 described above except that a film thickness of a polypropylene (PP) sheet was changed to 0.03 mm.

Example 25-4

A soundproofing material of this Example was produced in the same manner as in Example 25-2 described above except that a polypropylene (PP) corrugated support is used as a support.

Example 25-5

A soundproofing material of this Example was produced in the same manner as in Example 25-3 described above except that a polypropylene (PP) corrugated support is used as a support.

Comparative Example 25

The soundproofing material (TECCELL T5) of Comparative Example 2-7 described above was used as a soundproofing material of this Comparative Example.

Figure 34:
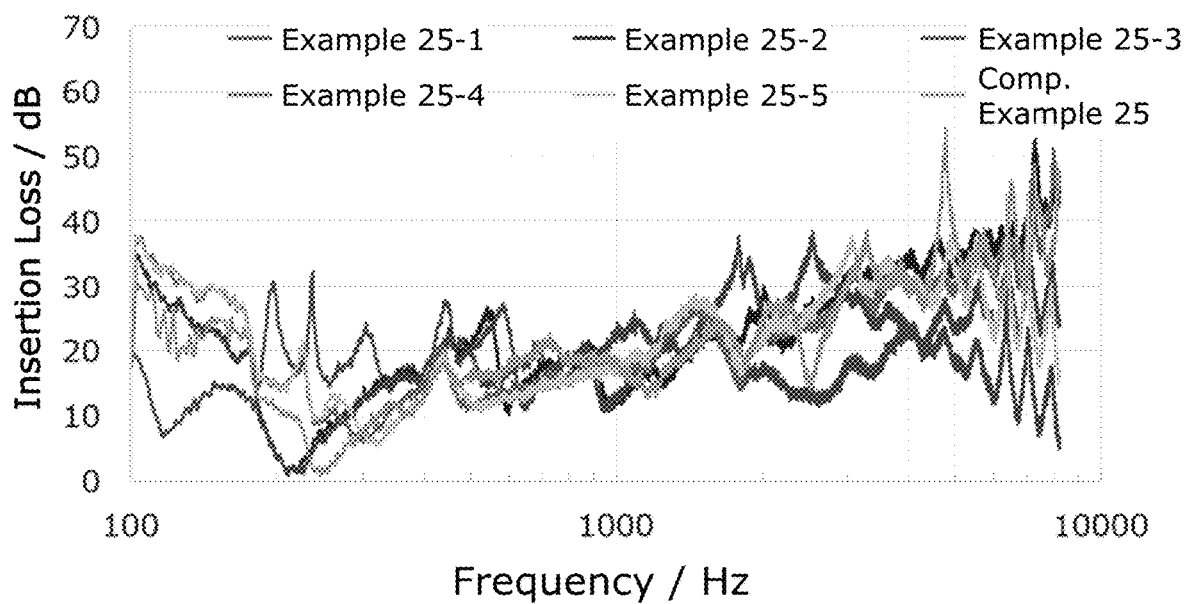
FIG. 34 is a graph showing results of measuring an insertion loss for a produced soundproofing material in a column according to examples described later.

Specifications of the above Examples and Comparative Examples are shown in Table 25 below, and results of an insertion loss obtained by evaluating soundproofing performance are shown in FIG. 34. From these results, even when the material or film thickness of the sheet having elasticity are changed, and even when the shape of the support is changed between the honeycomb shape, the corrugated shape or the like, according to the soundproofing material according to the present invention, it can be seen that the insertion loss in the low frequency range of 2000 Hz or less is kept comparable.

TABLE 25

| Soundproofing material | Structure | Overall thickness [mm] | Overall surface density [kg/m$^2$] | Support material | Support thickness [mm] | Surface density of support [kg/m$^2$] | Cell size [mm] | Sheet material | Film thickness of sheet [mm] | Surface density of sheet m [kg/m$^2$] | Surface rigidity of sheet k [N/mm] | $(k/m)^{1/2}/2\pi$ [Hz] | Remark |
|---|---|---|---|---|---|---|---|---|---|---|---|---|---|
| Example 25-1 | Latex sheet + PVC honeycomb support Film thickness of sheet 0.25 mm | Bonding sheet and honeycomb support | 12.75 | 1.07 | PVC | 12.5 | 0.83 | 4 | Latex | 0.25 | 0.24 | 82474 | 2935 | Corresponding to Example 7-2 |
| Example 25-2 | PP sheet + PVC honeycomb support Film thickness of sheet 0.1 mm | Bonding sheet and honeycomb support | 12.6 | 0.92 | PVC | 12.5 | 0.83 | 4 | PP | 0.1 | 0.09 | 1958255 | 23477 | |
| Example 25-3 | PP sheet + PVC honeycomb support Film thickness of sheet 0.03 mm | Bonding sheet and honeycomb support | 12.53 | 0.86 | PVC | 12.5 | 0.83 | 4 | PP | 0.03 | 0.03 | 52873 | 7043 | |

TABLE 25-continued

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 25-4 | PP sheet + PP corrugated support Film thickness of sheet 0.1 mm | Bonding sheet and corrugated support | 12.6 | 0.85 | PP | 12.5 | 0.76 | — | PP | 0.1 | 0.09 | 1958255 | 23477 | |
| Example 25-5 | PP sheet + PP corrugated support Film thickness of sheet 0.03 mm | Bonding sheet and corrugated support | 12.53 | 0.79 | PP | 12.5 | 0.76 | — | PP | 0.03 | 0.03 | 52873 | 6682 | |
| Comparative Example 25 | TECCELL T5 | Honeycomb sandwich panel | 5.4 | 1.32 | — | — | — | — | — | — | — | — | — | Corresponding to Comparative Example 2-7 |

Effect of Material and Thickness of Elastic Sheet

Example 26-1

The soundproofing material (PVC honeycomb support (cell size: 4 mm, thickness: 25 mm)+latex sheet (film thickness: 0.25 mm)) of Example 1 described above was used as a soundproofing material of this Example.

Example 26-2

A soundproofing material of this Example was produced in the same manner as in Example 26-1 described above except that an EPDM sheet (film thickness: 0.4 mm) is used as a sheet having elasticity.

Example 26-3

The soundproofing material (PVC honeycomb support (thickness: 25 mm)+polypropylene (PP) sheet (film thickness: 0.1 mm)) of Example 24-2 described above was used as a soundproofing material of this Example.

Example 26-4

The soundproofing material (PVC honeycomb support (thickness: 25 mm)+polypropylene (PP) sheet (film thickness: 0.03 mm)) of Example 24-3 described above was used as a soundproofing material of this Example.

Figure 35:
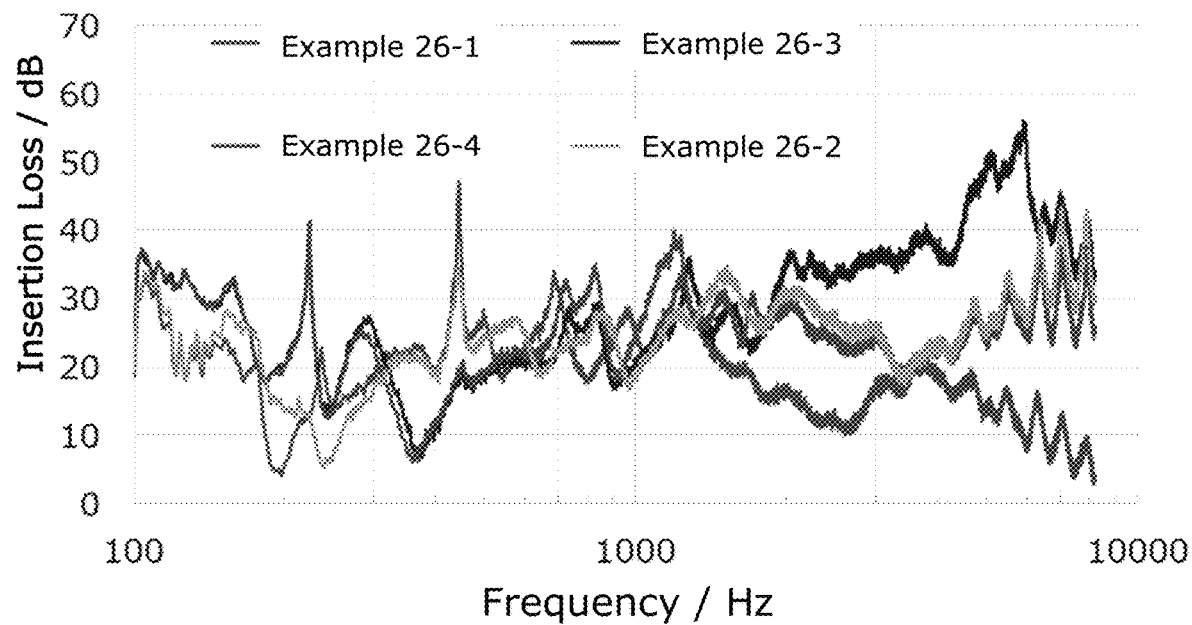
FIG. 35 is a graph showing results of measuring an insertion loss for a produced soundproofing material in a column according to examples described later.

Specifications of the above Example are shown in Table 26 below, and results of an insertion loss obtained by evaluating soundproofing performance are shown in FIG. 35. From these results, it can be seen that even when the material or film thickness of the sheet having elasticity are changed, according to the soundproofing material according to the present invention, it can be seen that the insertion loss in the low frequency range of 2000 Hz or less is kept comparable.

TABLE 26

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 26-1 | Latex sheet + PVC honeycomb support | Bonding sheet and honeycomb support | 25.25 | 1.88 | PVC | 25 | 1.64 | 4 | Latex | 0.25 | 0.24 | 82474 | 2935 | Corresponding to Example 1 |

TABLE 26-continued

| Soundproofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 26-2 | Film thickness of sheet 0.25 mm EPDM sheet + PVC honeycomb support | Bonding sheet and honeycomb support | 25.4 | 1.98 | PVC | 25 | 1.64 | 4 | EPDM | 0.4 | 0.34 | 350919 | 5083 | |
| Example 26-3 | Film thickness of sheet 0.4 mm PP sheet + PVC honeycomb support | Bonding sheet and honeycomb support | 25.1 | 1.73 | PVC | 25 | 1.64 | 4 | PP | 0.1 | 0.09 | 1958255 | 23477 | Corresponding to Example 24-2 |
| Example 26-4 | Film thickness of sheet 0.1 mm PP sheet + PVC honeycomb support | Bonding sheet and honeycomb support | 25.03 | 1.67 | PVC | 25 | 1.64 | 4 | PP | 0.03 | 0.03 | 52873 | 7043 | Corresponding to Example 24-3 |

Film thickness of sheet 0.03 mm

Effect of Material and Thickness of Elastic Sheet

Comparative Example 27

The soundproofing material (PVC honeycomb support (cell size: 8 mm, thickness: 25 mm)+latex sheet (film thickness: 0.25 mm)) of Comparative Example 3-1 described above was used as a soundproofing material of this Comparative Example.

Example 27-1

The soundproofing material (PVC honeycomb support (cell size: 8 mm, thickness: 25 mm)+EPDM sheet (film thickness: 0.4 mm)) of Example 23-2 described above was used as a soundproofing material of this Example.

Example 27-2

A soundproofing material of this Example was produced in the same manner as in Example 27-1 described above except that a polypropylene (PP) sheet (film thickness: 0.1 mm) is used as a sheet having elasticity.

Example 27-3

A soundproofing material of this Example was produced in the same manner as in Example 27-1 described above except that a polypropylene (PP) sheet (film thickness: 0.03 mm) is used as a sheet having elasticity.

Figure 36:
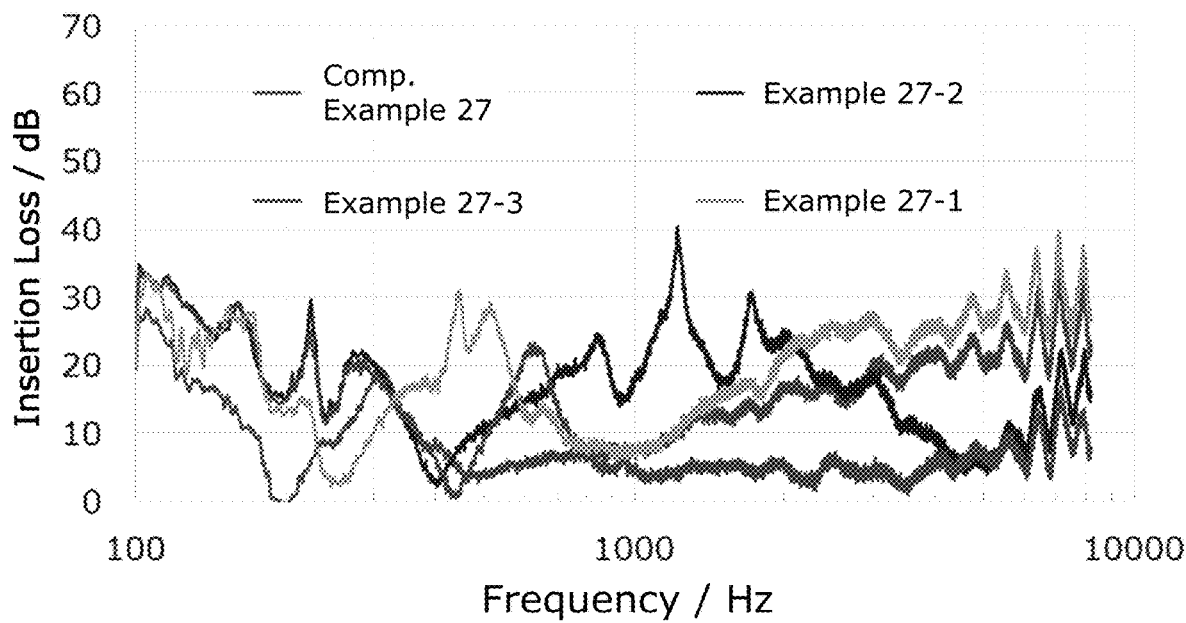
FIG. 36 is a graph showing results of measuring an insertion loss for a produced soundproofing material in a column according to examples described later.

Specifications of the above Examples and Comparative Examples are shown in Table 27 below, and results of an insertion loss obtained by evaluating soundproofing performance are shown in FIG. 36. From these results, it can be seen that even when the material or film thickness of the sheet having elasticity are changed, according to the soundproofing material according to the present invention, it can be seen that the insertion loss in the low frequency range of 2000 Hz or less is kept comparable.

TABLE 27

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Comparative Example 27 | Latex sheet + PVC honeycomb support Film thickness of sheet 0.25 mm | Bonding sheet and honeycomb support | 25.25 | 0.96 | PVC | 25 | 0.72 | 8 | Latex | 0.25 | 0.24 | 5155 | 734 | Corresponding to Comparative Example 3-1 |
| Example 27-1 | EPDM sheet + PVC honeycomb support Film thickness of sheet 0.4 mm | Bonding sheet and honeycomb support | 25.4 | 1.07 | PVC | 25 | 0.72 | 8 | EPDM | 0.4 | 0.34 | 21932 | 1271 | Corresponding to Example 23-2 |
| Example 27-2 | PP sheet + PVC honeycomb support Film thickness of sheet 0.1 mm | Bonding sheet and honeycomb support | 25.1 | 0.81 | PVC | 25 | 0.72 | 8 | PP | 0.1 | 0.09 | 85674 | 4910 | |
| Example 27-3 | PP sheet + PVC honeycomb support Film thickness of sheet 0.03 mm | Bonding sheet and honeycomb support | 25.03 | 0.75 | PVC | 25 | 0.72 | 8 | PP | 0.03 | 0.03 | 2313 | 1473 | |

Effect of Material and Thickness of Elastic Sheet

Comparative Example 28-1

The soundproofing material (PVC honeycomb support (cell size: 13 mm, thickness: 25 mm)+latex sheet (film thickness: 0.25 mm)) of Comparative Example 3-2 described above was used as a soundproofing material of this Comparative Example.

Comparative Example 28-2

The soundproofing material (PVC honeycomb support (cell size: 13 mm, thickness: 25 mm)+EPDM sheet (film thickness: 0.4 mm)) of Comparative Example 23 described above was used as a soundproofing material of this Comparative Example.

Example 28

A soundproofing material of this Example was produced in the same manner as in Comparative Example 28-1 described above except that a polypropylene (PP) sheet (film thickness: 0.1 mm) is used as a sheet having elasticity.

Comparative Example 28-3

A soundproofing material of this Comparative Example was produced in the same manner as in Comparative Example 28-1 described above except that a polypropylene (PP) sheet (film thickness: 0.03 mm) is used as a sheet having elasticity.

Figure 37:
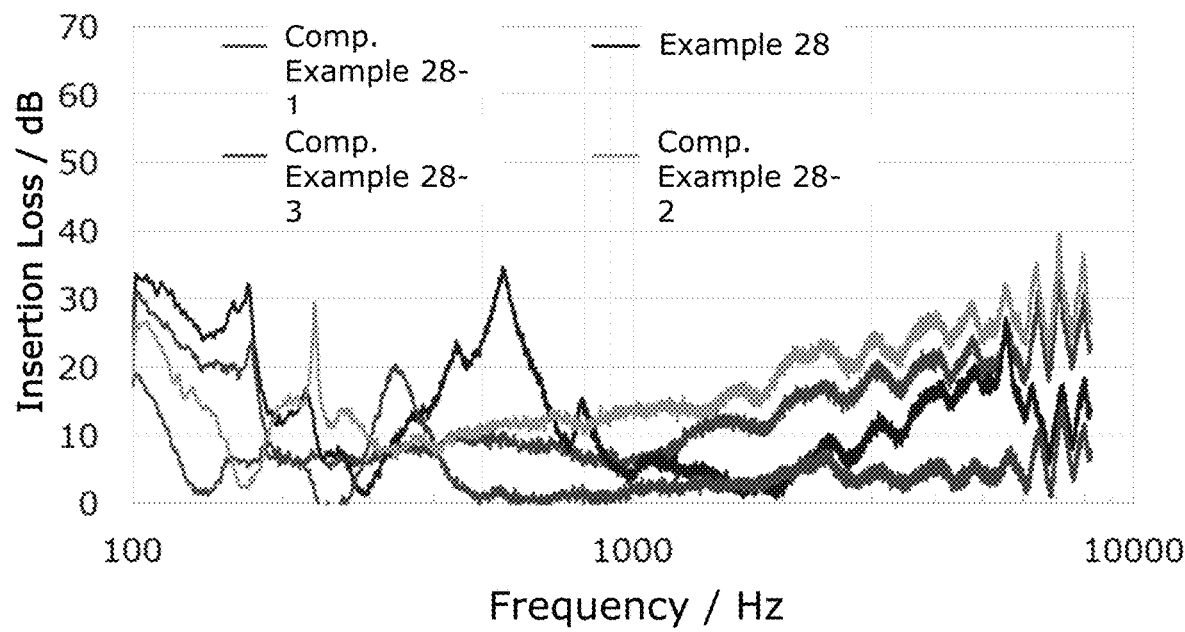
FIG. 37 is a graph showing results of measuring an insertion loss for a produced soundproofing material in a column according to examples described later.

Specifications of the above Examples and Comparative Examples are shown in Table 28 below, and results of an insertion loss obtained by evaluating soundproofing performance are shown in FIG. 37. From these results, it can be seen that the configuration of the soundproofing material according to the present invention can be obtained by changing the material and film thickness of the sheet having elasticity.

TABLE 28

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Comparative Example 28-1 | Latex sheet + PVC honeycomb support Film thickness of sheet 0.25 mm | Bonding sheet and honeycomb support | 25.25 | 1.1 | PVC | 25 | 0.86 | 13 | Latex | 0.25 | 0.24 | 739 | 278 | Corresponding to Comparative Example 3-2 |
| Comparative Example 28-2 | EPDM sheet + PVC honeycomb support Film thickness of sheet 0.4 mm | Bonding sheet and honeycomb support | 25.4 | 1.2 | PVC | 25 | 0.86 | 13 | EPDM | 0.4 | 0.34 | 3145 | 481 | Corresponding to Comparative Example 23 |
| Example 28 | PP sheet + PVC honeycomb support Film thickness of sheet 0.1 mm | Bonding sheet and honeycomb support | 25.1 | 0.95 | PVC | 25 | 0.86 | 13 | PP | 0.1 | 0.09 | 12287 | 1860 | |
| Comparative Example 28-3 | PP sheet + PVC honeycomb support Film thickness of sheet 0.03 mm | Bonding sheet and honeycomb support | 25.03 | 0.89 | PVC | 25 | 0.86 | 13 | PP | 0.03 | 0.03 | 332 | 558 | |

Effect of Cell Size of Honeycomb Support

Example 29-1

The soundproofing material (PVC honeycomb support (cell size: 4 mm, thickness: 25 mm)+polypropylene (PP) sheet (film thickness: 0.1 mm)) of Example 24-2 described above was used as a soundproofing material of this Example.

Example 29-2

The soundproofing material (PVC honeycomb support (cell size: 8 mm, thickness: 25 mm)+polypropylene (PP) sheet (film thickness: 0.1 mm)) of Example 27-2 described above was used as a soundproofing material of this Example.

Example 29-3

The soundproofing material (PVC honeycomb support (cell size: 13 mm, thickness: 25 mm)+polypropylene (PP) sheet (film thickness: 0.1 mm)) of Example 28 described above was used as a soundproofing material of this Example.

Figure 38:
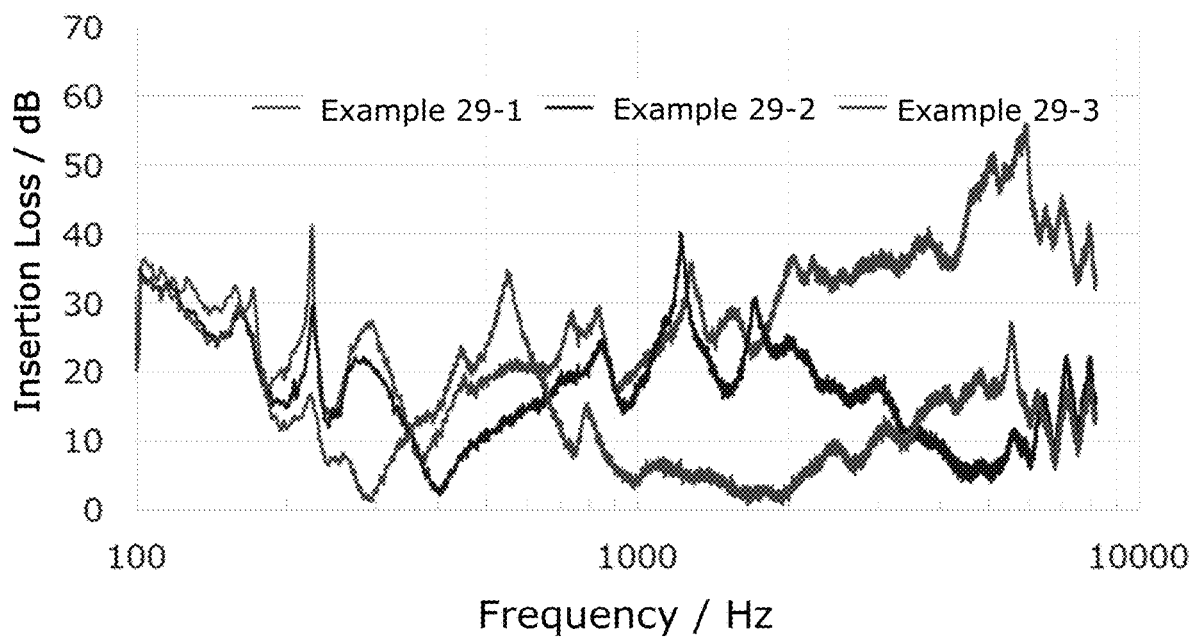
FIG. 38 is a graph showing results of measuring an insertion loss for a produced soundproofing material in a column according to examples described later.

Specifications of the above Example are shown in Table 29 below, and results of an insertion loss obtained by evaluating soundproofing performance are shown in FIG. 38. From these results, it can be seen that according to the soundproofing material according to the present invention, it is possible to control an insertion loss in a low frequency range of 2000 Hz or less by changing the cell size of the honeycomb support.

TABLE 29

| Soundproofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 29-1 | PP sheet + PVC honeycomb support Cell size 4 mm | Bonding sheet and honeycomb support | 25.1 | 1.73 | PVC | 25 | 1.64 | 4 | PP | 0.1 | 0.09 | 1958255 | 23477 | Corresponding to Example 24-2 |
| Example 29-2 | PP sheet + PVC honeycomb support Cell size 8 mm | Bonding sheet and honeycomb support | 25.1 | 0.81 | PVC | 25 | 0.72 | 8 | PP | 0.1 | 0.09 | 58674 | 4910 | Corresponding to Example 27-2 |
| Example 29-3 | PP sheet + PVC honeycomb support Cell size 13 mm | Bonding sheet and honeycomb support | 25.1 | 0.95 | PVC | 25 | 0.86 | 13 | PP | 0.1 | 0.09 | 12287 | 1860 | Corresponding to Example 28 |

Effect of Cell Size of Honeycomb Support

Example 30-1

The soundproofing material (PVC honeycomb support (cell size: 4 mm, thickness: 25 mm)+polypropylene (PP) sheet (film thickness: 0.03 mm)) of Example 24-3 described above was used as a soundproofing material of this Example.

Example 30-2

The soundproofing material (PVC honeycomb support (cell size: 8 mm, thickness: 25 mm)+polypropylene (PP) sheet (film thickness: 0.03 mm)) of Example 27-3 described above was used as a soundproofing material of this Example.

Comparative Example 30

The soundproofing material (PVC honeycomb support (cell size: 13 mm, thickness: 25 mm)+polypropylene (PP) sheet (film thickness: 0.03 mm)) of Comparative Example 28-3 described above was used as a soundproofing material of this Example.

Figure 39:
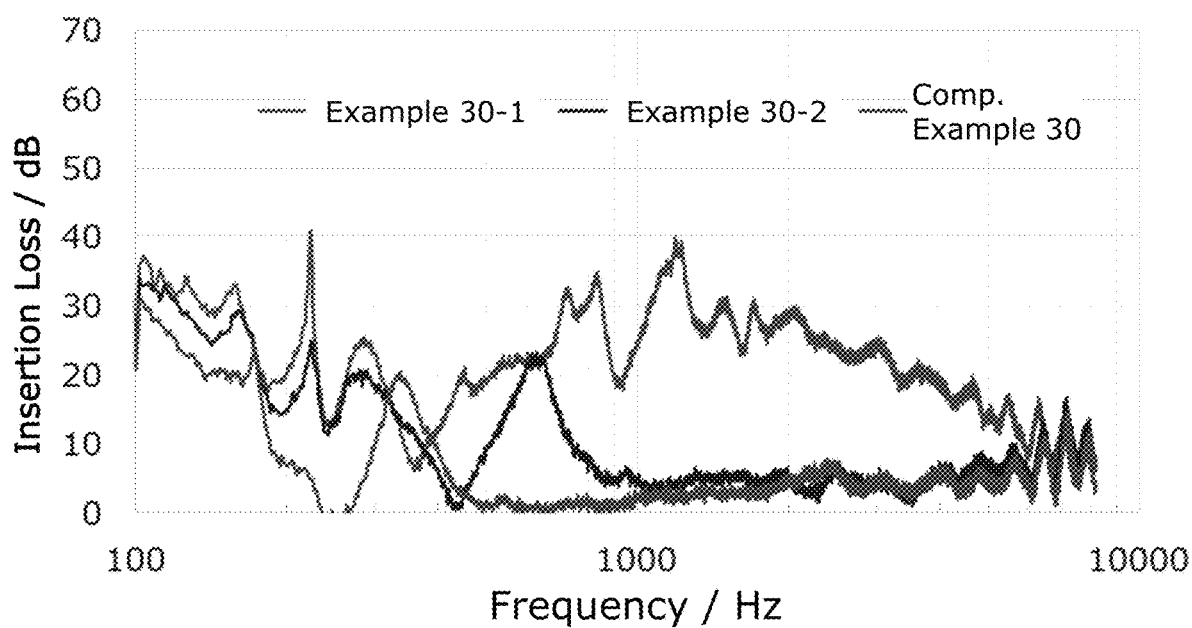
FIG. 39 is a graph showing results of measuring an insertion loss for a produced soundproofing material in a column according to examples described later.

Specifications of the above Examples and Comparative Examples are shown in Table 30 below, and results of an insertion loss obtained by evaluating soundproofing performance are shown in FIG. 39. From these results, it can be seen that the configuration of the soundproofing material according to the present invention can be obtained by changing the cell size of the support in addition to the material or film thickness of the sheet having elasticity.

TABLE 30

| Soundproofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Example 30-1 | PP sheet + PVC honeycomb support Cell size 4 mm | Bonding sheet and honeycomb support | 25.03 | 1.67 | PVC | 25 | 1.64 | 4 | PP | 0.03 | 0.03 | 52873 | 7043 | Corresponding to Example 24-3 |
| Example 30-2 | PP sheet + PVC honeycomb support Cell size 8 mm | Bonding sheet and honeycomb support | 25.03 | 0.75 | PVC | 25 | 0.72 | 8 | PP | 0.03 | 0.03 | 2313 | 1473 | Corresponding to Example 27-3 |

TABLE 30-continued

| Sound-proofing material | Structure | Overall thickness [mm] | Overall surface density [kg/m²] | Support material | Support thickness [mm] | Surface density of support [kg/m²] | Cell size [mm] | Sheet material | Film thickness of sheet [mm] | Surface density of sheet m [kg/m²] | Surface rigidity of sheet k [N/mm] | $(k/m)^{1/2}/2\pi$ [Hz] | Remark |
|---|---|---|---|---|---|---|---|---|---|---|---|---|---|
| Comparative Example 30 | PP sheet + PVC honeycomb support Cell size 13 mm | Bonding sheet and honeycomb support | 25.03 | 0.89 | PVC | 25 | 0.86 | 13 | PP | 0.03 | 0.03 | 332 | 558 | Corresponding to Comparative Example 28-3 |

As shown in the table described above and FIGS. 10 to 39, it can be seen that the insertion loss is significantly improved in the low frequency range of 2000 Hz or less by using the soundproofing material produced in each Example as compared with the corresponding Comparative Example. In addition, the soundproofing performance (frequency range in which the insertion loss is large) indicated by the soundproofing material can be controlled by variously changing the size or shape of the partition portion (cell) and the material and film thickness of the sheet in the partition portion (cell), and the like.

This application is based on Japanese Patent Application No. 2017-146066 filed on Jul. 28, 2017 and Japanese Patent Application No. 2018-136411 filed on Jul. 20, 2018, the disclosure of which is incorporated by reference in its entirety.

REFERENCE SIGNS LIST

10 Soundproofing material
100 Support
110, 110a Cylindrical cell
200 Latex rubber sheet (elastic sheet)
h Height of support (cylindrical cell) in extending direction
W Size of cylindrical cell (distance between opposing parallel sides in regular hexagon of cross-sectional shape)
a Length of one side of regular hexagon which is cross-sectional shape of cylindrical cell
t Thickness of inner wall (lattice wall) of cylindrical cell

The invention claimed is:

1. A soundproofing material, comprising:
   a sheet having elasticity; and
   a support portion partitioning the sheet into a partition portion while supporting the sheet,
   wherein a surface rigidity (k) of the sheet and a surface density (m) of the sheet in the partition portion satisfy a relationship of the following Expression 1.

[Math. 1]

$$\frac{1}{2\pi}\sqrt{\frac{k}{m}} \geq 1473 \text{ [Hz]}. \quad \text{[Expression 1]}$$

2. The soundproofing material according to claim 1, wherein the surface rigidity (k) and the surface density (m) satisfy a relationship of the following Expression 2.

[Math. 2]

$$\frac{1}{2\pi}\sqrt{\frac{k}{m}} \geq 2000 \text{ [Hz]}. \quad \text{[Expression 2]}$$

3. The soundproofing material according to claim 1, wherein the support portion partitions the sheet into a plurality of partition portions, and at least a part of the plurality of partition portions configures a regular arrangement structure in which the plurality of partition portions having the same outline shape are regularly arranged.

4. The soundproofing material according to claim 3, wherein a ratio of an occupied area of the regular arrangement structure to an area of the sheet is 90 to 100%.

5. The soundproofing material according to claim 3, wherein the outline shape of the partition portion in the regular arrangement structure is a polygon selected from the group consisting of a regular hexagon, a square, and a regular triangle.

6. The soundproofing material according to claim 5, wherein the polygon is a regular hexagon, and a distance between opposing parallel sides in the regular hexagon is 6.0 mm or less.

7. The soundproofing material according to claim 1, wherein the support portion is a single structure whose height is uniform.

8. The soundproofing material according to claim 1, wherein a height of the support portion in an extending direction is 5 mm or more.

9. The soundproofing material according to claim 1, wherein the support portions are disposed on both surfaces of at least one of the sheets.

10. The soundproofing material according to claim 9, wherein constituent materials of the support portions disposed on both surfaces of the sheet, respectively, are different from each other.

11. The soundproofing material according to claim 1, wherein the sheet is disposed on both sides of at least one of the support portions.

12. The soundproofing material according to claim 11, wherein constituent materials of the sheets disposed on both sides of the support portion, respectively, are different from each other.

13. The soundproofing material according to claim 1, wherein at least one of the support portions is divided into a plurality of members for the one sheet.

14. The soundproofing material according to claim 1, wherein at least one of the constituent materials of the sheet is a rubber material.

15. The soundproofing material according to claim 1, wherein at least one of the constituent materials of the sheet is a resin material.

16. The soundproofing material according to claim 1, wherein at least one of the constituent materials of the sheet is a metal material.

17. The soundproofing material according to claim 1, wherein at least one of the constituent materials of the sheet is a paper material.

18. The soundproofing material according to claim 1, wherein at least one of the constituent materials of the sheet is a material having a buffer function.

19. The soundproofing material according to claim 1, wherein at least one of constituent materials of the support portions is a resin material.

20. The soundproofing material according to claim 1, wherein at least one of the constituent materials of the support portion is a metal material.

21. The soundproofing material according to claim 1, wherein the soundproofing material has flexibility.

* * * * *